US012670011B2

(12) United States Patent
Bonig et al.

(10) Patent No.: US 12,670,011 B2
(45) Date of Patent: *Jun. 30, 2026

(54) DISTRIBUTED AND TRANSACTIONALLY DETERMINISTIC DATA PROCESSING ARCHITECTURE

(71) Applicant: Chicago Mercantile Exchange Inc., Chicago, IL (US)

(72) Inventors: Zachary Bonig, Skokie, IL (US); Jose Antonio Acuna-Rohter, Des Plaines, IL (US); Pearce Peck-Walden, Chicago, IL (US); James Bailey, Western Springs, IL (US); Eric Thill, Naperville, IL (US); David Lariviere, Chicago, IL (US)

(73) Assignee: Chicago Mercantile Exchange Inc., Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/651,010

(22) Filed: Apr. 30, 2024

(65) Prior Publication Data

US 2024/0283839 A1 Aug. 22, 2024

Related U.S. Application Data

(63) Continuation of application No. 18/137,233, filed on Apr. 20, 2023, now Pat. No. 12,010,162, which is a
(Continued)

(51) Int. Cl.
*G06Q 40/00* (2023.01)
*G06F 9/46* (2006.01)
(Continued)

(52) U.S. Cl.
CPC .............. *G06F 9/466* (2013.01); *G06F 9/546* (2013.01); *G06Q 20/085* (2013.01); *G06Q 20/12* (2013.01);
(Continued)

(58) Field of Classification Search
CPC ....... G06F 9/466; G06F 9/546; G06Q 20/085; G06Q 20/12; G06Q 20/389; G06Q 20/401;
(Continued)

(56) References Cited

U.S. PATENT DOCUMENTS

| | | | |
|---|---|---|---|
| 5,982,893 | A | 11/1999 | Hughes |
| 7,039,610 | B2 | 5/2006 | Morano et al. |

(Continued)

FOREIGN PATENT DOCUMENTS

| | | | | |
|---|---|---|---|---|
| EP | | 0921661 B1 | 4/2005 | |
| WO | WO-02101552 A1 * | 12/2002 | ........... | H04L 49/602 |

OTHER PUBLICATIONS

Nawab et al: "Message Futures: Fast Commitment of Transactions in Multi-datacenter Environments", CIDR, 2013 (Year: 2013).*

(Continued)

*Primary Examiner* — Edward J Baird
(74) *Attorney, Agent, or Firm* — Lempia Summerfield Katz LLC

(57) ABSTRACT

A data transaction processing system including multiple transaction processors also includes an active transaction receiver that sequences all incoming messages from various sources to facilitate transactional determinism, as well as a results arbiter to efficiently decide which transaction processor result to choose as the correct output. The data transaction processing system minimizes overall latency by optimizing which transaction processors and results arbiters are responsive to specific client computer input requests or messages.

25 Claims, 11 Drawing Sheets

Related U.S. Application Data continuation of application No. 17/582,136, filed on Jan. 24, 2022, now Pat. No. 11,665,222, which is a continuation of application No. 16/822,392, filed on Mar. 18, 2020, now Pat. No. 11,272,040, which is a continuation of application No. 16/392,994, filed on Apr. 24, 2019, now Pat. No. 10,637,967, which is a continuation of application No. 15/374,908, filed on Dec. 9, 2016, now Pat. No. 10,326,862.

(51) Int. Cl.

| | |
|---|---|
| *G06F 9/54* | (2006.01) |
| *G06Q 20/08* | (2012.01) |
| *G06Q 20/12* | (2012.01) |
| *G06Q 20/38* | (2012.01) |
| *G06Q 20/40* | (2012.01) |
| *G06Q 40/04* | (2012.01) |
| *H04L 45/24* | (2022.01) |
| *H04L 51/18* | (2022.01) |
| *H04L 67/10* | (2022.01) |

(52) U.S. Cl.
CPC ......... *G06Q 20/389* (2013.01); *G06Q 20/401* (2013.01); *G06Q 20/405* (2013.01); *G06Q 40/04* (2013.01); *H04L 45/24* (2013.01); *H04L 51/18* (2013.01); *H04L 67/10* (2013.01)

(58) Field of Classification Search
CPC ...... G06Q 20/405; G06Q 40/04; H04L 45/24; H04L 51/18; H04L 67/10
See application file for complete search history.

(56) References Cited

U.S. PATENT DOCUMENTS

| | | | |
|---|---|---|---|
| 7,434,096 B2 | 10/2008 | Callaway | |
| 7,480,827 B2 | 1/2009 | Callaway | |
| 7,788,163 B2 | 8/2010 | Troxel, Jr. | |
| 7,831,491 B2 | 11/2010 | Newell et al. | |
| 7,853,499 B2 | 12/2010 | Czupek et al. | |
| 8,041,985 B2 | 10/2011 | Callaway | |
| 8,832,211 B1 | 9/2014 | Lebedev | |
| 9,528,390 B2 | 12/2016 | Schneider et al. | |
| 9,621,361 B2 * | 4/2017 | Bugenhagen | H04L 12/14 |
| 9,990,393 B2 | 6/2018 | Parsons et al. | |
| 2001/0025313 A1 | 9/2001 | Feng | |
| 2002/0103663 A1 | 8/2002 | Bankier | |
| 2004/0206816 A1 | 10/2004 | Gokli et al. | |
| 2005/0096999 A1 | 5/2005 | Newell et al. | |
| 2005/0203826 A1 | 9/2005 | Farrell et al. | |
| 2005/0271071 A1 | 12/2005 | Madhavapeddi et al. | |
| 2006/0206407 A1 | 9/2006 | Troxel | |
| 2007/0043650 A1 | 2/2007 | Hughes et al. | |
| 2007/0118460 A1 | 5/2007 | Bauerschmidt | |
| 2009/0276624 A1 | 11/2009 | Chehade | |
| 2010/0138360 A1 | 6/2010 | Cutler et al. | |
| 2010/0274866 A1 | 10/2010 | Hammad et al. | |
| 2010/0281178 A1 * | 11/2010 | Sullivan | H04N 21/2668 709/245 |
| 2011/0178918 A1 | 7/2011 | Parsons et al. | |
| 2012/0246052 A1 | 9/2012 | Taylor et al. | |
| 2012/0317011 A1 | 12/2012 | Duquette | |
| 2013/0262287 A1 | 10/2013 | Parsons et al. | |
| 2014/0006243 A1 | 1/2014 | Boudreault et al. | |
| 2014/0249979 A1 | 9/2014 | Wallener et al. | |
| 2014/0359036 A1 * | 12/2014 | Blakers | G06Q 40/04 709/206 |
| 2015/0026833 A1 | 1/2015 | Ande | |
| 2015/0073962 A1 | 3/2015 | Bixby et al. | |
| 2015/0073967 A1 * | 3/2015 | Katsuyama | G06Q 30/08 705/37 |
| 2015/0127510 A1 | 5/2015 | Studnitzer et al. | |
| 2015/0127513 A1 | 5/2015 | Studnitzer | |
| 2015/0127516 A1 | 5/2015 | Studnitzer et al. | |
| 2015/0161727 A1 | 6/2015 | Callaway et al. | |
| 2015/0199680 A1 | 7/2015 | Framularo | |
| 2016/0080156 A1 | 3/2016 | Kaliski, Jr. | |
| 2016/0210633 A1 | 7/2016 | Epelman et al. | |
| 2016/0232178 A1 | 8/2016 | Little | |
| 2017/0013843 A1 | 1/2017 | Hellwege et al. | |
| 2017/0078299 A1 | 3/2017 | Castinado et al. | |
| 2017/0193465 A1 | 7/2017 | Madura | |
| 2018/0096350 A1 | 4/2018 | Groarke | |
| 2018/0137509 A1 | 5/2018 | Hosny | |
| 2018/0276751 A1 | 9/2018 | Kavanagh et al. | |

OTHER PUBLICATIONS

"Akamai Technologies", Wikipedia, 10 pages, retrieved at: https://en.wikipedia.org/wiki/Akamai_Technologies, Nov. 22, 2016.

"Content Delivery Network", Wikipedia, 7 pages, retrieved at: https://en.wikipedia.org/wiki/Content_delivery_network, Nov. 29, 2016.

Examination report from related EP Application No. 17800651.6, Jun. 22, 2023, EP.

International Search Report and Written Opinion, from PCT/US2017/057966, Feb. 5, 2018, WO.

Ken Florance, "How Netflix Works with ISPs Around the Globe to Deliver a Great Viewing Experience", Media Netflix, Blog, 7 pages, Mar. 17, 2016.

Ryan Lawler, "Netflix Rolls out its Own CDN: Open Connect", Techcrunch.com, 1 page, https://techcrunch.com/2012/06/04/netflix-open-connect/, Jun. 4, 2012.

* cited by examiner

200

Bus 208

Processor
202

Instructions
212

Memory
204

Instructions
212

Drive Unit
206

Computer
Readable
Medium
210

Instructions
212

Display
214

User Input Device
216

Communication
Interface
218

Internet and/or other
network(s)
220

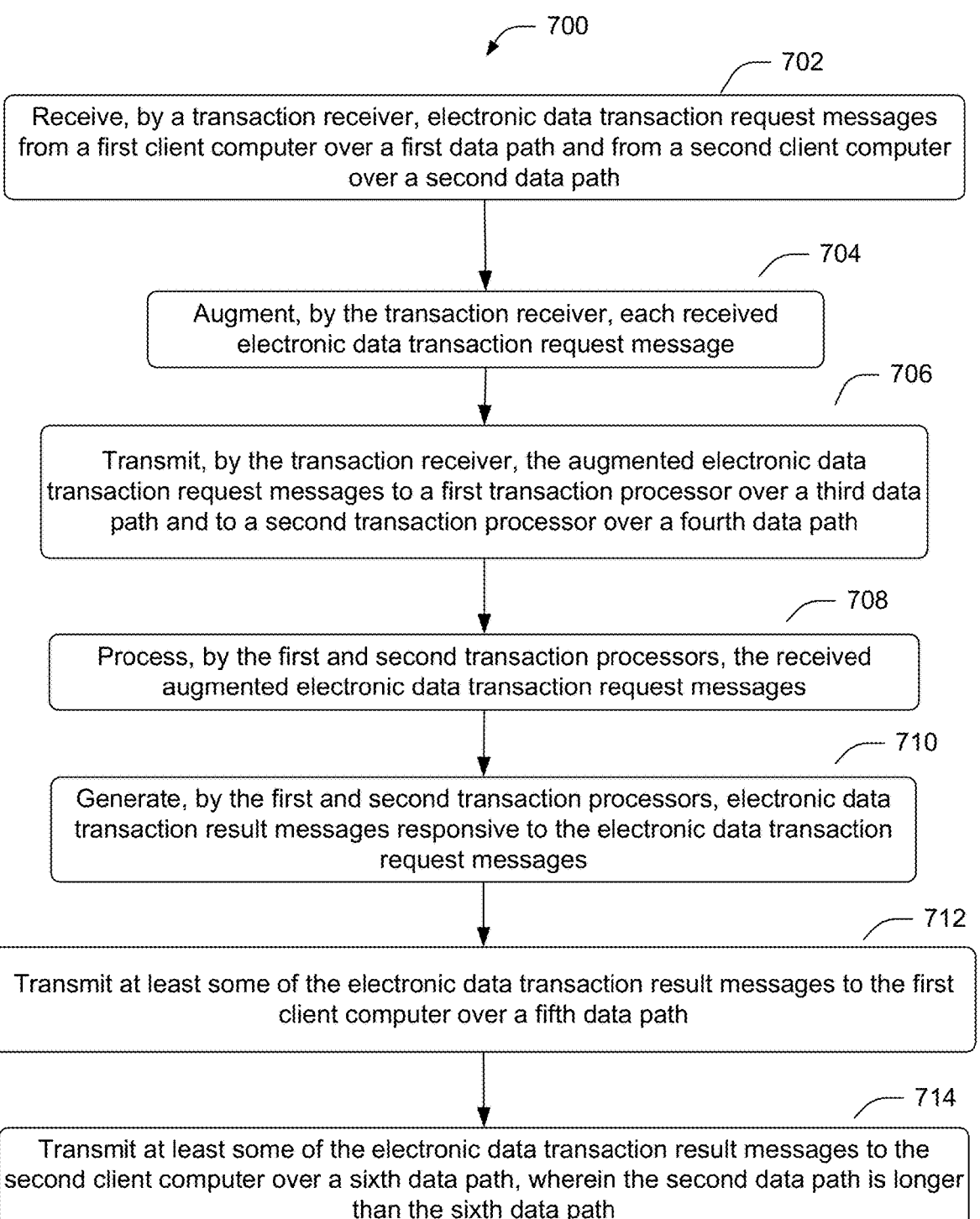

700

702

Receive, by a transaction receiver, electronic data transaction request messages from a first client computer over a first data path and from a second client computer over a second data path

704

Augment, by the transaction receiver, each received electronic data transaction request message

706

Transmit, by the transaction receiver, the augmented electronic data transaction request messages to a first transaction processor over a third data path and to a second transaction processor over a fourth data path

708

Process, by the first and second transaction processors, the received augmented electronic data transaction request messages

710

Generate, by the first and second transaction processors, electronic data transaction result messages responsive to the electronic data transaction request messages

712

Transmit at least some of the electronic data transaction result messages to the first client computer over a fifth data path

714

Transmit at least some of the electronic data transaction result messages to the second client computer over a sixth data path, wherein the second data path is longer than the sixth data path

Fig. 7

DISTRIBUTED AND TRANSACTIONALLY DETERMINISTIC DATA PROCESSING ARCHITECTURE

CROSS REFERENCE TO RELATED APPLICATIONS

This application is a continuation under 37 C.F.R. § 1.53 (b) of U.S. patent application Ser. No. 18/137,233 filed Apr. 20, 2023, now U.S. Pat. No. 12,010,162, which is a continuation under 37 C.F.R. § 1.53 (b) of U.S. patent application Ser. No. 17/582,136 filed Jan. 24, 2022 now U.S. Pat. No. 11,665,222, which is a continuation under 37 C.F.R. § 1.53 (b) of U.S. patent application Ser. No. 16/822,392 filed Mar. 18, 2020 now U.S. Pat. No. 11,272,040, which is a continuation under 37 C.F.R. § 1.53 (b) of U.S. patent application Ser. No. 16/392,994 filed Apr. 24, 2019 now U.S. Pat. No. 10,637,967, which is a continuation under 37 C.F.R. § 1.53 (b) of U.S. patent application Ser. No. 15/374,908 filed Dec. 9, 2016 now U.S. Pat. No. 10,326,862, the entire disclosures of which are incorporated by reference in their entirety.

BACKGROUND

Computer systems commonly include multiple processing components. Many computer applications span multiple "tenants" (multi-threaded, multi-process, clustered, multi-data-center, etc.). The multiple components may receive the same operations or instructions to execute. Problems may arise if the order of operations between two processing components can differ, leading to different states for the two processing components.

To alleviate this, systems may run order-critical processes, or portions thereof, through a single system component. Or systems may replicate the end state out to redundant (backup) components. However, these types of architecture may limit the maximum throughput of the system to the shortest time the single system component can process an operation and then replicate its state to its peer machines.

Moreover, redundant computer systems may depend on time/temporal based/controlled coordination to attempt to ensure that multiple components perform events or operations at the same (real) time, or in the same order. However, computer system clocks are susceptible to drift where the clock of one computer/processor may operate at a different, i.e. faster or slower, rate than the clock of another computer/processor. Thus, it can become difficult to ensure that different components perform time-based tasks concurrently or in the same or desired order.

A single component may be used to deterministically control ordering and timing signals. However, the single component may be logically or physically separated from computers that submit messages to the exchange computing system. Other components that process the messages and compute data may need to communicate with, or receive messages and data from, the single component. Ordering the messages at the single component, processing the messages and transmitting response messages, which may be larger in size than the incoming messages, back to the submitting computers may increase latency and decrease throughput, especially when the submitting computer and the ordering component are logically and/or physically remote.

BRIEF DESCRIPTION OF THE DRAWINGS

FIG. 7 an example flowchart for implementing an example exchange computing system in accordance with the disclosed embodiments

DETAILED DESCRIPTION

Figure 1:
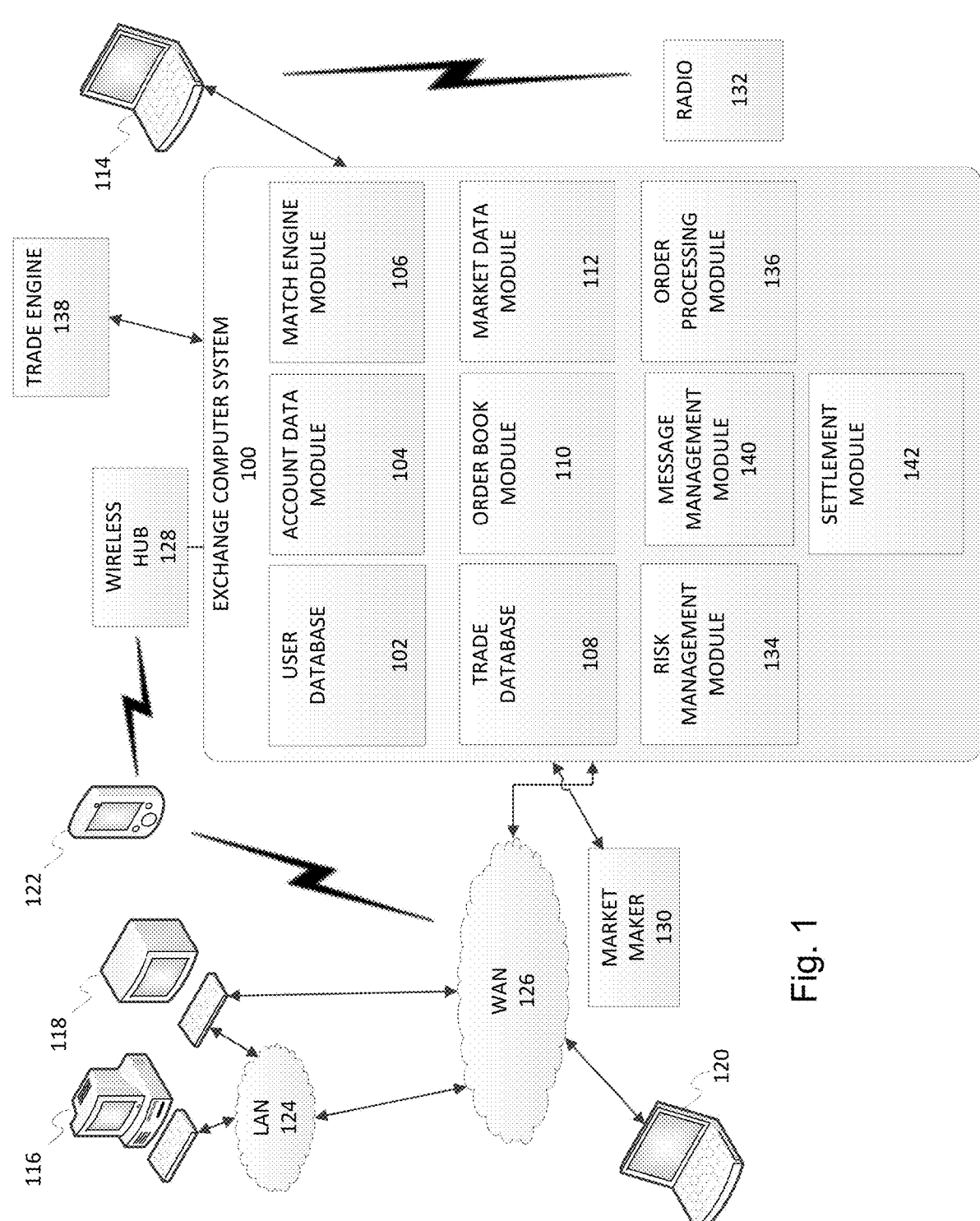
FIG. 1 depicts an illustrative electronic trading system that may be used to implement aspects of the disclosed embodiments.

The disclosed embodiments relate generally to a data transaction processing system which includes multiple physically, e.g. geographically, and/or logically distinct or otherwise separated processing components that perform some (e.g., for process optimization and improved performance) or all (e.g., for, fault tolerance) of the same tasks. For example, the components may be configured to independently arrive at the same results based on a given set of inputs, e.g., to implement a deterministic system, or for redundancy. Moreover, the multiple components may receive instructions/operations/tasks/transactions from multiple sources, such as client computers, timing control devices, instruction generators, etc.

The data transaction processing system may include a single component, e.g., an orderer, to control the order and timing of processing the tasks or instructions performed by the multiple systems or components. For example, the processing by the multiple components may by controlled to be the same or otherwise synchronized/coordinated by the single component, e.g., the orderer.

The data transaction processing system may generate both tasks and associated task identifiers, and send task identifiers through a single sequencer, e.g., the orderer, so as to control the order, in a low latency manner, in which instructions are processed by components, even when the components receive instructions from multiple sources.

The tasks may be event based. Where the event is a time of day, the disclosed embodiments may include a time beacon that serves as a universal source of time for all of the system components. The system components accordingly may each receive a message indicating the time, and each component may perform a time-based task upon receiving the message indicating the corresponding time.

A system that allows such universal sequencing, including for event based (where the occurrence of a predetermined time may be an event) instructions, enables all system components to come to the same state or result. The disclosed embodiments also allow replay of transactions at a much later time, e.g., several weeks after processing transactions.

For example, multiple machines, e.g. computers or processors, in a system implementing the disclosed embodiments may receive the same stream of tasks or instructions in a different order, but each machine can nevertheless process the tasks in the same order, leading the machines to eventually reach or otherwise be able to maintain identical states once all the tasks are processed.

For more details on implementing a single component, e.g., an orderer, to facilitate deterministic behavior and precise timing control, see U.S. patent application Ser. No. 15/232,208, Aug. 9, 2016, entitled "Systems and Methods for Coordinating Processing of Scheduled Instructions Across Multiple Components" ("the '208 Application"), and U.S. patent application Ser. No. 15/232,224, filed on Aug. 9, 2016, entitled "Systems and Methods for Coordinating Processing of Instructions Across Multiple Components" ("the '224 Application"), the entireties of each of which is incorporated by reference herein and relied upon.

The disclosed embodiments relate generally to a data communications system/network, for use by a data transaction processing system, that includes an orderer component to facilitate deterministic behavior. The data stream generated by the orderer component may be input into several different (e.g., redundant) transaction processors. The multiple transaction processors perform processing, e.g., matching, based on the input data received from the orderer component. Each transaction processor may perform its own processing, and its output stream may be, in one embodiment, much larger than the input data stream (i.e., received by each transaction processor from the orderer component). The outputs may be provided to a decider component, which determines which of the transaction processor outputs should be treated as the result of the transaction processor processing. See U.S. patent application Ser. No. 14/074,675, Published as U.S. Publication No. 2015-0127516 A1, filed on Nov. 7, 2013 entitled "Transactionally Deterministic High Speed Financial Exchange Having Improved, Efficiency, Communication, Customization, Performance, Access, Trading Opportunities, Credit Controls, and Fault Tolerance," the entire disclosure of which is incorporated by reference herein and relied upon. The outputs may also be published as large market data feeds.

The disclosed embodiments may include multiple decider components that are configured to communicate results to various client computers, so that each client customer rapidly receives output results. Each decider component is configured to optimize the data path from the transaction processors to the client computers. Remote client computers, including geographically distant client computers, receive the output results rapidly due to the orderer component providing an input stream to each transaction processor, and separate decider components that are optimized, based on transaction processor configuration, to respond to client computers.

The data transaction processing system, may, in one embodiment, operate in a stateful manner, i.e., depend upon historical/prior messages received, and/or rely upon previous results thereof or previous decisions made, by the transaction processing system. The data transaction processing system may also access data structures storing information about a current environment state to optimize decider component to client computer communication.

The disclosed embodiments improve upon the technical field of data processing, in one embodiment, by optimizing which decider component communicates processing results back to client computers. In a system that performs dynamic computations where output responses can be on the order of hundreds of times larger (i.e., more data) that inputs, optimizing transmission of transaction processing results can largely improve overall system latency and efficiency.

The disclosed system is a specific implementation and practical application that allows configuration of data transfer in from various client customers to an orderer component (e.g., to facilitate determinism) to multiple transaction processors and back out from the multiple transaction processors to one or more decider components and back to various client computers, so that the latency for a response time to a client computer is minimized. For example, the system may increase efficiencies in an exchange computing system's matching processors by allowing configuring of which processors generated the electronic data transaction result messages that are transmitted to/responsive to specific client computers.

At least some of the problems solved by the disclosed resource allocation system are specifically rooted in technology, specifically in data communications where transaction processors deterministically compute values so that data output amounts are much larger than data input amount, and where different client computers may be geographically distributed and/or active at different times.

In one embodiment, the data transaction processing system is a particular practical and technological solution for a processing system having multiple transaction processors that receives data inputs from one active orderer component, yet where data inputs are received from, and data outputs are transmitted to, various disparate client computers.

Such technologically rooted problems may be solved by means of a technical solution that minimizes the amount of data that has to be copied or transferred, instead preferring to generate (i.e., compute) new data output values deterministically at optimized locations within the data transaction processing system.

The disclosed embodiments solve a problem arising in state-dependent trading and transaction processing where the data input volume to data output volume ratio is unbalanced, e.g., data output volume far exceeds data input volume, and where data input is processed through an orderer component to facilitate deterministic, predictable behavior.

Accordingly, the resulting problem is a problem arising in computer systems due to asymmetric data flow resulting from transaction processing that implements specific matching algorithms, discussed below. The solutions disclosed herein are, in one embodiment, implemented as automatic responses and actions by an exchange computing system computer.

The disclosed embodiments may be directed to an exchange computing system that includes multiple hardware matching processors that match, or attempt to match, electronic data transaction request messages with other electronic data transaction request messages counter thereto. Input electronic data transaction request messages may be received from different client computers over a data communication network, and output electronic data transaction result messages may be transmitted to the client computers and may be indicative of results of the attempts to match incoming electronic data transaction request messages. Orderer components and decider components implemented between the client computers and hardware matching processors shape and optimize the data flow. While the disclosed embodiments will be described with respect to electronic data transaction request and result messages, it will be appreciated that the disclosed embodiments may be implemented with respect to other technologies later developed, such as photonic, e.g., light-based, messages.

The disclosed embodiments may be implemented in a data transaction processing system that processes data items or objects. Customer or user devices (e.g., computers) may submit electronic data transaction request messages, e.g., inbound messages, to the data transaction processing system over a data communication network. The electronic data transaction request messages may include, for example, transaction matching parameters, such as instructions and/or values, for processing the data transaction request messages within the data transaction processing system. The instructions may be to perform transactions, e.g., buy or sell a quantity of a product at a given value. Products, e.g., financial instruments, or order books representing the state of an electronic marketplace for a product, may be represented as data objects within the exchange computing system. The instructions may also be conditional, e.g., buy or sell a quantity of a product at a given value if a trade for the product is executed at some other reference value. The data transaction processing system may include various specifically configured matching processors that match, e.g., automatically, electronic data transaction request messages for the same one of the data items. The specifically configured matching processors may match electronic data transaction request messages based on multiple transaction matching parameters from the different client computers. The specifically configured matching processors may additionally generate information indicative of a state of an environment (e.g., the state of the order book) based on the processing, and report this information to data recipient computing systems via outbound messages published via one or more data feeds.

For example, one exemplary environment where increasing redundancy and minimizing response time latency is desirable is in financial markets, and in particular, electronic financial exchanges, such as a futures exchange, such as the Chicago Mercantile Exchange Inc. (CME).

A financial instrument trading system, such as a futures exchange, such as the Chicago Mercantile Exchange Inc. (CME), provides a contract market where financial instruments, e.g., futures and options on futures, are traded using electronic systems. "Futures" is a term used to designate all contracts for the purchase or sale of financial instruments or physical commodities for future delivery or cash settlement on a commodity futures exchange. A futures contract is a legally binding agreement to buy or sell a commodity at a specified price at a predetermined future time. An option contract is the right, but not the obligation, to sell or buy the underlying instrument (in this case, a futures contract) at a specified price within a specified time. The commodity to be delivered in fulfillment of the contract, or alternatively the commodity for which the cash market price shall determine the final settlement price of the futures contract, is known as the contract's underlying reference or "underlier." The terms and conditions of each futures contract are standardized as to the specification of the contract's underlying reference commodity, the quality of such commodity, quantity, delivery date, and means of contract settlement. Cash settlement is a method of settling a futures contract whereby the parties effect final settlement when the contract expires by paying/receiving the loss/gain related to the contract in cash, rather than by effecting physical sale and purchase of the underlying reference commodity at a price determined by the futures contract, price. Options and futures may be based on more generalized market indicators, such as stock indices, interest rates, futures contracts and other derivatives.

An exchange may provide for a centralized "clearing house" through which trades made must be confirmed, matched, and settled each day until offset or delivered. The clearing house may be an adjunct to an exchange, and may be an operating division of an exchange, which is responsible for settling trading accounts, clearing trades, collecting and maintaining performance bond funds, regulating delivery, and reporting trading data. One of the roles of the clearing house is to mitigate credit risk. Clearing is the procedure through which the clearing house becomes buyer to each seller of a futures contract, and seller to each buyer, also referred to as a novation, and assumes responsibility for protecting buyers and sellers from financial loss due to breach of contract, by assuring performance on each contract. A clearing member is a firm qualified to clear trades through the clearing house.

An exchange computing system may operate under a central counterparty model, where the exchange acts as an intermediary between market participants for the transaction of financial instruments. In particular, the exchange computing system novates itself into the transactions between the market participants, i.e., splits a given transaction between the parties into two separate transactions where the exchange computing system substitutes itself as the counterparty to each of the parties for that part of the transaction, sometimes referred to as a novation. In this way, the exchange computing system acts as a guarantor and central counterparty and there is no need for the market participants to disclose their identities to each other, or subject themselves to credit or other investigations by a potential counterparty. For example, the exchange computing system insulates one market participant from the default by another market participant. Market participants need only meet the requirements of the exchange computing system. Anonymity among the market participants encourages a more liquid market environment as there are lower barriers to participation. The exchange computing system can accordingly offer benefits such as centralized and anonymous matching and clearing.

A match engine within a financial instrument trading system may comprise a transaction processing system that processes a high volume, e.g., millions, of messages or orders in one day. The messages are typically submitted from market participant computers. Exchange match engine systems may be subject to variable messaging loads due to variable market messaging activity. Performance of a match engine depends to a certain extent on the magnitude of the messaging load and the work needed to process that message at any given time. An exchange match engine may process large numbers of messages during times of high volume messaging activity. With limited processing capacity, high messaging volumes may increase the response time or latency experienced by market participants.

The disclosed embodiments recognize that electronic messages such as incoming messages from market participants, i.e., "outright" messages, e.g., trade order messages, etc., are sent from client devices associated with market participants, or their representatives, to an electronic trading or market system. For example, a market participant may submit an electronic message to the electronic trading system that includes an associated specific action to be undertaken by the electronic trading system, such as entering a new trade order into the market or modifying an existing order in the market. In one embodiment, if a participant wishes to modify a previously sent request, e.g., a prior order which has not yet been processed or traded, they may send a request message comprising a request to modify the prior request.

As used herein, a financial message, or an electronic message, refers both to messages communicated by market participants to an electronic trading or market system and vice versa. The messages may be communicated using packeting or other techniques operable to communicate information between systems and system components. Some messages may be associated with actions to be taken in the electronic trading or market system. The messages may include business level information, e.g., request to buy and/or sell a financial product. The messages may also include network level information, e.g., cancel on disconnect, that still have an effect on the match engine processing and resultant order books. In other words, a message may not include a financial request, but may include TCP level instructions to cancel messages upon the occurrence of an event. The occurrence of that event may then cause the exchange computing system to perform an action, e.g., cancel messages, which affects the order book and market data feeds.

Financial messages communicated to the electronic trading system, also referred to as "inbound" messages, may include associated actions that characterize the messages, such as trader orders, order modifications, order cancelations and the like, as well as other message types. Inbound messages may be sent from market participants, or their representatives, e.g., trade order messages, etc., to an electronic trading or market system. For example, a market participant may submit an electronic message to the electronic trading system that includes an associated specific action to be undertaken by the electronic trading system, such as entering a new trade order into the market or modifying an existing order in the market. In one exemplary embodiment, the incoming request itself, e.g., the inbound order entry, may be referred to as an iLink message. iLink is a bidirectional communications/message protocol/message format implemented by the Chicago Mercantile Exchange Inc. While the disclosure describes market participants submitting inbound messages that include requests, the exchange computing system may have the ability to cancel customer orders, initiate orders, and reverse or "bust" previously executed trades.

Financial messages communicated from the electronic trading system, referred to as "outbound" messages, may include messages responsive to inbound messages, such as confirmation messages, or other messages such as market update messages, quote messages, and the like. Outbound messages may be disseminated via data feeds.

Financial messages may further be categorized as having or reflecting an impact on a market or electronic marketplace, also referred to as an "order book" or "book," for a traded product, such as a prevailing price therefore, number of resting orders at various price levels and quantities thereof, etc., or not having or reflecting an impact on a market or a subset or portion thereof. In one embodiment, an electronic order book may be understood to be an electronic collection of the outstanding or resting orders for a financial instrument.

For example, a request to place a trade may result in a response indicative of the trade either being matched with, or being rested on an order book to await, a suitable counter-order. This response may include a message directed solely to the trader who submitted the order to acknowledge receipt of the order and report whether it was matched, and the extent thereto, or rested. The response may further include a message to all market participants reporting a change in the order book due to the order. This response may take the form of a report of the specific change to the order book, e.g., an order for quantity X at price Y was added to the book (referred to, in one embodiment, as a Market By Order message), or may simply report the result, e.g., price level Y now has orders for a total quantity of Z (where Z is the sum of the previous resting quantity plus quantity X of the new order). In some cases, requests may elicit a non-impacting response, such as temporally proximate to the receipt of the request, and then cause a separate market-impact reflecting response at a later time. For example, a stop order, fill or kill order, also known as an immediate or cancel order, or other conditional request may not have an immediate market impacting effect, if at all, until the requisite conditions are met.

In one embodiment, the disclosed system may include a Market Segment Gateway ("MSG") that is the point of ingress/entry and/or egress/departure for all transactions, i.e., the network traffic/packets containing the data therefore, specific to a single market at which the order of receipt of those transactions may be ascribed. An MSG or Market Segment Gateway may be utilized for the purpose of deterministic operation of the market. The electronic trading system may include multiple markets, and because the electronic trading system includes one MSG for each market/product implemented thereby, the electronic trading system may include multiple MSGs. For more detail on deterministic operation in a trading system, see U.S. patent application Ser. No. 14/074,667 entitled "Transactionally Deterministic High Speed Financial Exchange Having Improved, Efficiency, Communication, Customization, Performance, Access, Trading Opportunities, Credit Controls, And Fault Tolerance" and filed on Nov. 7, 2013, the entire disclosure of which is incorporated by reference herein and relied upon.

For example, a participant may send a request for a new transaction, e.g., a request for a new order, to the MSG. The MSG extracts or decodes the request message and determines the characteristics of the request message.

The MSG may include, or otherwise be coupled with, a buffer, cache, memory, database, content addressable memory, data store or other data storage mechanism, or combinations thereof, which stores data indicative of the characteristics of the request message. The request is passed to the transaction processing system, e.g., the match engine.

An MSG or Market Segment Gateway may be utilized for the purpose of deterministic operation of the market. Transactions for a particular market may be ultimately received at the electronic trading system via one or more points of entry, e.g., one or more communications interfaces, at which the disclosed embodiments apply determinism, which as described may be at the point where matching occurs, e.g., at each match engine (where there may be multiple match engines, each for a given product/market, or moved away from the point where matching occurs and closer to the point where the electronic trading system first becomes "aware" of the incoming transaction, such as the point where transaction messages, e.g., orders, ingress the electronic trading system. Generally, the terms "determinism" or "transactional determinism" may refer to the processing, or the appearance thereof, of orders in accordance with defined business rules. Accordingly, as used herein, the point of determinism may be the point at which the electronic trading system ascribes an ordering to incoming transactions/orders relative to other incoming transactions/orders such that the ordering may be factored into the subsequent processing, e.g., matching, of those transactions/orders as will be described. For more detail on deterministic operation in a trading system, see U.S. patent application Ser. No. 14/074,675, filed on Nov. 7, 2013, published as U.S. Patent Publication No. 2015/0127516, entitled "Transactionally Deterministic High Speed Financial Exchange Having Improved, Efficiency, Communication, Customization, Performance, Access, Trading Opportunities, Credit Controls, And Fault Tolerance", the entirety of which is incorporated by reference herein and relied upon.

Electronic trading of financial instruments, such as futures contracts, is conducted by market participants sending orders, such as to buy or sell one or more futures contracts, in electronic form to the exchange. These electronically submitted orders to buy and sell are then matched, if possible, by the exchange, i.e., by the exchange's matching engine, to execute a trade. Outstanding (unmatched, wholly unsatisfied/unfilled or partially satisfied/filled) orders are maintained in one or more data structures or databases referred to as "order books," such orders being referred to as "resting," and made visible, i.e., their availability for trading is advertised, to the market participants through electronic notifications/broadcasts, referred to as market data feeds. An order book is typically maintained for each product, e.g., instrument, traded on the electronic trading system and generally defines or otherwise represents the state of the market for that product, i.e., the current prices at which the market participants are willing buy or sell that product. As such, as used herein, an order book for a product may also be referred to as a market for that product.

Upon receipt of an incoming order to trade in a particular financial instrument, whether for a single-component financial instrument, e.g., a single futures contract, or for a multiple-component financial instrument, e.g., a combination contract such as a spread contract, a match engine, as described herein, will attempt to identify a previously received but unsatisfied order counter thereto, i.e., for the opposite transaction (buy or sell) in the same financial instrument at the same or better price (but not necessarily for the same quantity unless, for example, either order specifies a condition that it must be entirely filled or not at all).

Previously received but unsatisfied orders, i.e., orders which either did not match with a counter order when they were received or their quantity was only partially satisfied, referred to as a partial fill, are maintained by the electronic trading system in an order book database/data structure to await the subsequent arrival of matching orders or the occurrence of other conditions which may cause the order to be modified or otherwise removed from the order book.

If the match engine identifies one or more suitable previously received but unsatisfied counter orders, they, and the incoming order, are matched to execute a trade there between to at least partially satisfy the quantities of one or both the incoming order or the identified orders. If there remains any residual unsatisfied quantity of the identified one or more orders, those orders are left on the order book with their remaining quantity to await a subsequent suitable counter order, i.e., to rest. If the match engine does not identify a suitable previously received but unsatisfied counter order, or the one or more identified suitable previously received but unsatisfied counter orders are for a lesser quantity than the incoming order, the incoming order is placed on the order book, referred to as "resting", with original or remaining unsatisfied quantity, to await a subsequently received suitable order counter thereto. The match engine then generates match event data reflecting the result of this matching process. Other components of the electronic trading system, as will be described, then generate the respective order acknowledgment and market data messages and transmit those messages to the market participants.

Matching, which is a function typically performed by the exchange, is a process, for a given order which specifies a desire to buy or sell a quantity of a particular instrument at a particular price, of seeking/identifying one or more wholly or partially, with respect to quantity, satisfying counter orders thereto, e.g., a sell counter to an order to buy, or vice versa, for the same instrument at the same, or sometimes better, price (but not necessarily the same quantity), which are then paired for execution to complete a trade between the respective market participants (via the exchange) and at least partially satisfy the desired quantity of one or both of the order and/or the counter order, with any residual unsatisfied quantity left to await another suitable counter order, referred to as "resting." A match event may occur, for example, when an aggressing order matches with a resting order. In one embodiment, two orders match because one order includes instructions for or specifies buying a quantity of a particular instrument at a particular price, and the other order includes instructions for or specifies selling a (different or same) quantity of the instrument at a same or better price. It should be appreciated that performing an instruction associated with a message may include attempting to perform the instruction. Whether or not an exchange computing system is able to successfully perform an instruction may depend on the state of the electronic marketplace.

While the disclosed embodiments will be described with respect to a product by product or market by market implementation, e.g. implemented for each market/order book, it will be appreciated that the disclosed embodiments may be implemented so as to apply across markets for multiple products traded on one or more electronic trading systems, such as by monitoring an aggregate, correlated or other derivation of the relevant indicative parameters as described herein.

While the disclosed embodiments may be discussed in relation to futures and/or options on futures trading, it should be appreciated that the disclosed embodiments may be applicable to any equity, fixed income security, currency, commodity, options or futures trading system or market now available or later developed. It should be appreciated that a trading environment, such as a futures exchange as described herein, implements one or more economic markets where rights and obligations may be traded. As such, a trading environment may be characterized by a need to maintain market integrity, transparency, predictability, fair/equitable access and participant expectations with respect thereto. In addition, it should be appreciated that electronic trading systems further impose additional expectations and demands by market participants as to transaction processing speed, latency, capacity and response time, while creating additional complexities relating thereto. Accordingly, as will be described, the disclosed embodiments may further include functionality to ensure that the expectations of market participants are met, e.g., that transactional integrity and predictable system responses are maintained.

As was discussed above, electronic trading systems ideally attempt to offer an efficient, fair and balanced market where market prices reflect a true consensus of the value of products traded among the market participants, where the intentional or unintentional influence of any one market participant is minimized if not eliminated, and where unfair or inequitable advantages with respect to information access are minimized if not eliminated.

Financial instrument trading systems allow traders to submit orders and receive confirmations, market data, and other information electronically via electronic messages exchanged using a network. Electronic trading systems ideally attempt to offer a more efficient, fair and balanced market where market prices reflect a true consensus of the value of traded products among the market participants, where the intentional or unintentional influence of any one market participant is minimized if not eliminated, and where unfair or inequitable advantages with respect to information access are minimized if not eliminated.

Electronic marketplaces attempt to achieve these goals by using electronic messages to communicate actions and related data of the electronic marketplace between market participants, clearing firms, clearing houses, and other parties. The messages can be received using an electronic trading system, wherein an action or transaction associated with the messages may be executed. For example, the message may contain information relating to an order to buy or sell a product in a particular electronic marketplace, and the action associated with the message may indicate that the order is to be placed in the electronic marketplace such that other orders which were previously placed may potentially be matched to the order of the received message. Thus the electronic marketplace may conduct market activities through electronic systems.

The clearing house of an exchange clears, settles and guarantees matched transactions in contracts occurring through the facilities of the exchange. In addition, the clearing house establishes and monitors financial requirements for clearing members and conveys certain clearing privileges in conjunction with the relevant exchange markets.

The clearing house establishes clearing level performance bonds (margins) for all products of the exchange and establishes minimum performance bond requirements for customers of such products. A performance bond, also referred to as a margin requirement, corresponds with the funds that must be deposited by a customer with his or her broker, by a broker with a clearing member or by a clearing member with the clearing house, for the purpose of insuring the broker or clearing house against loss on open futures or options contracts. This is not a part payment on a purchase. The performance bond helps to ensure the financial integrity of brokers, clearing members and the exchange as a whole. The performance bond refers to the minimum dollar deposit required by the clearing house from clearing members in accordance with their positions. Maintenance, or maintenance margin, refers to a sum, usually smaller than the initial performance bond, which must remain on deposit in the customer's account for any position at all times. The initial margin is the total amount of margin per contract required by the broker when a futures position is opened. A drop in funds below this level requires a deposit back to the initial margin levels, i.e., a performance bond call. If a customer's equity in any futures position drops to or under the maintenance level because of adverse price action, the broker must issue a performance bond/margin call to restore the customer's equity. A performance bond call, also referred to as a margin call, is a demand for additional funds to bring the customer's account back up to the initial performance bond level whenever adverse price movements cause the account to go below the maintenance.

The exchange derives its financial stability in large part by removing debt obligations among market participants as they occur. This is accomplished by determining a settlement price at the close of the market each day for each contract and marking all open positions to that price, referred to as "mark to market." Every contract is debited or credited based on that trading session's gains or losses. As prices move for or against a position, funds flow into and out of the trading account. In the case of the CME, each business day by 6:40 a.m. Chicago time, based on the mark-to-the-market of all open positions to the previous trading day's settlement price, the clearing house pays to or collects cash from each clearing member. This cash flow, known as settlement variation, is performed by CME's settlement banks based on instructions issued by the clearing house. All payments to and collections from clearing members are made in "same-day" funds. In addition to the 6:40 a.m. settlement, a daily intra-day mark-to-the market of all open positions, including trades executed during the overnight GLOBEX®, the CME's electronic trading systems, trading session and the current day's trades matched before 11:15 a.m., is performed using current prices. The resulting cash payments are made intra-day for same day value. In times of extreme price volatility, the clearing house has the authority to perform additional intra-day mark-to-the-market calculations on open positions and to call for immediate payment of settlement variation. CME's mark-to-the-market settlement system differs from the settlement systems implemented by many other financial markets, including the interbank, Treasury securities, over-the-counter foreign exchange and debt, options, and equities markets, where participants regularly assume credit exposure to each other. In those markets, the failure of one participant can have a ripple effect on the solvency of the other participants. Conversely, CME's mark-to-the-market system does not allow losses to accumulate over time or allow a market participant the opportunity to defer losses associated with market positions.

While the disclosed embodiments may be described in reference to the CME, it should be appreciated that these embodiments are applicable to any exchange. Such other exchanges may include a clearing house that, like the CME clearing house, clears, settles and guarantees all matched transactions in contracts of the exchange occurring through its facilities. In addition, such clearing houses establish and monitor financial requirements for clearing members and convey certain clearing privileges in conjunction with the relevant exchange markets.

The disclosed embodiments are also not limited to uses by a clearing house or exchange for purposes of enforcing a performance bond or margin requirement. For example, a market participant may use the disclosed embodiments in a simulation or other analysis of a portfolio. In such cases, the settlement price may be useful as an indication of a value at risk and/or cash flow obligation rather than a performance bond. The disclosed embodiments may also be used by market participants or other entities to forecast or predict the effects of a prospective position on the margin requirement of the market participant.

An acknowledgement or confirmation of receipt, e.g., a non-market impacting communication, may be sent to the trader simply confirming that the order was received. Upon the conditions being met and a market impacting result thereof occurring, a market-impacting message may be transmitted as described herein both directly back to the submitting market participant and to all market participants (in a Market By Price "MBP" or Market By Order "MBO" format). It should be appreciated that additional conditions may be specified, such as a time or price limit, which may cause the order to be dropped or otherwise canceled and that such an event may result in another non-market-impacting communication instead. In some implementations, market impacting communications may be communicated separately from non-market impacting communications, such as via a separate communications channel or feed.

It should be further appreciated that various types of market data feeds may be provided which reflect different markets or aspects thereof. Market participants may then, for example, subscribe to receive those feeds of interest to them. For example, data recipient computing systems may choose to receive one or more different feeds. As market impacting communications usually tend to be more important to market participants than non-impacting communications, this separation may reduce congestion and/or noise among those communications having or reflecting an impact on a market or portion thereof. Furthermore, a particular market data feed may only communicate information related to the top buy/sell prices for a particular product, referred to as "top of book" feed, e.g., only changes to the top 10 price levels are communicated. Such limitations may be implemented to reduce consumption of bandwidth and message generation resources. In this case, while a request message may be considered market-impacting if it affects a price level other than the top buy/sell prices, it will not result in a message being sent to the market participants.

Examples of the various types of market data feeds which may be provided by electronic trading systems, such as the CME, in order to provide different types or subsets of market information or to provide such information in different formats include Market By Order, Market Depth (also known as Market by Price to a designated depth of the book), e.g., CME offers a 10-deep market by price feed, Top of Book (a single depth Market by Price feed), and combinations thereof. There may also be all manner of specialized feeds in terms of the content, i.e., providing, for example, derived data, such as a calculated index.

Market data feeds may be characterized as providing a "view" or "overview" of a given market, an aggregation or a portion thereof or changes thereto. For example, a market data feed, such as a Market By Price ("MBP") feed, may convey, with each message, the entire/current state of a market, or portion thereof, for a particular product as a result of one or more market impacting events. For example, an MBP message may convey a total quantity of resting buy/sell orders at a particular price level in response to a new order being placed at that price. An MBP message may convey a quantity of an instrument which was traded in response to an incoming order being matched with one or more resting orders. MBP messages may only be generated for events affecting a portion of a market, e.g., only the top 10 resting buy/sell orders and, thereby, only provide a view of that portion. As used herein, a market impacting request may be said to impact the "view" of the market as presented via the market data feed.

An MBP feed may utilize different message formats for conveying different types of market impacting events. For example, when a new order is rested on the order book, an MBP message may reflect the current state of the price level to which the order was added, e.g., the new aggregate quantity and the new aggregate number of resting orders. As can be seen, such a message conveys no information about the resting orders, including the newly rested order, themselves to the market participants. Only the submitting market participant, who receives a separate private message acknowledging the event, knows that it was their order that was added to the book. Similarly, when a trade occurs, an MBP message may be sent which conveys the price at which the instrument was traded, the quantity traded and the number of participating orders, but may convey no information as to whose particular orders contributed to the trade. MBP feeds may further batch reporting of multiple events, i.e., report the result of multiple market impacting events in a single message.

Alternatively, a market data feed, referred to as a Market By Order ("MBO") feed, may convey data reflecting a change that occurred to the order book rather than the result of that change, e.g., that order ABC for quantity X was added to price level Y or that order ABC and order XYZ traded a quantity X at a price Y. In this case, the MBO message identifies only the change that occurred so a market participant wishing to know the current state of the order book must maintain their own copy and apply the change reflected in the message to know the current state. As can be seen, MBO messages carry much more data because they reflect any market impacting change. Furthermore, because specific orders, but not the submitting traders thereof, are identified, other market participants may be able to follow that order as it progresses through the market, e.g., as it is modified, canceled, traded, etc.

It should be appreciated that the number, type and manner of market data feeds provided by an electronic trading system are implementation dependent and may vary depending upon the types of products traded by the electronic trading system, customer/trader preferences, bandwidth and data processing limitations, etc. and that all such feeds, now available or later developed, are contemplated herein. As such, MBP and MBO feeds may refer to categories/variations of market data feeds, distinguished by whether they provide an indication of the current state of a market resulting from a market impacting event (MBP) or an indication of the change in the current state of a market due to a market impacting event (MBO).

Messages, whether MBO or MBP, generated responsive to market impacting events which are caused by a single order, such as a new order, an order cancelation, an order modification, etc., are fairly simple and compact and easily created and transmitted. However, messages, whether MBO or MBP, generated responsive to market impacting events which are caused by more than one order, such as a trade, may require the transmission of a significant amount of data to convey the requisite information to the market participants. For trades involving a large number of orders, e.g., a buy order for a quantity of 5000 which matches 5000 sell orders each for a quantity of 1, a significant amount of information may need to be sent, e.g., data indicative of each of the 5000 trades that have participated in the market impacting event.

Furthermore, each participating trader needs to receive a notification that their particular order has traded. Continuing with the example, this may require sending 5001 individual trade notification messages, or even 10,000+ messages where each contributing side (buy vs. sell) is separately reported, in addition to the notification sent to all of the market participants.

As detailed in U.S. patent application Ser. No. 14/100, 788, the entirety of which is incorporated by reference herein and relied upon, it may be recognized that trade notifications sent to all market participants may include redundant information repeated for each participating trade and a structure of an MBP trade notification message may be provided which results in a more efficient communication of the occurrence of a trade. The message structure may include a header portion which indicates the type of transaction which occurred, i.e., a trade, as well as other general information about the event, an instrument portion which comprises data about each instrument which was traded as part of the transaction, and an order portion which comprises data about each participating order. In one embodiment, the header portion may include a message type, Transaction Time, Match Event Indicator, and Number of Market Data Entries ("No. MD Entries") fields. The instrument portion may include a market data update action indicator ("MD Update Action"), an indication of the Market Data Entry Type ("MD Entry Type"), an identifier of the instrument/security involved in the transaction ("Security ID"), a report sequence indicator ("Rpt Seq"), the price at which the instrument was traded ("MD Entry PX"), the aggregate quantity traded at the indicated price ("ConsTradeQty"), the number of participating orders ("NumberOfOrders"), and an identifier of the aggressor side ("Aggressor Side") fields. The order portion may further include an identifier of the participating order ("Order ID"), described in more detail below, and the quantity of the order traded ("MD Entry Size") fields. It should be appreciated that the particular fields included in each portion are implementation dependent and that different fields in addition to, or in lieu of, those listed may be included depending upon the implementation. It should be appreciated that the exemplary fields can be compliant with the FIX binary and/or FIX/FAST protocol for the communication of the financial information.

The instrument portion contains a set of fields, e.g., seven fields accounting for 23 bytes, which are repeated for each participating instrument. In complex trades, such as trades involving combination orders or strategies, e.g., spreads, or implied trades, there may be multiple instruments being exchanged among the parties. In one embodiment, the order portion includes only one field, accounting for 4 bytes, for each participating order which indicates the quantity of that order which was traded. As will be discussed below, the order portion may further include an identifier of each order, accounting for an additional 8 bytes, in addition to the quantity thereof traded. As should be appreciated, data which would have been repeated for each participating order, is consolidated or otherwise summarized in the header and instrument portions of the message thereby eliminating redundant information and, overall, significantly reducing the size of the message.

While the disclosed embodiments will be discussed with respect to an MBP market data feed, it should be appreciated that the disclosed embodiments may also be applicable to an MBO market data feed.

The embodiments may be described in terms of a distributed computing system. The particular examples identify a specific set of components useful in a futures and options exchange. However, many of the components and inventive features are readily adapted to other electronic trading environments. The specific examples described herein may teach specific protocols and/or interfaces, although it should be understood that the principles involved may be extended to, or applied in, other protocols and interfaces.

It should be appreciated that the plurality of entities utilizing or involved with the disclosed embodiments, e.g., the market participants, may be referred to by other nomenclature reflecting the role that the particular entity is performing with respect to the disclosed embodiments and that a given entity may perform more than one role depending upon the implementation and the nature of the particular transaction being undertaken, as well as the entity's contractual and/or legal relationship with another market participant and/or the exchange.

An exemplary trading network environment for implementing trading systems and methods is shown in FIG. 1. An exchange computer system 100 receives messages that include orders and transmits market data related to orders and trades to users, such as via wide area network 126 and/or local area network 124 and computer devices 114, 116, 118, 120 and 122, as described herein, coupled with the exchange computer system 100.

Herein, the phrase "coupled with" is defined to mean directly connected to or indirectly connected through one or more intermediate components. Such intermediate components may include both hardware and software based components. Further, to clarify the use in the pending claims and to hereby provide notice to the public, the phrases "at least one of <A>, <B>, . . . and <N>" or "at least one of <A>, <B>, . . . <N>, or combinations thereof" are defined by the Applicant in the broadest sense, superseding any other implied definitions herebefore or hereinafter unless expressly asserted by the Applicant to the contrary, to mean one or more elements selected from the group comprising A, B, . . . and N, that is to say, any combination of one or more of the elements A, B, . . . or N including any one element alone or in combination with one or more of the other elements which may also include, in combination, additional elements not listed.

Figure 2:
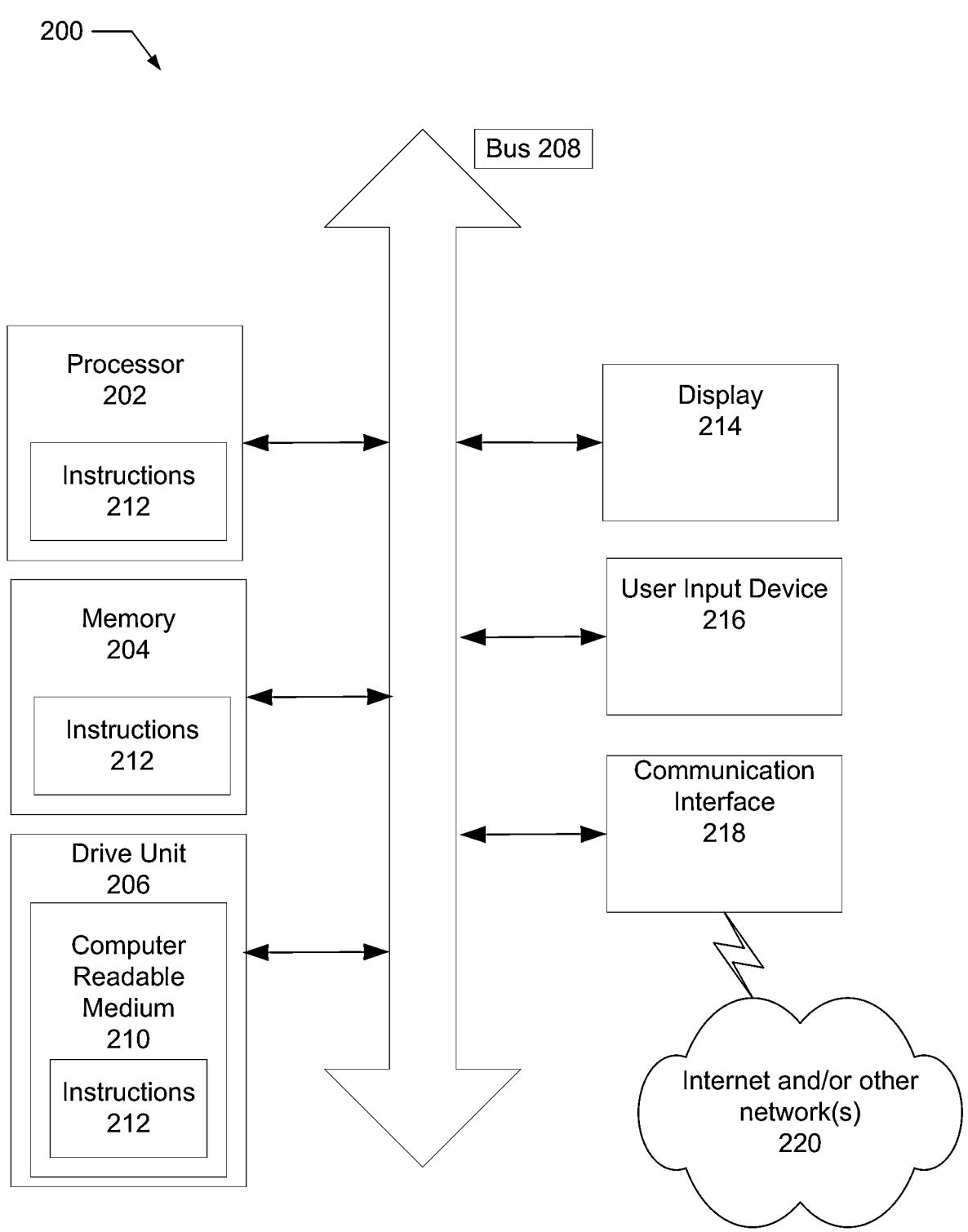
FIG. 2 depicts an illustrative embodiment of a general computer system for use with the disclosed embodiments.

The exchange computer system 100 may be implemented with one or more mainframe, desktop or other computers, such as the example computer 200 described herein with respect to FIG. 2. A user database 102 may be provided which includes information identifying traders and other users of exchange computer system 100, such as account numbers or identifiers, user names and passwords. An account data module 104 may be provided which may process account information that may be used during trades.

A match engine module 106 may be included to match bid and offer prices and may be implemented with software that executes one or more algorithms for matching bids and offers. A trade database 108 may be included to store information identifying trades and descriptions of trades. In particular, a trade database may store information identifying the time that a trade took place and the contract price. An order book module 110 may be included to compute or otherwise determine current bid and offer prices, e.g., in a continuous auction market, or also operate as an order accumulation buffer for a batch auction market.

A market data module 112 may be included to collect market data and prepare the data for transmission to users.

A risk management module 134 may be included to compute and determine a user's risk utilization in relation to the user's defined risk thresholds. The risk management module 134 may also be configured to determine risk assessments or exposure levels in connection with positions held by a market participant.

The risk management module 134 may be configured to administer, manage or maintain one or more margining mechanisms implemented by the exchange computer system 100. Such administration, management or maintenance may include managing a number of database records reflective of margin accounts of the market participants. In some embodiments, the risk management module 134 implements one or more aspects of the disclosed embodiments, including, for instance, principal component analysis (PCA) based margining, in connection with interest rate swap (IRS) portfolios, as described herein.

An order processing module 136 may be included to decompose delta-based, spread instrument, bulk and other types of composite orders for processing by the order book module 110 and/or the match engine module 106. The order processing module 136 may also be used to implement one or more procedures related to clearing an order.

A message management module 140 may be included to, among other things, receive, and extract orders from, electronic messages as is indicated with one or more aspects of the disclosed embodiments.

A settlement module 142 (or settlement processor or other payment processor) may be included to provide one or more functions related to settling or otherwise administering transactions cleared by the exchange. Settlement module 142 of the exchange computer system 100 may implement one or more settlement price determination techniques. Settlement-related functions need not be limited to actions or events occurring at the end of a contract term. For instance, in some embodiments, settlement-related functions may include or involve daily or other mark to market settlements for margining purposes. In some cases, the settlement module 142 may be configured to communicate with the trade database 108 (or the memory(ies) on which the trade database 108 is stored) and/or to determine a payment amount based on a spot price, the price of the futures contract or other financial instrument, or other price data, at various times. The determination may be made at one or more points in time during the term of the financial instrument in connection with a margining mechanism. For example, the settlement module 142 may be used to determine a mark to market amount on a daily basis during the term of the financial instrument. Such determinations may also be made on a settlement date for the financial instrument for the purposes of final settlement.

In some embodiments, the settlement module 142 may be integrated to any desired extent with one or more of the other modules or processors of the exchange computer system 100. For example, the settlement module 142 and the risk management module 134 may be integrated to any desired extent. In some cases, one or more margining procedures or other aspects of the margining mechanism(s) may be implemented by the settlement module 142.

It should be appreciated that concurrent processing limits may be defined by or imposed separately or in combination on one or more of the trading system components, including the user database 102, the account data module 104, the match engine module 106, the trade database 108, the order book module 110, the market data module 112, the risk management module 134, the order processing module 136, the message management module 140, the settlement module 142, or other component of the exchange computer system 100.

In an embodiment, the message management module 140, as coupled with the order book module 110, may be configured for receiving a plurality of electronic messages, each of the plurality of messages having an associated action to be executed within a designated period of time having a beginning time and an ending time, wherein at least one electronic message of the plurality of electronic messages comprises data representative of a particular time between the beginning and end of the period of time at which the action associated with the at least one electronic message is to be executed. The exchange computer system 100 may then be further configured to execute the action associated with the at least one temporally specific message at the particular time.

Figure 3:
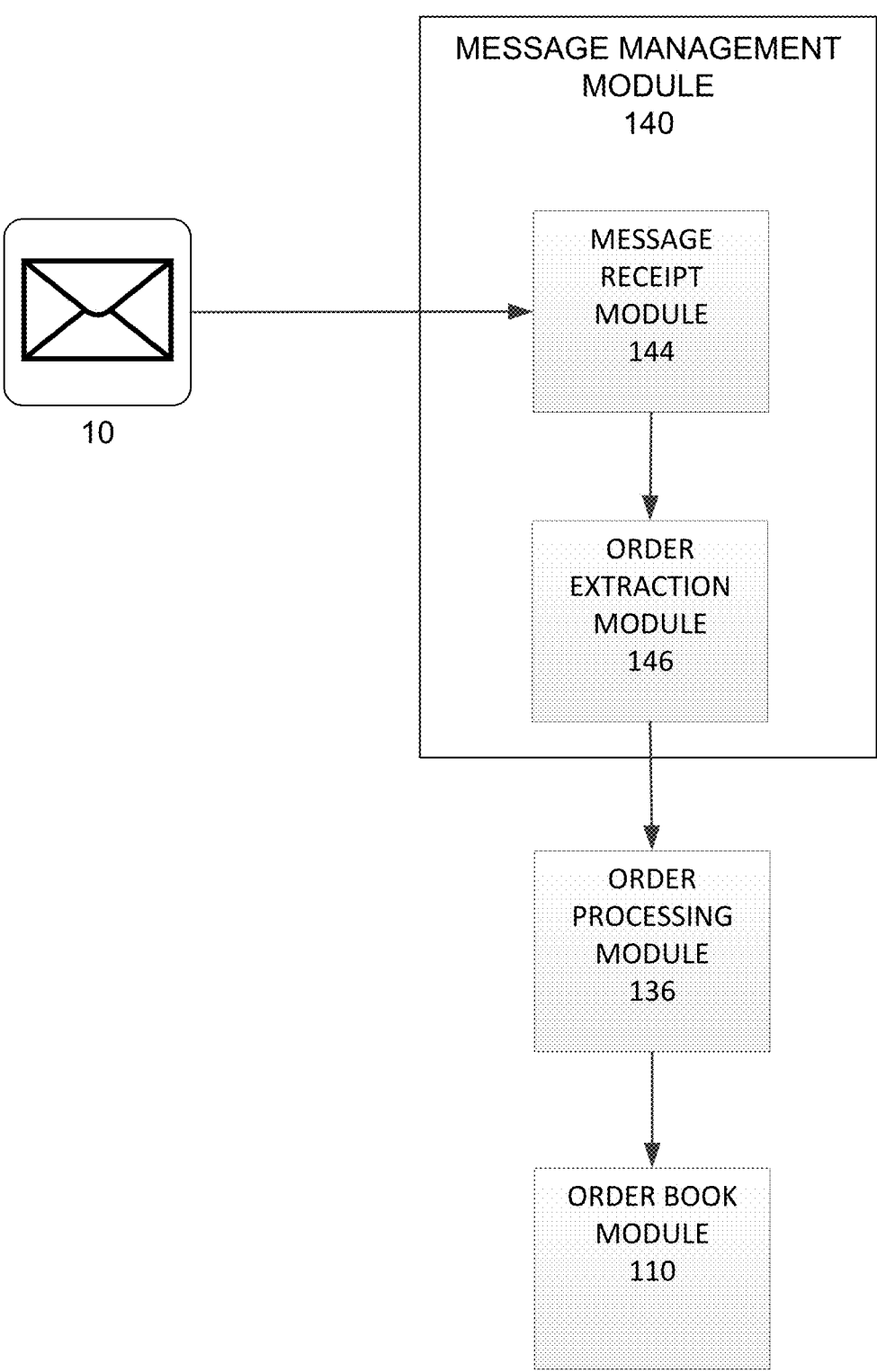
FIG. 3 depicts an example market order message management system for implementing the disclosed embodiments.

The message management module 140 may define a point of ingress into the exchange computer system 100 where messages are ordered and considered to be received by the system. This may be considered a point of determinism in the exchange computer system 100 that defines the earliest point where the system can ascribe an order of receipt to arriving messages. The point of determinism may or may not be at or near the demarcation point between the exchange computer system 100 and a public/internet network infrastructure. FIG. 3 provides additional details for the message management module 140.

The disclosed mechanisms may be implemented at any logical and/or physical point(s), or combinations thereof, at which the relevant information/data may be monitored or is otherwise accessible or measurable, including one or more gateway devices, modems, the computers or terminals of one or more market participants, etc.

One skilled in the art will appreciate that one or more modules described herein may be implemented using, among other things, a tangible computer-readable medium comprising computer-executable instructions (e.g., executable software code). Alternatively, modules may be implemented as software code, firmware code, specifically configured hardware or processors, and/or a combination of the aforementioned. For example the modules may be embodied as part of an exchange 100 for financial instruments. It should be appreciated the disclosed embodiments may be implemented as a different or separate module of the exchange computer system 100, or a separate computer system coupled with the exchange computer system 100 so as to have access to margin account record, pricing, and/or other data. As described herein, the disclosed embodiments may be implemented as a centrally accessible system or as a distributed system, e.g., where some of the disclosed functions are performed by the computer systems of the market participants.

As shown in FIG. 1, the exchange computer system 100 further includes a message management module 140 which may implement, in conjunction with the market data module 112, the disclosed mechanisms for managing electronic messages containing financial data sent between an exchange and a plurality of market participants, or vice versa. However, as was discussed above, the disclosed mechanisms may be implemented at any logical and/or physical point(s) through which the relevant message traffic, and responses thereto, flows or is otherwise accessible, including one or more gateway devices, modems, the computers or terminals of one or more traders, etc.

FIG. 3 illustrates an embodiment of market order message management as implemented using the message management module 140 and order book module 110 of the exchange computer system 100. As such, a message 10 may be received from a market participant at the exchange computer system 100 by a message receipt module 144 of the message management module 140. The message receipt module 144 processes the message 10 by interpreting the content of the message based on the message transmit protocol, such as the transmission control protocol ("TCP"), to provide the content of the message 10 for further processing by the exchange computer system.

For example, the message management module 140 may determine the transaction type of the transaction requested in a given message. A message may include an instruction to perform a type of transaction. The transaction type may be, in one embodiment, a request/offer/order to either buy or sell a specified quantity or units of a financial instrument at a specified price or value.

Further processing may be performed by the order extraction module 146. The order extraction module 146 may be configured to detect, from the content of the message 10 provided by the message receipt module 144, characteristics of an order for a transaction to be undertaken in an electronic marketplace. For example, the order extraction module 146 may identify and extract order content such as a price, product, volume, and associated market participant for an order. The order extraction module 146 may also identify and extract data indicating an action to be executed by the exchange computer system 100 with respect to the extracted order. The order extraction module may also identify and extract other order information and other actions associated with the extracted order. All extracted order characteristics, other information, and associated actions extracted from a message for an order may be collectively considered an order as described and referenced herein.

Order or message characteristics may include, for example, the state of the system after a message is received, arrival time (e.g., the time a message arrives at the MSG or Market Segment Gateway), message type (e.g., new, modify, cancel), and the number of matches generated by a message. Order or message characteristics may also include market participant side (e.g., buy or sell) or time in force (e.g., a good until end of day order that is good for the full trading day, a good until canceled ordered that rests on the order book until matched, or a fill or kill order that is canceled if not filled immediately).

The order may be communicated from the order extraction module 146 to an order processing module 136. The order processing module 136 may be configured to interpret the communicated order, and manage the order characteristics, other information, and associated actions as they are processed through an order book module 110 and eventually transacted on an electronic market. For example, the order processing module 136 may store the order characteristics and other content and execute the associated actions. In an embodiment, the order processing module may execute an associated action of placing the order into an order book for an electronic trading system managed by the order book module 110. In an embodiment, placing an order into an order book and/or into an electronic trading system may be considered a primary action for an order. The order processing module 136 may be configured in various arrangements, and may be configured as part of the order book module 110, part of the message management module 140, or as an independent functioning module.

The embodiments described herein utilize trade related electronic messages such as mass quote messages, individual order messages, modification messages, cancelation messages, etc., so as to enact trading activity in an electronic market. The trading entity and/or market participant may have one or multiple trading terminals associated with the session. Furthermore, the financial instruments may be financial derivative products. Derivative products may include futures contracts, options on futures contracts, futures contracts that are functions of or related to other futures contracts, swaps, swaptions, or other financial instruments that have their price related to or derived from an underlying product, security, commodity, equity, index, or interest rate product. In one embodiment, the orders are for options contracts that belong to a common option class. Orders may also be for baskets, quadrants, other combinations of financial instruments, etc. The option contracts may have a plurality of strike prices and/or comprise put and call contracts. A mass quote message may be received at an exchange. As used herein, an exchange computing system 100 includes a place or system that receives and/or executes orders.

In an embodiment, a plurality of electronic messages is received from the network. The plurality of electronic messages may be received at a network interface for the electronic trading system. The plurality of electronic messages may be sent from market participants. The plurality of messages may include order characteristics and be associated with actions to be executed with respect to an order that may be extracted from the order characteristics. The action may involve any action as associated with transacting the order in an electronic trading system. The actions may involve placing the orders within a particular market and/or order book of a market in the electronic trading system.

In an embodiment, the market may operate using characteristics that involve collecting orders over a period of time, such as a batch auction market. In such an embodiment, the period of time may be considered an order accumulation period. The period of time may involve a beginning time and an ending time, with orders placed in the market after the beginning time, and the placed order matched at or after the ending time. As such, the action associated with an order extracted from a message may involve placing the order in the market within the period of time. Also, electronic messages may be received prior to or after the beginning time of the period of time.

The electronic messages may also include other data relating to the order. In an embodiment, the other data may be data indicating a particular time in which the action is to be executed. As such, the order may be considered a temporally specific order. The particular time in which an action is undertaken may be established with respect to any measure of absolute or relative time. In an embodiment, the time in which an action is undertaken may be established with reference to the beginning time of the time period or ending time of the time period in a batch auction embodiment. For example, the particular time may be a specific amount of time, such as 10 milliseconds, prior to the ending time of an order accumulation period in the batch auction. Further, the order accumulation period may involve dissecting the accumulation period into multiple consecutive, overlapping, or otherwise divided, sub-periods of time. For example, the sub-periods may involve distinct temporal windows within the order accumulation period. As such, the particular time may be an indicator of a particular temporal window during the accumulation period. For example, the particular time may be specified as the last temporal window prior to the ending time of the accumulation period.

In an embodiment, the electronic message may also include other actions to be taken with respect to the order. These other actions may be actions to be executed after the initial or primary action associated with the order. For example, the actions may involve modifying or canceling an already placed order. Further, in an embodiment, the other data may indicate order modification characteristics. For example, the other data may include a price or volume change in an order. The other actions may involve modifying the already placed order to align with the order modification characteristics, such as changing the price or volume of the already placed order.

In an embodiment, other actions may be dependent actions. For example, the execution of the actions may involve a detection of an occurrence of an event. Such triggering events may be described as other data in the electronic message. For example, the triggering event may be a release of an economic statistic from an organization relating to a product being bought or sold in the electronic market, a receipt of pricing information from a correlated electronic market, a detection of a change in market sentiment derived from identification of keywords in social media or public statements of officials related to a product being bought or sold in the electronic market, and/or any other event or combination of events which may be detected by an electronic trading system.

In an embodiment, the action, or a primary action, associated with an order may be executed. For example, an order extracted from electronic message order characteristics may be placed into a market, or an electronic order book for a market, such that the order may be matched with other orders counter thereto.

In an embodiment involving a market operating using batch auction principles, the action, such as placing the order, may be executed subsequent to the beginning time of the order accumulation period, but prior to the ending time of the order accumulation period. Further, as indicated above, a message may also include other information for the order, such as a particular time the action is to be executed. In such an embodiment, the action may be executed at the particular time. For example, in an embodiment involving a batch auction process having sub-periods during an order accumulation period, an order may be placed during a specified sub-period of the order accumulation period. The disclosed embodiments may be applicable to batch auction processing, as well as continuous processing.

Also, it may be noted that messages may be received prior or subsequent to the beginning time of an order accumulation period. Orders extracted from messages received prior to the beginning time may have the associated actions, or primary actions such as placing the order, executed at any time subsequent to the beginning time, but prior to the ending time, of the order accumulation period when no particular time for the execution is indicated in the electronic message. In an embodiment, messages received prior to the beginning time but not having a particular time specified will have the associated action executed as soon as possible after the beginning time. Because of this, specifying a time for order action execution may allow a distribution and more definite relative time of order placement so as to allow resources of the electronic trading system to operate more efficiently.

In an embodiment, the execution of temporally specific messages may be controlled by the electronic trading system such that a limited or maximum number may be executed in any particular accumulation period, or sub-period. In an embodiment, the order accumulation time period involves a plurality of sub-periods involving distinct temporal windows, a particular time indicated by a message may be indicative of a particular temporal window of the plurality of temporal windows, and the execution of the at least one temporally specific message is limited to the execution of a specified sub-period maximum number of temporally specific messages during a particular sub-period. The electronic trading system may distribute the ability to submit temporally specific message to selected market participants. For example, only five temporally specific messages may be allowed in any one particular period or sub-period. Further, the ability to submit temporally specific messages within particular periods or sub-periods may be distributed based on any technique. For example, the temporally specific messages for a particular sub-period may be auctioned off or otherwise sold by the electronic trading system to market participants. Also, the electronic trading system may distribute the temporally specific messages to preferred market participants, or as an incentive to participate in a particular market.

In an embodiment, an event occurrence may be detected. The event occurrence may be the occurrence of an event that was specified as other information relating to an order extracted from an electronic message. The event may be a triggering event for a modification or cancelation action associated with an order. The event may be detected subsequent to the execution of the first action when an electronic message further comprises the data representative of the event and a secondary action associated with the order. In an embodiment involving a market operating on batch auction principles, the event may be detected subsequent to the execution of a first action, placing an order, but prior to the ending time of an order accumulation period in which the action was executed.

In an embodiment, other actions associated with an order may be executed. The other actions may be any action associated with an order. For example, the action may be a conditional action that is executed in response to a detection of an occurrence of an event. Further, in a market operating using batch auction principles, the conditional action may be executed after the placement of an order during an order accumulation period, but in response to a detection of an occurrence of an event prior to an ending time of the order accumulation period. In such an embodiment, the conditional action may be executed prior to the ending time of the order accumulation period. For example, the placed order may be canceled, or modified using other provided order characteristics in the message, in response to the detection of the occurrence of the event.

An event may be a release of an economic statistic or a fluctuation of prices in a correlated market. An event may also be a perceptible change in market sentiment of a correlated market. A change may be perceptible based on a monitoring of orders or social media for keywords in reference to the market in question. For example, electronic trading systems may be configured to be triggered for action by a use of keywords during a course of ongoing public statements of officials who may be in a position to impact markets, such as Congressional testimony of the Chairperson of the Federal Reserve System.

The other, secondary, or supplemental action may also be considered a modification of a first action executed with respect to an order. For example, a cancelation may be considered a cancelation of the placement of the order. Further, a secondary action may have other data in the message which indicates a specific time in which the secondary action may be executed. The specific time may be a time relative to a first action, or placement of the order, or relative to an accumulation period in a batch auction market. For example, the specific time for execution of the secondary action may be at a time specified relative and prior to the ending period of the order accumulation period. Further, multiple secondary actions may be provided for a single order. Also, with each secondary action a different triggering event may be provided.

In an embodiment, an incoming transaction may be received. The incoming transaction may be from, and therefore associated with, a market participant of an electronic market managed by an electronic trading system. The transaction may involve an order as extracted from a received message, and may have an associated action. The actions may involve placing an order to buy or sell a financial product in the electronic market, or modifying or deleting such an order. In an embodiment, the financial product may be based on an associated financial instrument which the electronic market is established to trade.

In an embodiment, the action associated with the transaction is determined. For example, it may be determined whether the incoming transaction comprises an order to buy or sell a quantity of the associated financial instrument or an order to modify or cancel an existing order in the electronic market. Orders to buy or sell and orders to modify or cancel may be acted upon differently by the electronic market. For example, data indicative of different characteristics of the types of orders may be stored.

In an embodiment, data relating to the received transaction is stored. The data may be stored in any device, or using any technique, operable to store and provide recovery of data. For example, a memory 204 or computer readable medium 210, may be used to store data, as is described with respect to FIG. 2 in further detail herein. Data may be stored relating received transactions for a period of time, indefinitely, or for a rolling most recent time period such that the stored data is indicative of the market participant's recent activity in the electronic market.

If and/or when a transaction is determined to be an order to modify or cancel a previously placed, or existing, order, data indicative of these actions may be stored. For example, data indicative of a running count of a number or frequency of the receipt of modify or cancel orders from the market participant may be stored. A number may be a total number of modify or cancel orders received from the market participant, or a number of modify or cancel orders received from the market participant over a specified time. A frequency may be a time based frequency, as in a number of cancel or modify orders per unit of time, or a number of cancel or modify orders received from the market participant as a percentage of total transactions received from the participant, which may or may not be limited by a specified length of time.

If and/or when a transaction is determined to be an order to buy or sell a financial product, or financial instrument, other indicative data may be stored. For example, data indicative of quantity and associated price of the order to buy or sell may be stored.

Data indicative of attempts to match incoming orders may also be stored. The data may be stored in any device, or using any technique, operable to store and provide recovery of data. For example, a memory 204 or computer readable medium 210, may be used to store data, as is described with respect to FIG. 2. The acts of the process as described herein may also be repeated. As such, data for multiple received transactions for multiple market participants may be stored and used as describe herein.

The order processing module 136 may also store data indicative of characteristics of the extracted orders. For example, the order processing module may store data indicative of orders having an associated modify or cancel action, such as by recording a count of the number of such orders associated with particular market participants. The order processing module may also store data indicative of quantities and associated prices of orders to buy or sell a product placed in the market order book 110, as associated with particular market participants.

Also, the order processing module 136 may be configured to calculate and associate with particular orders a value indicative of an associated market participant's market activity quality, which is a value indicative of whether the market participant's market activity increases or tends to increase liquidity of a market. This value may be determined based on the price of the particular order, previously stored quantities of orders from the associated market participant, the previously stored data indicative of previously received orders to modify or cancel as associated with the market participant, and previously stored data indicative of a result of the attempt to match previously received orders stored in association with the market participant. The order processing module 136 may determine or otherwise calculate scores indicative of the quality value based on these stored extracted order characteristics, such as an MQI as described herein.

Further, electronic trading systems may perform actions on orders placed from received messages based on various characteristics of the messages and/or market participants associated with the messages. These actions may include matching the orders either during a continuous auction process, or at the conclusion of a collection period during a batch auction process. The matching of orders may be by any technique.

The matching of orders may occur based on a priority indicated by the characteristics of orders and market participants associated with the orders. Orders having a higher priority may be matched before orders of a lower priority. This priority may be determined using various techniques. For example, orders that were indicated by messages received earlier may receive a higher priority to match than orders that were indicated by messages received later. Also, scoring or grading of the characteristics may provide for priority determination. Data indicative of order matches may be stored by a match engine and/or an order processing module 136, and used for determining MQI scores of market participants.

Generally, a market may involve market makers, such as market participants who consistently provide bids and/or offers at specific prices in a manner typically conducive to balancing risk, and market takers who may be willing to execute transactions at prevailing bids or offers may be characterized by more aggressive actions so as to maintain risk and/or exposure as a speculative investment strategy. From an alternate perspective, a market maker may be considered a market participant who places an order to sell at a price at which there is no previously or concurrently provided counter order. Similarly, a market taker may be considered a market participant who places an order to buy at a price at which there is a previously or concurrently provided counter order. A balanced and efficient market may involve both market makers and market takers, coexisting in a mutually beneficial basis. The mutual existence, when functioning properly, may facilitate liquidity in the market such that a market may exist with "tight" bid-ask spreads (e.g., small difference between bid and ask prices) and a "deep" volume from many currently provided orders such that large quantity orders may be executed without driving prices significantly higher or lower.

As such, both market participant types are useful in generating liquidity in a market, but specific characteristics of market activity taken by market participants may provide an indication of a particular market participant's effect on market liquidity. For example, a Market Quality Index ("MQI") of an order may be determined using the characteristics. An MQI may be considered a value indicating a likelihood that a particular order will improve or facilitate liquidity in a market. That is, the value may indicate a likelihood that the order will increase a probability that subsequent requests and transaction from other market participants will be satisfied. As such, an MQI may be determined based on a proximity of the entered price of an order to a midpoint of a current bid-ask price spread, a size of the entered order, a volume or quantity of previously filled orders of the market participant associated with the order, and/or a frequency of modifications to previous orders of the market participant associated with the order. In this way, an electronic trading system may function to assess and/or assign an MQI to received electronic messages to establish messages that have a higher value to the system, and thus the system may use computing resources more efficiently by expending resources to match orders of the higher value messages prior to expending resources of lower value messages.

While an MQI may be applied to any or all market participants, such an index may also be applied only to a subset thereof, such as large market participants, or market participants whose market activity as measured in terms of average daily message traffic over a limited historical time period exceeds a specified number. For example, a market participant generating more than 500, 1,000, or even 10,000 market messages per day may be considered a large market participant.

An exchange provides one or more markets for the purchase and sale of various types of products including financial instruments such as stocks, bonds, futures contracts, options, currency, cash, and other similar instruments. Agricultural products and commodities are also examples of products traded on such exchanges. A futures contract is a product that is a contract for the future delivery of another financial instrument such as a quantity of grains, metals, oils, bonds, currency, or cash. Generally, each exchange establishes a specification for each market provided thereby that defines at least the product traded in the market, minimum quantities that must be traded, and minimum changes in price (e.g., tick size). For some types of products (e.g., futures or options), the specification further defines a quantity of the underlying product represented by one unit (or lot) of the product, and delivery and expiration dates. As will be described, the exchange may further define the matching algorithm, or rules, by which incoming orders will be matched/allocated to resting orders.

Market participants, e.g., traders, use software to send orders or messages to the trading platform. The order identifies the product, the quantity of the product the trader wishes to trade, a price at which the trader wishes to trade the product, and a direction of the order (i.e., whether the order is a bid, i.e., an offer to buy, or an ask, i.e., an offer to sell). It will be appreciated that there may be other order types or messages that traders can send including requests to modify or cancel a previously submitted order.

The exchange computer system monitors incoming orders received thereby and attempts to identify, i.e., match or allocate, as described herein, one or more previously received, but not yet matched, orders, i.e., limit orders to buy or sell a given quantity at a given price, referred to as "resting" orders, stored in an order book database, wherein each identified order is contra to the incoming order and has a favorable price relative to the incoming order. An incoming order may be an "aggressor" order, i.e., a market order to sell a given quantity at whatever may be the current resting bid order price(s) or a market order to buy a given quantity at whatever may be the current resting ask order price(s). An incoming order may be a "market making" order, i.e., a market order to buy or sell at a price for which there are currently no resting orders. In particular, if the incoming order is a bid, i.e., an offer to buy, then the identified order(s) will be an ask, i.e., an offer to sell, at a price that is identical to or higher than the bid price. Similarly, if the incoming order is an ask, i.e., an offer to sell, the identified order(s) will be a bid, i.e., an offer to buy, at a price that is identical to or lower than the offer price.

An exchange computing system may receive conditional orders or messages for a data object, where the order may include two prices or values: a reference value and a stop value. A conditional order may be configured so that when a product represented by the data object trades at the reference price, the stop order is activated at the stop value. For example, if the exchange computing system's order management module includes a stop order with a stop price of 5 and a limit price of 1 for a product, and a trade at 5 (i.e., the stop price of the stop order) occurs, then the exchange computing system attempts to trade at 1 (i.e., the limit price of the stop order). In other words, a stop order is a conditional order to trade (or execute) at the limit price that is triggered (or elected) when a trade at the stop price occurs.

Stop orders also rest on, or are maintained in, an order book to monitor for a trade at the stop price, which triggers an attempted trade at the limit price. In some embodiments, a triggered limit price for a stop order may be treated as an incoming order.

Upon identification (matching) of a contra order(s), a minimum of the quantities associated with the identified order and the incoming order is matched and that quantity of each of the identified and incoming orders become two halves of a matched trade that is sent to a clearing house. The exchange computer system considers each identified order in this manner until either all of the identified orders have been considered or all of the quantity associated with the incoming order has been matched, i.e., the order has been filled. If any quantity of the incoming order remains, an entry may be created in the order book database and information regarding the incoming order is recorded therein, i.e., a resting order is placed on the order book for the remaining quantity to await a subsequent incoming order counter thereto.

It should be appreciated that in electronic trading systems implemented via an exchange computing system, a trade price (or match value) may differ from (i.e., be better for the submitter, e.g., lower than a submitted buy price or higher than a submitted sell price) the limit price that is submitted, e.g., a price included in an incoming message, or a triggered limit price from a stop order.

As used herein, "better" than a reference value means lower than the reference value if the transaction is a purchase transaction, and higher than the reference value if the transaction is a sell transaction. Said another way, for purchase transactions, lower values are better, and for relinquish or sell transactions, higher values are better.

Traders access the markets on a trading platform using trading software that receives and displays at least a portion of the order book for a market, i.e., at least a portion of the currently resting orders, enables a trader to provide parameters for an order for the product traded in the market, and transmits the order to the exchange computer system. The trading software typically includes a graphical user interface to display at least a price and quantity of some of the entries in the order book associated with the market. The number of entries of the order book displayed is generally preconfigured by the trading software, limited by the exchange computer system, or customized by the user. Some graphical user interfaces display order books of multiple markets of one or more trading platforms. The trader may be an individual who trades on his/her behalf, a broker trading on behalf of another person or entity, a group, or an entity. Furthermore, the trader may be a system that automatically generates and submits orders.

If the exchange computer system identifies that an incoming market order may be filled by a combination of multiple resting orders, e.g., the resting order at the best price only partially fills the incoming order, the exchange computer system may allocate the remaining quantity of the incoming, i.e., that which was not filled by the resting order at the best price, among such identified orders in accordance with prioritization and allocation rules/algorithms, referred to as "allocation algorithms" or "matching algorithms," as, for example, may be defined in the specification of the particular financial product or defined by the exchange for multiple financial products. Similarly, if the exchange computer system identifies multiple orders contra to the incoming limit order and that have an identical price which is favorable to the price of the incoming order, i.e., the price is equal to or better, e.g., lower if the incoming order is a buy (or instruction to purchase) or higher if the incoming order is a sell (or instruction to relinquish), than the price of the incoming order, the exchange computer system may allocate the quantity of the incoming order among such identified orders in accordance with the matching algorithms as, for example, may be defined in the specification of the particular financial product or defined by the exchange for multiple financial products.

An exchange responds to inputs, such as trader orders, cancelation, etc., in a manner as expected by the market participants, such as based on market data, e.g., prices, available counter-orders, etc., to provide an expected level of certainty that transactions will occur in a consistent and predictable manner and without unknown or unascertainable risks. Accordingly, the method by which incoming orders are matched with resting orders must be defined so that market participants have an expectation of what the result will be when they place an order or have resting orders and an incoming order is received, even if the expected result is, in fact, at least partially unpredictable due to some component of the process being random or arbitrary or due to market participants having imperfect or less than all information, e.g., unknown position of an order in an order book. Typically, the exchange defines the matching/allocation algorithm that will be used for a particular financial product, with or without input from the market participants. Once defined for a particular product, the matching/allocation algorithm is typically not altered, except in limited circumstance, such as to correct errors or improve operation, so as not to disrupt trader expectations. It will be appreciated that different products offered by a particular exchange may use different matching algorithms.

For example, a first-in/first-out (FIFO) matching algorithm, also referred to as a "Price Time" algorithm, considers each identified order sequentially in accordance with when the identified order was received. The quantity of the incoming order is matched to the quantity of the identified order at the best price received earliest, then quantities of the next earliest best price orders, and so on until the quantity of the incoming order is exhausted. Some product specifications define the use of a pro-rata matching algorithm, wherein a quantity of an incoming order is allocated to each of plurality of identified orders proportionally. Some exchange computer systems provide a priority to certain standing orders in particular markets. An example of such an order is the first order that improves a price (i.e., improves the market) for the product during a trading session. To be given priority, the trading platform may require that the quantity associated with the order is at least a minimum quantity. Further, some exchange computer systems cap the quantity of an incoming order that is allocated to a standing order on the basis of a priority for certain markets. In addition, some exchange computer systems may give a preference to orders submitted by a trader who is designated as a market maker for the product. Other exchange computer systems may use other criteria to determine whether orders submitted by a particular trader are given a preference. Typically, when the exchange computer system allocates a quantity of an incoming order to a plurality of identified orders at the same price, the trading host allocates a quantity of the incoming order to any orders that have been given priority. The exchange computer system thereafter allocates any remaining quantity of the incoming order to orders submitted by traders designated to have a preference, and then allocates any still remaining quantity of the incoming order using the FIFO or pro-rata algorithms. Pro-rata algorithms used in some markets may require that an allocation provided to a particular order in accordance with the pro-rata algorithm must meet at least a minimum allocation quantity. Any orders that do not meet or exceed the minimum allocation quantity are allocated to on a FIFO basis after the pro-rata allocation (if any quantity of the incoming order remains). More information regarding order allocation may be found in U.S. Pat. No. 7,853,499, the entirety of which is incorporated by reference herein and relied upon.

Other examples of matching algorithms which may be defined for allocation of orders of a particular financial product include:

Price Explicit Time
    Order Level Pro Rata
    Order Level Priority Pro Rata
    Preference Price Explicit Time
    Preference Order Level Pro Rata
    Preference Order Level Priority Pro Rata
    Threshold Pro-Rata
    Priority Threshold Pro-Rata
    Preference Threshold Pro-Rata
    Priority Preference Threshold Pro-Rata
    Split Price-Time Pro-Rata For example, the Price Explicit Time trading policy is based on the basic Price Time trading policy with Explicit Orders having priority over Implied Orders at the same price level. The order of traded volume allocation at a single price level may therefore be:

Explicit order with oldest timestamp first. Followed by
    Any remaining explicit orders in timestamp sequence (First In, First Out FIFO) next. Followed by
    Implied order with oldest timestamp next. Followed by
    Any remaining implied orders in timestamp sequence (FIFO).

In Order Level Pro Rata, also referred to as Price Pro Rata, priority is given to orders at the best price (highest for a bid, lowest for an offer). If there are several orders at this best price, equal priority is given to every order at this price and incoming business is divided among these orders in proportion to their order size. The Pro Rata sequence of events is:

1. Extract all potential matching orders at best price from the order book into a list.

2. Sort the list by order size, largest order size first. If equal order sizes, oldest timestamp first. This is the matching list.

3. Find the 'Matching order size, which is the total size of all the orders in the matching list.

4. Find the 'tradable volume', which is the smallest of the matching volume and the volume left to trade on the incoming order.

5. Allocate volume to each order in the matching list in turn, starting at the beginning of the list. If all the tradable volume gets used up, orders near the end of the list may not get allocation.

6. The amount of volume to allocate to each order is given by the formula:

(Order volume/Matching volume)*Tradable volume

The result is rounded down (for example, 21.99999999 becomes 21) unless the result is less than 1, when it becomes 1.

7. If tradable volume remains when the last order in the list had been allocated to, return to step 3.

Note: The matching list is not re-sorted, even though the volume has changed. The order which originally had the largest volume is still at the beginning of the list.

8. If there is still volume left to trade on the incoming order, repeat the entire algorithm at the next price level.

Order Level Priority Pro Rata, also referred to as Threshold Pro Rata, is similar to the Price (or 'Vanilla') Pro Rata algorithm but has a volume threshold defined. Any pro rata allocation below the threshold will be rounded down to 0. The initial pass of volume allocation is carried out in using pro rata; the second pass of volume allocation is carried out using Price Explicit Time. The Threshold Pro Rata sequence of events is:

1. Extract all potential matching orders at best price from the order book into a list.

2. Sort the list by explicit time priority, oldest timestamp first. This is the matching list.

3. Find the 'Matching volume', which is the total volume of all the orders in the matching list.

4. Find the 'tradable volume', which is the smallest of the matching volume and the volume left to trade on the incoming order.

5. Allocate volume to each order in the matching list in turn, starting at the beginning of the list.

6. The amount of volume to allocate to each order is given by the formula:

$$(Order\ volume/Matching\ volume)*Tradable\ volume$$

The result is rounded down to the nearest lot (for example, 21.99999999 becomes 21) unless the result is less than the defined threshold in which case it is rounded down to 0.

7. If tradable volume remains when the last order in the list had been allocated to, the remaining volume is allocated in time priority to the matching list.

8. If there is still volume left to trade on the incoming order, repeat the entire algorithm at the next price level.

In the Split Price Time Pro-Rata algorithms, a Price Time Percentage parameter is defined. This percentage of the matching volume at each price is allocated by the Price Explicit Time algorithm and the remainder is allocated by the Threshold Pro-Rata algorithm. There are four variants of this algorithm, with and without Priority and/or Preference. The Price Time Percentage parameter is an integer between 1 and 99. (A percentage of zero would be equivalent to using the respective existing Threshold Pro-Rata algorithm, and a percentage of 100 would be equivalent to using the respective existing Price Time algorithm). The Price Time Volume will be the residual incoming volume, after any priority and/or Preference allocation has been made, multiplied by the Price Time Percentage. Fractional parts will be rounded up, so the Price Time Volume will always be at least 1 lot and may be the entire incoming volume. The Price Time Volume is allocated to resting orders in strict time priority. Any remaining incoming volume after the Price Time Volume has been allocated will be allocated according to the respective Threshold Pro-Rata algorithm. The sequence of allocation, at each price level, is therefore:

1. Priority order, if applicable

2. Preference allocation, if applicable

3. Price Time allocation of the configured percentage of incoming volume

4. Threshold Pro-Rata allocation of any remaining incoming volume

5. Final allocation of any leftover lots in time sequence.

Any resting order may receive multiple allocations from the various stages of the algorithm.

It will be appreciated that there may be other allocation algorithms, including combinations of algorithms, now available or later developed, which may be utilized with the disclosed embodiments, and all such algorithms are contemplated herein. In one embodiment, the disclosed embodiments may be used in any combination or sequence with the allocation algorithms described herein.

One exemplary system for matching is described in U.S. patent application Ser. No. 13/534,499, filed on Jun. 27, 2012, entitled "Multiple Trade Matching Algorithms," published as U.S. Patent Application Publication No. 2014/0006243 A1, the entirety of which is incorporated by reference herein and relied upon, discloses an adaptive match engine which draws upon different matching algorithms, e.g., the rules which dictate how a given order should be allocated among qualifying resting orders, depending upon market conditions, to improve the operation of the market. For example, for a financial product, such as a futures contract, having a future expiration date, the match engine may match incoming orders according to one algorithm when the remaining time to expiration is above a threshold, recognizing that during this portion of the life of the contract, the market for this product is likely to have high volatility. However, as the remaining time to expiration decreases, volatility may decrease. Accordingly, when the remaining time to expiration falls below the threshold, the match engine switches to a different match algorithm which may be designed to encourage trading relative to the declining trading volatility. Thereby, by conditionally switching among matching algorithms within the same financial product, as will be described, the disclosed match engine automatically adapts to the changing market conditions of a financial product, e.g., a limited life product, in a non-preferential manner, maintaining fair order allocation while improving market liquidity, e.g., over the life of the product.

In one implementation, this trading system may evaluate market conditions on a daily basis and, based thereon, change the matching algorithm between daily trading sessions, i.e., when the market is closed, such that when the market reopens, a new trading algorithm is in effect for the particular product. As will be described, the disclosed embodiments may facilitate more frequent changes to the matching algorithms so as to dynamically adapt to changing market conditions, e.g., intra-day changes, and even intra-order matching changes. It will be further appreciated that hybrid matching algorithms, which match part of an order using one algorithm and another part of the order using a different algorithm, may also be used.

With respect to incoming orders, some traders, such as automated and/or algorithmic traders, attempt to respond to market events, such as to capitalize upon a mispriced resting order or other market inefficiency, as quickly as possible. This may result in penalizing the trader who makes an errant trade, or whose underlying trading motivations have changed, and who cannot otherwise modify or cancel their order faster than other traders can submit trades there against. It may considered that an electronic trading system that rewards the trader who submits their order first creates an incentive to either invest substantial capital in faster trading systems, participate in the market substantially to capitalize on opportunities (aggressor side/lower risk trading) as opposed to creating new opportunities (market making/higher risk trading), modify existing systems to streamline business logic at the cost of trade quality, or reduce one's activities and exposure in the market. The result may be a lesser quality market and/or reduced transaction volume, and corresponding thereto, reduced fees to the exchange.

With respect to resting orders, allocation/matching suitable resting orders to match against an incoming order can be performed, as described herein, in many different ways. Generally, it will be appreciated that allocation/matching algorithms are only needed when the incoming order quantity is less than the total quantity of the suitable resting orders as, only in this situation, is it necessary to decide which resting order(s) will not be fully satisfied, which trader(s) will not get their orders filled. It can be seen from the above descriptions of the matching/allocation algorithms, that they fall generally into three categories: time priority/first-in-first-out ("FIFO"), pro rata, or a hybrid of FIFO and pro rata.

As described above, matching systems apply a single algorithm, or combined algorithm, to all of the orders received for a particular financial product to dictate how the entire quantity of the incoming order is to be matched/allocated. In contrast, the disclosed embodiments may apply different matching algorithms, singular or combined, to different orders, as will be described, recognizing that the allocation algorithms used by the trading host for a particular market may, for example, affect the liquidity of the market. Specifically, some allocation algorithms may encourage traders to submit more orders, where each order is relatively small, while other allocation algorithms encourage traders to submit larger orders. Other allocation algorithms may encourage a trader to use an electronic trading system that can monitor market activity and submit orders on behalf of the trader very quickly and without intervention. As markets and technologies available to traders evolve, the allocation algorithms used by trading hosts must also evolve accordingly to enhance liquidity and price discovery in markets, while maintaining a fair and equitable market.

FIFO generally rewards the first trader to place an order at a particular price and maintains this reward indefinitely. So if a trader is the first to place an order at price X, no matter how long that order rests and no matter how many orders may follow at the same price, as soon as a suitable incoming order is received, that first trader will be matched first. This "first mover" system may commit other traders to positions in the queue after the first move traders. Furthermore, while it may be beneficial to give priority to a trader who is first to place an order at a given price because that trader is, in effect, taking a risk, the longer that the trader's order rests, the less beneficial it may be. For instance, it could deter other traders from adding liquidity to the marketplace at that price because they know the first mover (and potentially others) already occupies the front of the queue.

With a pro rata allocation, incoming orders are effectively split among suitable resting orders. This provides a sense of fairness in that everyone may get some of their order filled. However, a trader who took a risk by being first to place an order (a "market turning" order) at a price may end up having to share an incoming order with a much later submitted order. Furthermore, as a pro rata allocation distributes the incoming order according to a proportion based on the resting order quantities, traders may place orders for large quantities, which they are willing to trade but may not necessarily want to trade, in order to increase the proportion of an incoming order that they will receive. This results in an escalation of quantities on the order book and exposes a trader to a risk that someone may trade against one of these orders and subject the trader to a larger trade than they intended. In the typical case, once an incoming order is allocated against these large resting orders, the traders subsequently cancel the remaining resting quantity which may frustrate other traders. Accordingly, as FIFO and pro rata both have benefits and problems, exchanges may try to use hybrid allocation/matching algorithms which attempt to balance these benefits and problems by combining FIFO and pro rata in some manner. However, hybrid systems define conditions or fixed rules to determine when FIFO should be used and when pro rata should be used. For example, a fixed percentage of an incoming order may be allocated using a FIFO mechanism with the remainder being allocated pro rata.

Traders trading on an exchange including, for example, exchange computer system 100, often desire to trade multiple financial instruments in combination. Each component of the combination may be called a leg. Traders can submit orders for individual legs or in some cases can submit a single order for multiple financial instruments in an exchange-defined combination. Such orders may be called a strategy order, a spread order, or a variety of other names.

A spread instrument may involve the simultaneous purchase of one security and sale of a related security, called legs, as a unit. The legs of a spread instrument may be options or futures contracts, or combinations of the two. Trades in spread instruments are executed to yield an overall net position whose value, called the spread, depends on the difference between the prices of the legs. Spread instruments may be traded in an attempt to profit from the widening or narrowing of the spread, rather than from movement in the prices of the legs directly. Spread instruments are either "bought" or "sold" depending on whether the trade will profit from the widening or narrowing of the spread, respectively. An exchange often supports trading of common spreads as a unit rather than as individual legs, thus ensuring simultaneous execution of the two legs, eliminating the execution risk of one leg executing but the other failing.

One example of a spread instrument is a calendar spread instrument. The legs of a calendar spread instrument differ in delivery date of the underlier. The leg with the earlier occurring delivery date is often referred to as the lead month contract. A leg with a later occurring delivery date is often referred to as a deferred month contract. Another example of a spread instrument is a butterfly spread instrument, which includes three legs having different delivery dates. The delivery dates of the legs may be equidistant to each other. The counterparty orders that are matched against such a combination order may be individual, "outright" orders or may be part of other combination orders.

In other words, an exchange may receive, and hold or let rest on the books, outright orders for individual contracts as well as outright orders for spreads associated with the individual contracts. An outright order (for either a contract or for a spread) may include an outright bid or an outright offer, although some outright orders may bundle many bids or offers into one message (often called a mass quote).

A spread is an order for the price difference between two contracts. This results in the trader holding a long and a short position in two or more related futures or options on futures contracts, with the objective of profiting from a change in the price relationship. A typical spread product includes multiple legs, each of which may include one or more underlying financial instruments. A butterfly spread product, for example, may include three legs. The first leg may consist of buying a first contract. The second leg may consist of selling two of a second contract. The third leg may consist of buying a third contract. The price of a butterfly spread product may be calculated as:

$$\text{Butterfly} = \text{Leg1} - 2 \times \text{Leg2} + \text{Leg3} \qquad \text{(equation 1)}$$

In the above equation, Leg1 equals the price of the first contract, Leg2 equals the price of the second contract and Leg3 equals the price of the third contract. Thus, a butterfly spread could be assembled from two inter-delivery spreads in opposite directions with the center delivery month common to both spreads.

A calendar spread, also called an intra-commodity spread, for futures is an order for the simultaneous purchase and sale of the same futures contract in different contract months (i.e., buying a September CME S&P 500® futures contract and selling a December CME S&P 500 futures contract).

A crush spread is an order, usually in the soybean futures market, for the simultaneous purchase of soybean futures and the sale of soybean meal and soybean oil futures to establish a processing margin. A crack spread is an order for a specific spread trade involving simultaneously buying and selling contracts in crude oil and one or more derivative products, typically gasoline and heating oil. Oil refineries may trade a crack spread to hedge the price risk of their operations, while speculators attempt to profit from a change in the oil/gasoline price differential.

A straddle is an order for the purchase or sale of an equal number of puts and calls, with the same strike price and expiration dates. A long straddle is a straddle in which a long position is taken in both a put and a call option. A short straddle is a straddle in which a short position is taken in both a put and a call option. A strangle is an order for the purchase of a put and a call, in which the options have the same expiration and the put strike is lower than the call strike, called a long strangle. A strangle may also be the sale of a put and a call, in which the options have the same expiration and the put strike is lower than the call strike, called a short strangle. A pack is an order for the simultaneous purchase or sale of an equally weighted, consecutive series of four futures contracts, quoted on an average net change basis from the previous day's settlement price. Packs provide a readily available, widely accepted method for executing multiple futures contracts with a single transaction. A bundle is an order for the simultaneous sale or purchase of one each of a series of consecutive futures contracts. Bundles provide a readily available, widely accepted method for executing multiple futures contracts with a single transaction.

Thus an exchange may match outright orders, such as individual contracts or spread orders (which as discussed herein could include multiple individual contracts). The exchange may also imply orders from outright orders. For example, exchange computer system 100 may derive, identify and/or advertise, publish, display or otherwise make available for trading orders based on outright orders.

For example, two different outright orders may be resting on the books, or be available to trade or match. The orders may be resting because there are no outright orders that match the resting orders. Thus, each of the orders may wait or rest on the books until an appropriate outright counteroffer comes into the exchange or is placed by a user of the exchange. The orders may be for two different contracts that only differ in delivery dates. It should be appreciated that such orders could be represented as a calendar spread order. Instead of waiting for two appropriate outright orders to be placed that would match the two existing or resting orders, the exchange computer system may identify a hypothetical spread order that, if entered into the system as a tradable spread order, would allow the exchange computer system to match the two outright orders. The exchange may thus advertise or make available a spread order to users of the exchange system that, if matched with a tradable spread order, would allow the exchange to also match the two resting orders. Thus, the match engine is configured to detect that the two resting orders may be combined into an order in the spread instrument and accordingly creates an implied order.

In other words, the exchange's matching system may imply the counteroffer order by using multiple orders to create the counteroffer order. Examples of spreads include implied IN, implied OUT, 2nd- or multiple-generation, crack spreads, straddle, strangle, butterfly, and pack spreads. Implied IN spread orders are derived from existing outright orders in individual legs. Implied OUT outright orders are derived from a combination of an existing spread order and an existing outright order in one of the individual underlying legs. Implied orders can fill in gaps in the market and allow spreads and outright futures traders to trade in a product where there would otherwise have been little or no available bids and asks.

For example, implied IN spreads may be created from existing outright orders in individual contracts where an outright order in a spread can be matched with other outright orders in the spread or with a combination of orders in the legs of the spread. An implied OUT spread may be created from the combination of an existing outright order in a spread and an existing outright order in one of the individual underlying leg. An implied IN or implied OUT spread may be created when an electronic match system simultaneously works synthetic spread orders in spread markets and synthetic orders in the individual leg markets without the risk to the trader/broker of being double filled or filled on one leg and not on the other leg.

By linking the spread and outright markets, implied spread trading increases market liquidity. For example, a buy in one contract month and an offer in another contract month in the same futures contract can create an implied market in the corresponding calendar spread. An exchange may match an order for a spread product with another order for the spread product. Some existing exchanges attempt to match orders for spread products with multiple orders for legs of the spread products. With such systems, every spread product contract is broken down into a collection of legs and an attempt is made to match orders for the legs. Examples of implied spread trading include those disclosed in U.S. Patent Publication No. 2005/0203826, entitled "Implied Spread Trading System," the entire disclosure of which is incorporated by reference herein and relied upon. Examples of implied markets include those disclosed in U.S. Pat. No. 7,039,610, entitled "Implied Market Trading System," the entire disclosure of which is incorporated by reference herein and relied upon.

As an intermediary to electronic trading transactions, the exchange bears a certain amount of risk in each transaction that takes place. To that end, the clearing house implements risk management mechanisms to protect the exchange. One or more of the modules of the exchange computer system 100 may be configured to determine settlement prices for constituent contracts, such as deferred month contracts, of spread instruments, such as for example, settlement module 142.

One or more of the above-described modules of the exchange computer system 100 may be used to gather or obtain data to support the settlement price determination, as well as a subsequent margin requirement determination. For example, the order book module 110 and/or the market data module 112 may be used to receive, access, or otherwise obtain market data, such as bid-offer values of orders currently on the order books. The trade database 108 may be used to receive, access, or otherwise obtain trade data indicative of the prices and volumes of trades that were recently executed in a number of markets. In some cases, transaction data (and/or bid/ask data) may be gathered or obtained from open outcry pits and/or other sources and incorporated into the trade and market data from the electronic trading system(s).

In some cases, the outright market for the deferred month or other constituent contract may not be sufficiently active to provide market data (e.g., bid-offer data) and/or trade data. Spread instruments involving such contracts may nonetheless be made available by the exchange. The market data from the spread instruments may then be used to determine a settlement price for the constituent contract. The settlement price may be determined, for example, through a boundary constraint-based technique based on the market data (e.g., bid-offer data) for the spread instrument, as described in U.S. Patent Publication No. 2015/0073962 entitled "Boundary Constraint-Based Settlement in Spread Markets" ("the '962 Publication"), the entire disclosure of which is incorporated by reference herein and relied upon. Settlement price determination techniques may be implemented to cover calendar month spread instruments having different deferred month contracts.

The disclosed system may facilitate deterministic behavior, as described in the '224 Application. In particular, in one embodiment, an architecture for an electronic trading system is disclosed. As will be described in more detail below with respect to FIG. 4, the architecture implements a set of match engines, which may be identical/redundant or different, or a combination thereof. For example, in one embodiment, they may be redundant to improve fault tolerance. This set of match engines may include two or more match engines, such as three or five match engines.

In one embodiment, the exchange computing system may include two or more completely different implementations of a match engine (for example, one written entirely in Java, another written completely independently in C++, Python, etc.), whereby the internal states of the match engines could be different as they process the same input data stream, but all implementations of the match engines may be configured/programmed to formally provide the same output (e.g., the results should be the same, but the exact computational and algorithmic steps by which the software arrives at the results can vary).

Incoming transactions, e.g. orders to trade, are processed by an Orderer component, i.e., a transaction receiver, of the architecture which may augment each transaction with time signal data, or data indicative of a time of receipt or time or sequence indicative of a temporal or sequential relationship between a received transaction and other received transactions. The time signal data may be based on, for example, a system clock or the Orderer. The Orderer may additionally serialize, or otherwise sequence, the incoming transactions based on their order of receipt by the Orderer. In this manner, the Orderer is the point of determinism for the system as each transaction is augmented with an indicium, such as a time stamp or other sequence encoding, indicative of its order of receipt relative to the other received transactions, ensuring their ordered processing thereafter.

The sequenced transactions may then be substantially simultaneously communicated, e.g. broadcasted, to each match engine of the set of match engines, which may be intended to be redundant to each other, each of which then processes the transaction, based on the sequencing imparted by the orderer, and determines a result, referred to as a match event, indicative, for example, of whether the order to trade was matched with a prior order, or reflective of some other change in a state of an electronic marketplace, etc. As used herein, match events generally refer to information, messages, alerts, signals or other indicators, which may be electronically or otherwise transmitted or communicated, indicative of a status of, or updates/changes to, a market/order book, i.e. one or more databases/data structures which store and/or maintain data indicative of a market for, e.g. current offers to buy and sell, a financial product, described in more detail below, or the match engines associated therewith, and may include messages which are indicative of, or otherwise generated based upon:

REST—indicates that a new order has been placed on an order book but not matched with a previously received order counter thereto (this event may also be indicated by a series of price improvement match events or deep book change match events, which may both be considered rests);

FILL—indicates that a new incoming order matched with one or more previously received but unsatisfied orders which were resting on an order book resulting in a trade;

MOD—indicates that an existing/resting order's values (price, quantity, etc.) have been modified/changed;

CANCEL—indicates that an existing/resting order has been canceled/removed;

MARKET OPEN—indicates that a market for trading has opened;

MARKET CLOSE—indicates that a market for trading has closed;

MARKET HALT—indicates that a market for trading has been paused for some period of time due to internal restrictions (usually that price velocity has gotten too high);

NEW PRODUCT—indicates that a new product is available;

CLOSE/CANCEL PRODUCT—indicates that a product is removed from trading;

PRODUCT TRANSITION—indicates that the market for a product is transitioning state, e.g. opening, closing, pausing, or reserving;

TRADING SCHEDULES—indicates the market hours;

FIRST TRADE—indicates that a first trade for a product has been placed;

PRODUCT LIMITS—indicates the price limits for a product;

TRADE—indicates that a trade for a particular product has occurred;

BUST—indicates that a trade has been invalidated;

RFQ—indicates a request for quote, e.g. a request to send in orders for a particular product;

HEARTBEAT—indicates an administrative message of the electronic trading system used to ensure communications of market events are functioning properly;

or other event or status.

In one embodiment, even though the match engines may process the same financial transactions, each match engine may generally operate asynchronously with respect to the remaining match engines simplifying the implementation thereof, i.e. without complex interconnection or synchronization there between. Where the system is designed for the match engines to be redundant, the Decider, discussed below, may look for consistency in the results output of the match engines. If however the match engines are not intended to be redundant to each other, the results may not be compared or checked for consistency. Whether or not the results are desired to be identical or not may be an implementation feature. In one embodiment, the match engines may all attempt to process the same financial transaction in the same way, such that at any given moment, the match engines are synchronized.

As each match engine generates its result/match event, that result/match event is communicated to a Decider component of the architecture. The Decider collects the results/match events from at least a subset of the set of match engines and determines, of the received results, which is the correct result. In one embodiment, this determination may be based on a defined quorum vote, i.e. minimum number of match engines whose results must agree. This quorum may be a majority or super-majority of the match engines. The determined result/match event may then be provided to a market data component, for example, which updates data records, e.g. an order book, reflective of the match event and/or otherwise reports the match event to the market participants involved in the transaction, as well as the market as a whole, as will be described.

The Orderer component may also receive administrative instructions intended for the match engines. Thus, the Orderer, e.g., transaction receiver 410, may receive messages intended for the match engines, e.g., transaction processors 408, including instructions and transactions from multiple sources. For example, the transaction receiver 410 receives financial transactions from market participants which are sent to the transaction processors 408, and also receives administrative instructions from administrative systems 416 which are also sent to the transaction processors 408.

Moreover, each match engine, which may be implemented as a transaction processor, may receive a set of instructions independent of the financial transaction messages and administrative instructions, and may be configured to execute such instructions at a scheduled time. The scheduled instructions may be received, for example, by an administrator of the exchange computing system that includes the multiple transaction processors, i.e., the multiple match engines. In one embodiment, the administrative systems 416 may send to administrative instructions that are both scheduled (i.e., intended to occur at a predetermined time) and un-scheduled to the match engines.

The scheduled instructions may include instructions to cause a processor to perform at least one of: garbage collection; start processing financial transactions; stop processing financial transactions; update software for the transaction processor; enable the processing of financial transactions; disable the processing of financial transactions.

In one embodiment, where the transaction processors are implemented as match engines, starting and stopping processing of financial transactions may include opening and closing an electronic marketplace for a financial product, respectively.

In the case where the match engines are purposed to perform the same set of operations, each match engine may receive the same set of scheduled instructions, with the intention or desire that the match engines perform those scheduled instructions simultaneously, e.g., at the actual same time, or as close to it as possible, or in a coordinated manner, and in the same sequence with respect to the financial transaction messages. To this end, each scheduled instruction may include scheduled time data when the instruction should be executed. Each match engine may be configured to process or execute the scheduled instructions based on the time signal data augmented to each incoming financial transaction. The match engines may accordingly process the scheduled instructions based on, or relative to, a separately provided reference clock/clock time signal, e.g., time signal data which is augmented to each received message by the orderer.

Thus, in one embodiment, the system may execute previously received, scheduled instructions upon receiving a message including corresponding time signal data that is augmented to each incoming financial transaction. The receipt of a message including time signal data that corresponds to scheduled time data stored within previously received, scheduled instructions thus may act as a trigger for the match engines to execute the corresponding scheduled instructions.

The time signal data augmented to each incoming message may be in the same units as the scheduled time data included in the scheduled instructions. Thus, the match engine can readily compare the time signal data to the scheduled time data and determine whether the time signal data and the scheduled time data correspond to each other.

Accordingly, fault tolerant operation may be achieved via the match engines coupled with the Decider component which coalesces the results therefrom while deterministic operation is preserved via the sequencing of transactions by the Orderer component. Further, maintenance may be simplified by allowing faulty match engines to be reset or otherwise swapped out without impeding the processing of transactions. In addition, processing tasks, such as housekeeping tasks, e.g. garbage collection, which the processor implementing a match engine must periodically perform and which may impede that match engine's ability to process transactions, may be tolerated. Indeed, such tasks may be the scheduled or unscheduled administrative instructions referenced above. For example, a set of redundant match engines may be designed such that only one match engine at a time may perform such housekeeping or administrative tasks, while the remaining match engines continue to process transactions as usual. This may be implemented by transmitting a directive or administrative transaction to all of the match engines injected into the transaction stream, such as by an administrative component, e.g., Administrative Systems 416, coupled therewith. The directive/administrative transaction may act as a synchronizing transaction and/or a direction to instruct each match engine when to perform its housekeeping/maintenance tasks. The Decider component, via its normal operation as was described, may then ignore the lack of a result/match event from the particular match engine allowed to perform its housekeeping tasks, assuming it has received results from a sufficient number of the remaining match engines. In one implementation, the Decider may be further operative to determine when a match engine becomes non-responsive or otherwise faulty. In this embodiment, the threshold for determining a non-response match engine may be set to a value that is greater than the time it would take a match engine to perform its housekeeping tasks to avoid identifying that match engine as non-responsive. Once determined to be faulty, the match engine could then be removed from the quorum wherein the Decider evaluates and determines the result based on the results received from the remaining match engines using a modified quorum value, i.e. a lesser number of concurring results, to determine the correct result. It will be appreciated that the faulty match engine could then be rebooted, reinstated, restarted or otherwise replaced with the Decider then restoring full operation therewith.

As was described above, the Orderer component, by the nature of its role to sequence transactions for subsequent processing, may be designated the de facto point of determinism, alone or in concert with the network infrastructure which directs transactions thereto, for the system as, based on when it perceives receipt of transactions, defines the order in which those transactions will be further processed. Accordingly, it may be desirable to locate the Orderer close to the point at which transactions ingress, or are otherwise received by, the electronic trading system. In one implementation, the Orderer is implemented using an FPGA coupled, or otherwise integrated with, the network switch/gateway into which transactions are received from sources external to the electronic trading system. This allows the Orderer to receive transactions as quickly as possible, such as by bypassing the typical network hardware and software infrastructure. The network switch/gateway may then be further coupled with the set of match engines, which may be redundant to each other, allowing the Orderer to quickly communicate the sequenced transactions thereto.

Similarly, it may be further advantageous to report match events to market participants as quickly as possible. Accordingly, in one embodiment, the Decider may also be implemented in an FPGA, either the same as or different from the FPGA in which the Orderer is implemented, also coupled with the network switch/gateway which couples the electronic trading system with the external infrastructure that interconnects with the market participants. In this manner, match events can be communicated out of the electronic trading system as quickly as possible.

It will further be appreciated that to increase fault tolerance of the electronic trading system, the entire architecture, i.e. orderer, redundant match engines and decider, which may be collectively referred to as a "match engine quorum," may also be replicated in a redundant manner.

Fault tolerance implemented in an exchange computing system is also described in, for example, U.S. Pat. No. 7,434,096 "Match server for a financial exchange having fault tolerant operation", U.S. Pat. No. 7,480,827 "Fault Tolerance And Failover Using Active Copy-Cat", and U.S. Pat. No. 8,041,985 "Match Server For A Financial Exchange Having Fault Tolerant Operation" herein incorporated by reference.

Figure 4:
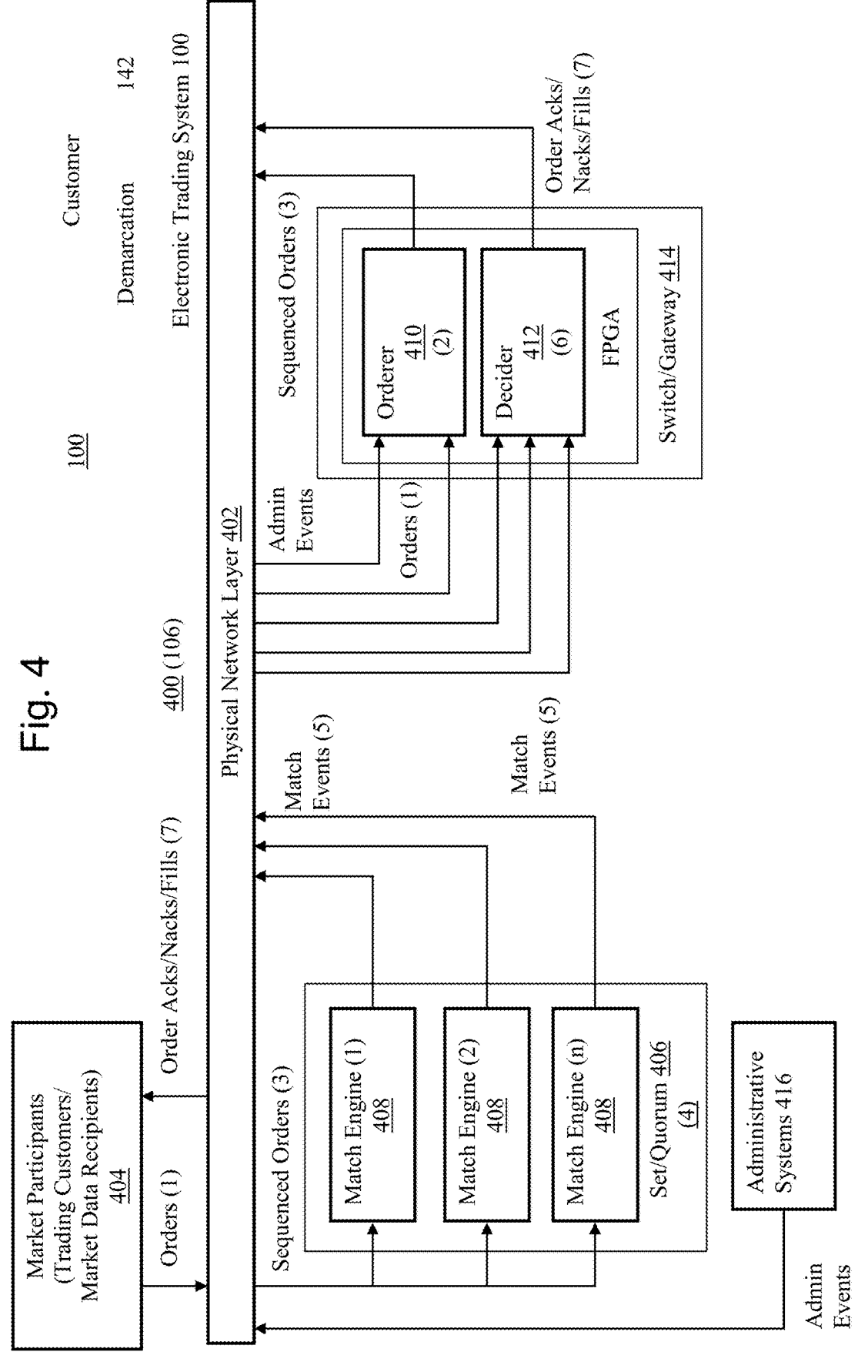
FIG. 4 depicts a block diagram of an exemplary implementation of the system of FIG. 1 according to one embodiment.

FIG. 4 shows a block diagram depicting, in more detail, the match engine 106 and order processing 136 function of the electronic trading system 100, according to one embodiment. It will be understood that numbers shown in parentheses next to arrows in this figure and in the other figures are indicative of one exemplary order of data flow through the depicted system and show how data/transactions enter the electronic trading system's 100 physical network layer 402 and are routed, processed and/or transformed by the components shown in the figure and described herein. As shown in FIG. 4, the electronic trading system 100 includes an interconnecting infrastructure, such as a physical communication network 402, which may include network devices such as gateways, switches, and interconnecting media there between, such as backplane interconnects, optical and electrical communications media or other wired or wireless interconnect. The interconnecting infrastructure generally couples the various components of the electronic trading system 100 together and with market participant devices 404 as was described.

The electronic trading system 100, as described above, includes a match engine function 106 which may be implemented by one or more sets 406 of transaction processors 408, i.e. match engines. While a single set 406 of match engines 408 will be described herein, it will be appreciated that many such sets 406 may be implemented both to improve fault tolerance through redundant operation and to increase the transaction handling capacity of the electronic trading system 100.

As used herein, a "match engine" 106 refers to either a match engine or a redundant set of match engines as described. Each of the plurality of match engines, e.g., redundant sets, implement at least one market, or order book representative thereof, for an associated financial instrument, e.g. futures, options contracts, a single contract therefore or a strategy/combination of contracts, such as a spread, wherein each associated financial instrument comprises at least one component wherein, for example, for a futures or options contract, the component is the contract itself and for a strategy/combination contract having more than one component wherein the components are the leg orders/contracts/instruments thereof, as was described above. Each of the plurality of match engines 106 is operative to attempt to match an incoming, e.g. received from a market participant or other source, order for a transaction, which may specify the side/intent (buy/sell), desired price and desired quantity and/or other parameters/conditions, for the associated financial instrument with at least one other previously received but unsatisfied, e.g. unmatched or only partially filled (resting), order for a transaction counter thereto for the associated financial instrument, to at least partially satisfy, e.g. partially fill, one or both of the incoming order or the at least one other previously received order, that is wherein each component, as governed by the transaction (distributively applied), is at least partially satisfied. In one embodiment, the systems 410 and 412 may be implemented as reconfigurable logic devices, e.g. FPGAs, and coupled with the match engines.

Coupled with the set 406 of redundant match engines 408 via the interconnecting infrastructure is the order processing 136 of the electronic trading system. In one embodiment, the order processing function 136 is implemented on one or more FPGA devices, i.e. by one or more logic components thereof, coupled with the network gateway device (not shown), such as via a backplane interconnect, through which incoming transactions ingress the electronic trading system 100 and outgoing messages egress the electronic trading system 100. The network gate way device is further coupled with the interconnecting infrastructure to which the set 406 of match engines 408 are also coupled. It will be appreciated that the set 406 of transaction processors may be coupled with the order processing function 136 via other means such as a dedicated interconnection there between. Further, as was discussed above, the disclosed mechanisms may be implemented at any logical and/or physical point(s) through which the relevant message traffic, and responses thereto, flows or is otherwise accessible, including one or more gateway devices, modems, the computers or terminals of one or more traders, etc.

As was described above, the order processing function 136 receives incoming transactions from the market participants 404 and ensures deterministic processing thereof, i.e. that the incoming transactions are processed according to the defined business rules of the electronic trading system 100, e.g. in the order in which they are received by the order processing function 136. Further, the order processing function 136 receives the output of each of the redundant match engines 408 of the set 406 and evaluates those results to determine the correct result. The order processing function 136 may then further generate, or cause to be generated, appropriate acknowledgements and/or market data based thereon which are then communicated to the market participants 404.

In particular, FIG. 4 depicts a block diagram of a system 400, which may also be referred to as an architecture, for processing a plurality, e.g. a series or sequence, of financial transactions, such as orders to trade a financial product, received via a network, such as the network 126 of FIG. 1, from a plurality of market participants 404, the processing of each transaction operative to cause a change in a current state of an electronic marketplace for one or more financial products. In one embodiment, each transaction may comprise a request to transact, e.g. an order to buy or sell, one or more financial products. A request to transact may further comprise a request to cancel a previous transaction, a status inquiry or other transaction.

The system 400 includes a transaction receiver 410, e.g. an orderer component as described above, which may be implemented as one or more logic components such as on an FPGA which may include a memory or reconfigurable component to store logic and processing component to execute the stored logic, coupled with the network 126, such as via the interconnection infrastructure 402, and operative to receive each of the plurality of financial transactions and, upon receipt, augment, or otherwise ascribe or associate with, the received financial transaction with time signal data, which may be based on a system clock of system 100, or a system clock associated with transaction receiver 410, or any type of sequential counter.

The transaction receiver 410 may also be operative to augment, or otherwise ascribe or associate with, the received financial transaction with sequence data, such as an ordering or sequence number, indicative of a relationship, temporal or otherwise based on business rules/logic, e.g. a deterministic relationship, between the received financial transaction, e.g. the time of receipt thereof, and any of the plurality of financial transactions, e.g. the times of receipt thereof, previously and/or subsequently received by the transaction receiver 410. The ascribed ordering may then implicitly define the relationship with those transactions received thereafter. In one embodiment, the ordering may be a time stamp or, alternatively, an incremented sequence number.

It should be appreciated that if the transaction receiver 410 augments the received financial transactions with time signal data and timestamp data, which may be the same data, the data may be used in different ways, as described herein. In particular, the time signal data may be used to achieve synchronization of scheduled events. For example, a timestamp may be used by the transaction receiver to determine an order in which the financial transactions are processed by the match engines downstream.

The system 400 also includes a plurality 406 of transaction processors 408, e.g. match engines, coupled with the transaction receiver 410, such as via the communications infrastructure 402, each of the plurality 406 of transaction processors 408 operative to compare the time signal data in each received augmented financial transaction with scheduled instructions stored in a memory coupled with each transaction processor.

The transaction processors 408 may also be operative to, upon determining that the time signal data in a received augmented financial transaction corresponds to one or more of the scheduled instructions, execute the one or more of the scheduled instructions.

In one embodiment, the scheduled instructions received by the plurality 406 of transaction processors 408 may be different. Alternatively, the scheduled instructions received by the plurality 406 of transaction processors 408 may be the same.

In one embodiment, the transaction receiver 410 may generate a timestamp message if the transaction receiver 410 has not received a financial transaction message in a predetermined amount of time, e.g., a market for a product is not very active. The timestamp message includes time signal data, and the timestamp message may then be received by each of the transaction processors. The transaction receiver 410 may thus inform each of the transaction processors as to the current time if the transaction receiver 410 has not received a financial transaction message in a predetermined amount of time. The transaction processors then can use the time signal data in the timestamp message to perform scheduled tasks.

The transaction processors 408 may also be operative to receive each of the augmented financial transactions and process, e.g. apply the business logic/matching algorithm to, the received augmented financial transaction in accordance with the sequence data to determine the change in the current state of the electronic marketplace caused thereby. As was described above, the processing is irrespective of the sequence in which each of the augmented financial transactions are received from the orderer, which may be different from the relationship indicated by the sequence data and which may result in a different change in the state of the electronic marketplace.

In one embodiment of the system 400, the processing of received augmented financial transactions implements a central limit order book of a financial market for at least one financial instrument.

In one embodiment of the system 400, each of the plurality 406 transaction processors 408 operates asynchronously with respect to the others of the plurality 406 of transaction processors 408, but, if operating properly, process the augmented financial transactions the, same, i.e. according to the sequence data and the applicable business rules. It will be appreciated that transaction processors 408 of redundant set 406 may be added or removed at will.

In one embodiment of the system 400 the relationship indicated by the sequence data of a particular augmented financial transaction with respect to others of the augmented financial transactions is different from a relationship indicated by the order of receipt by one or more of the plurality of transaction processors of the particular augmented financial transaction with respect to the others of the augmented financial transactions, such as due to underlying processing priorities, transmission and/or routing anomalies, and would result in a different state change in the electronic marketplace.

In one embodiment of the system 400, each of the financial transactions comprises a request to transact in one of the one or more financial products, the processing of each augmented financial transactions comprising identifying whether a previously processed augmented financial transaction remains incomplete and is counter thereto and, if so, indicating that a transaction there between may be completed, and if not, indicating that data indicative of the availability of the augmented financial transaction be stored in a database.

The system 400 further includes a result arbiter 412, e.g. a decider component as described above, which may be implemented as one or more logic components such as on the same or a different FPGA as the orderer 410, coupled with each of the plurality 406 of transaction processors 408, such as via the communications infrastructure 402, and operative to receive therefrom at least one of the determined changes in the state of the electronic marketplace for each processed augmented financial transaction and, based thereon, determine a selected change in the current state of the electronic marketplace for the processed augmented financial transaction and apply the selected change in the current state of the electronic marketplace to update the state of the electronic marketplace, the current state of the electronic marketplace now reflective thereof.

In one embodiment of the system 400, the transaction receiver 410 and result arbiter 412 are implemented in a network switch coupled with the data link layer/network layer of the communications infrastructure.

In one embodiment of the system 400, the result arbiter 412 is operative to compare the received determined changes in the state of the electronic marketplace for each processed augmented financial transaction, and determine the selected change in the current state of the electronic market place to be the received determined change in the state of the electronic marketplace for each processed augmented financial transaction provided by, for example, the majority or a quorum of the plurality of transaction processors.

In one embodiment, the system 400, the result arbiter 412 may further determine that a transaction processor 408 of the plurality 406 of transaction processors 408 is faulty when the determined change in the state of the electronic marketplace for a processed augmented financial transaction received therefrom fails to agree with the determined changes in the state of the electronic marketplace for a processed augmented financial transaction received from at least one other of the plurality 406 of transaction processors 408. The determination may be subject to a time delay threshold defining an amount of time which must elapse without having received a result before a fault is declared. As will be described, this threshold may be defined so as to prevent determination of a fault when a delayed result is expected, such as when a particular transaction processor 408 is known to be performing maintenance operations or is otherwise busy, offline or deactivated.

For example, in one embodiment of the system 400, each of the plurality 406 of transaction processors 408 is operative to periodically perform one or more other functions, such as maintenance, e.g. garbage collection, during which augmented financial transactions are not processed or processing is delayed. In this embodiment, each of the plurality 406 of transaction processor 408 may be further configured to not perform the one or more other functions contemporaneously with the performance of the one or more other functions by the remaining of the plurality 406 of transaction processors 408. Alternatively, more than one transaction processor 408 may be allowed to perform other operations assuming a sufficient number are remaining to meet a requisite level of fault tolerance.

In one embodiment of the system 400, the plurality of financial transactions may further include a plurality of administrative transactions, each of which may or may not cause a change in the current state of the electronic marketplace. Such administrative transactions may include instructions to configure the transaction processors 408, such as to synchronize their operation or cause them to perform maintenance or other operations, such as garbage collection.

A component such as Administrative systems 416, which may be coupled with any of the other components of the system 100, such as via the network infrastructure, may generate instructions that each match engine should execute. The instructions may be administrative in nature, such that the instructions may not cause a change in the current state of the electronic marketplace. For example, the administrative instructions may include instructions to configure the transaction processors 408, such as to synchronize their operation or cause them to perform maintenance or other operations. As used herein, synchronize may be a broad term that may include, for example:

Components performing or executing tasks in the same order, even if performed at different actual times (actual time meaning the time as observed and as agreed upon by time setting and measuring standards outside of the system in question, e.g., "wall clock time", e.g., measured independently of any clock of the system in question or under discussion, e.g., absolute time), such that the end results or end state of all components is identical;

Components performing tasks upon receiving a same message, e.g., components performing a scheduled task upon receiving a message indicating that a time associated with the scheduled task has occurred; or Components performing all of the same tasks in the same order at the same actual time, substantially the same actual time, or at different actual times;

Components performing some of the same tasks in the same relative order at the same actual time, substantially the same actual time, or at different actual times.

In one embodiment, synchronized may mean according to any desired timing sequence, whether regular, irregular, and/or wholly or partially simultaneous.

It may be useful to synchronize the execution of processing in multiple networked computing resources such that the processing is in a substantially concurrent manner.

For example, if component 2 performs tasks A, B, and C in the same order as component 1 but 10 actual minutes after component 1 performs these tasks, components 1 and 2 may be considered to be synchronized. In one embodiment, synchronized may mean that the tasks are coordinated. In one embodiment, the tasks may be coordinated around receipt of a timing message or other occurrence of an event.

It should also be appreciated that the multiple components and systems discussed herein may be synchronized or coordinated to process all of the same transactions/instructions (e.g., be redundant). The systems and components discussed herein may be configured to be immediately consistent (e.g., process all of the same transactions/instructions at the same or substantially same actual or real time) or to be eventually consistent (e.g., process all of the same transactions/instructions at different actual or real time).

In one embodiment, eventually consistent systems may be optimized so that one component is optimized to perform one type of transaction and prioritizes performing that transaction type, another component is optimized to perform another type of transaction and prioritizes performing that transaction type, and the decider/arbiter described herein selects, as described herein, the results of performing a given transaction from the component optimized/prioritized to perform that type of transaction. For example, the decider/ arbiter may forward or send the selected result to another component.

Moreover, the multiple components and systems discussed herein may be synchronized or coordinated to process some of the same transactions/instructions in a coordinated manner (e.g., the common transactions/instructions may all start or stop relative to a common event, e.g., the receipt of a timing message). The multiple components and systems discussed herein may be synchronized or coordinated to process the same or different transactions but against commonly shared data.

Thus, the match engines may receive messages from multiple sources. For example, the match engines may receive financial transactions to perform an action on a financial product that changes the state of an electronic marketplace for that financial product, e.g., customer orders, from one source, e.g., market participant computers. The match engines may also receive instructions to perform administrative operations, e.g., administrative instructions, from another source.

It may be desirable to control when match engines perform such administrative instructions, or in which sequence to perform the messages from the multiple sources. For example, it may be desirable to cause all of the match engines to perform an administrative instruction, such as closing the market, garbage collection, or software updates, in synchronization and/or coordination. Some instructions may be large (e.g., in terms of byte size, quantity of packets), such as messages to open or close a market) and therefore may take a long time to transmit to, or be processed via, a single transaction receiver. In a computerized financial exchange environment, passing large messages through a single point of entry or determinism can lead to undesirable latency, because all events would be limited to the throughput rate of the single point, e.g., the transaction receiver 410. Yet, as discussed herein, the transaction receiver 410, with its sequencing and ordering functionalities for messages/ instructions/transactions received from different sources, may be necessary to ensure determinism.

The system 400 accordingly may be configured to generate operations or instructions to be processed by the match engines as well as instruction identifiers corresponding to each generated instruction. Instruction identifiers may be identifiers that uniquely correspond to system instructions, or to administrative transactions. For example, the Administrative systems component 416 may generate instructions that should be processed by one or more of the match engines as well as instruction identifiers corresponding to each generated instruction.

The plurality 406 of transaction processors 408, e.g. match engines, may be coupled with the Administrative systems component 416, such as via the communications infrastructure 402, each of the plurality 406 of transaction processors 408 operative to receive the instructions and instruction identifiers from the Administrative systems component 416. Each transaction processor 408 may store, but not execute, the received instruction in a cache or memory that is readily accessible. In other words, the match engines may receive the instructions but not process them upon receipt. Instead, the match engines may store them such that they are instantly, or at least substantially, instantly accessible. Instead of accessing the instructions when they are to be executed, the match engines receive and store them so that when the instructions are to be executed, there is substantially no latency or delay due to accessing the instructions, e.g. no transmission delay as they are already at the match engine.

Or, in one embodiment, the delay for accessing the instructions may be minimized by sending the instructions before they are to be executed. For example, sending instructions to a match engine 408 from the Administrative systems component 416 may require a first amount of time, or a first delay, e.g. due to memory read latency, etc. The instructions may be stored by the match engine, as described above, before being executed. When an instruction identifier is received identifying the instruction to be executed, the match engine may retrieve the stored instruction. Retrieving the instruction may require a second amount of time, or a second delay, e.g. due to memory read latency, etc. Notably, the first time or delay may be much greater than the second time or delay.

The transaction receiver 410 may also be operative to receive instruction identifiers from other components of the system 400, such as the Administrative systems component 416. The transaction receiver 410 may also be operative to augment, or otherwise ascribe or associate with, received instruction identifiers with sequence data, such as an ordering or sequence number, indicative of a relationship, temporal or otherwise based on business rules/logic, e.g. a deterministic relationship, between the received instruction identifier, e.g. the time of receipt thereof, and any of the plurality of instruction identifiers, e.g. the times of receipt thereof, previously and/or subsequently received by the transaction receiver 410. The ascribed ordering may then implicitly define the relationship with those instruction identifiers received thereafter. In one embodiment, the ordering may be a time stamp or, alternatively, an incremented sequence number.

It should be appreciated that if the transaction receiver 410 augments the received instruction identifiers with time signal data and timestamp data, which may be the same data, the data may be used in different ways, as described herein. In particular, the time signal data may be used to achieve synchronization of scheduled events. For example, a timestamp may be used by the transaction receiver to determine an order in which the instruction identifiers are processed by the match engines downstream.

The plurality 406 of transaction processors 408, e.g. match engines, may be coupled with the transaction receiver 410, such as via the communications infrastructure 402. For example, the transaction receiver 410 may receive instruction identifiers from the Administrative systems component 416 and augment them with sequence data as described herein. The transaction processors 408 may be operative to receive each of the augmented instruction identifiers and retrieve, from the local or readily accessible cache or memory, the instructions corresponding to each received augmented instruction identifier in accordance with the sequence data to perform the proper administrative operation.

As discussed herein, because the instructions are readily accessible, e.g., stored in a memory local to each transaction processor, the transaction processor can execute or process the correct instruction substantially immediately, e.g. without having to wait to receive the instruction, upon looking up the instruction based on the received augmented instruction identifier. For example, the system may implement a Content Addressable Memory (CAM).

As was described above, the processing performed by the transaction processors 408 is irrespective of the sequence in which each of the augmented instruction identifiers are received from the orderer, which may be different from the relationship indicated by the sequence data and which may result in a different change in the operation of transaction processors.

In one embodiment of the system 400, the processing of received augmented instruction identifiers controls or modifies the operation of the transaction processors but does not relate to or change the state of the electronic marketplace for a financial instrument.

In one embodiment of the system 400, each of the plurality 406 transaction processors 408 operates asynchronously with respect to the others of the plurality 406 of transaction processors 408, but, if operating properly, process the augmented instruction identifiers the, same, i.e. according to the sequence data and the applicable business rules. It will be appreciated that transaction processors 408 of redundant set 406 may be added or removed at will.

In one embodiment of the system 400 the relationship indicated by the sequence data of a particular augmented instruction identifier with respect to others of the augmented instruction identifiers is different from a relationship indicated by the order of receipt by one or more of the plurality of transaction processors of the particular augmented instruction identifier with respect to the others of the augmented instruction identifiers, such as due to underlying processing priorities, transmission and/or routing anomalies, and would result in a different operation of a transaction processor.

The system 400 further includes a result arbiter 412, e.g. a decider component as described above, which may be implemented as one or more logic components such as on the same or a different FPGA as the orderer 410, coupled with each of the plurality 406 of transaction processors 408, such as via the communications infrastructure 402, and operative to receive therefrom at least one of the determined changes in the operation of the transaction processor for each processed augmented instruction identifier and, based thereon, determine a selected change in the current operation of the transaction processor for the processed augmented instruction identifier and apply the selected change in the current operation of the transaction processor.

In one embodiment of the system 400, the transaction receiver 410 and result arbiter 412 are implemented in a network switch coupled with the data link layer/network layer of the communications infrastructure.

In one embodiment of the system 400, the result arbiter 412 is operative to compare the received determined changes in the operation of the transaction processor for each processed augmented instruction identifier, and determine the selected change in the current operation of the transaction processor to be the received determined change in the operation of the transaction processor for each processed augmented instruction identifier provided by, for example, the majority or a quorum of the plurality of transaction processors.

In one embodiment, the system 400, the result arbiter 412 may further determine that a transaction processor 408 of the plurality 406 of transaction processors 408 is faulty when the determined change in the operation of the transaction processor for each processed augmented instruction identifier received therefrom fails to agree with the determined changes in the operation of the transaction processor for each processed augmented instruction identifier received from at least one other of the plurality 406 of transaction processors 408. The determination may be subject to a time delay threshold defining an amount of time which must elapse without having received a result before a fault is declared. As will be described, this threshold may be defined so as to prevent determination of a fault when a delayed result is expected, such as when a particular transaction processor 408 is known to be performing maintenance operations or is otherwise busy, offline or deactivated.

For example, in one embodiment of the system 400, each of the plurality 406 of transaction processors 408 is operative to periodically perform one or more other functions, such as maintenance, e.g. garbage collection, during which augmented instruction identifiers are not processed or processing is delayed. In this embodiment, each of the plurality 406 of transaction processor 408 may be further configured to not perform the one or more other functions contemporaneously with the performance of the one or more other functions by the remaining of the plurality 406 of transaction processors 408. Alternatively, more than one transaction processor 408 may be allowed to perform other operations assuming a sufficient number are remaining to meet a requisite level of fault tolerance.

While the disclosed embodiments are described with respect to a single orderer or transaction receiver, it should be appreciated that multiple orderers may be provided and configured to provide guaranteed ordering that a single orderer provides. For example, the exchange computing system may include N orderers, and the delta/difference of cable lengths between the orderers may be the same. Or, the exchange computing system may include N orderers, and the delta/difference of cable lengths between the orderers and one or more client computers may be the same. For example, all of the different inputs, e.g., the different client computers, may communicate with different orderers, but each client computer has the same relative distance to its respective orderer. In these multiple orderer embodiments, the exchange computing system with multiple orderers could be used to guarantee a same ordering that a single orderer provides.

Figure 5A:
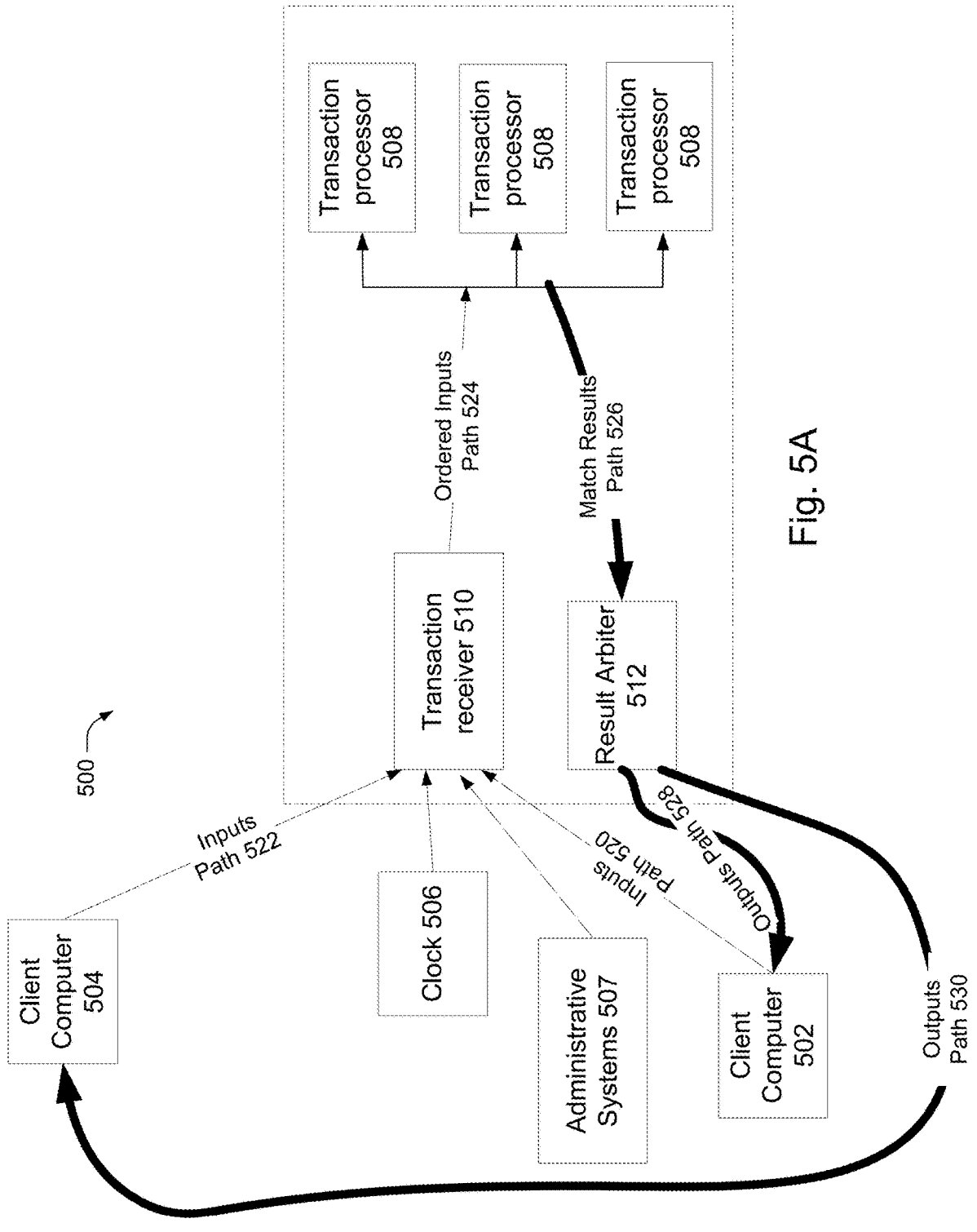
FIG. 5A illustrates an example exchange computing system for implementing the disclosed embodiments.

FIG. 5A illustrates an example system 500 including certain components of the systems of FIGS. 1 and/or 4. System 500 may be the same as, or alternatives of, systems 100 and 400. As shown in FIG. 5A, the transaction receiver 510 may receive messages from several sources. The sources may include client computers 502 and 504, clock 506, and administrative systems 507. Client computers 502 and 504 may send financial transactions to transaction receiver 510. The financial transactions may include instructions to buy and/or sell one or more financial products and may cause a change in the state of an electronic marketplace associated with the financial products. The clock 506 may be a hardware unit, such as the Solarflare Precision Time Protocol (PTP)™ hardware. Clock 506 provides a single source of time, which, as described herein, may be used to augment messages with time signal data, e.g., to schedule instructions or to facilitate determinism. Administrative systems 507 may send physical and functional configuration data to transaction receiver 510 that modifies a physical configuration of a transaction processor (such as garbage collection details, what ports should be utilized, how many CPUs should be utilized, or how much RAM should be utilized), or that modifies a functional configuration of a transaction processor (such as indicating why types of orders should be allowed, which types of orders should be rejected, which market should be processed, which asset should be processed, whether pre-opening transactions should be processed, and velocity logic configurations).

The data path for messages sent from client computer 502 to transaction receiver 510 is path 520, and the data path for messages sent from client computer 504 to transaction receiver 510 is path 522. In FIG. 5A, client computer 504 is located physically and/or logically further away from transaction receiver 510 compared to client computer 502. In other words, a message transmitted from client computer 502 to transaction receiver 510 would take less time to arrive at transaction receiver 510 compared to that same message (e.g., same contents, same size) if transmitted from client computer 504 to transaction receiver 510, the difference in transmission time being due solely to the respective locations of client computers 502 and 504, namely, that client computer 504 is geographically (or logically) further away from transaction receiver 510 than is client computer 502 from transaction receiver 510, assuming both client computers 502 and 504 have the same speed access, network connection, or bandwidth to transaction receiver 510. Said another way, data path 522 may be considered to be longer than data path 520, and data path 530 may be considered to be longer than data path 528. Thus, the length of a data path between two objects may define a geographical separation, a logical separation, or both, between the two objects.

Transaction receiver 510 receives and sequences, or orders, all of the messages it receives from the multiple sources, including client computers 502 and 504. Transaction receiver 510 may also add time signal data to each received message. The transaction receiver 510 then sends the ordered messages to the multiple transaction processors 508. The data path for sequenced messages sent from transaction receiver 510 to the transaction processors 508 is path 524.

The transaction processors 510 process each received message, and may process them differently depending upon the message type. For example, when a transaction processor 508 receives and processes financial transactions, submitted by client computers 502 and 504, the state of an electronic marketplace may be modified. When a transaction processor 508 receives and processes an administrative instruction submitted by Administrative systems 507, the operation of the transaction processor 508 may be modified.

The transaction receiver 510 is, in one embodiment, a single point of message receipt, so that all messages regardless of source pass through or are processed by the transaction receiver 510. The messages from the different sources may vary in size or complexity, so that some messages can be time stamped and processed (e.g., ordered, sequenced, or augmented) quicker than others. In particular, customer messages sent by client computers to perform an action on a financial product and that, when processed by a transaction processor 508, cause a change in the state of an electronic marketplace, e.g., order book, for the financial product, i.e., financial transactions, may be relatively simple or quick to process compared to administrative instructions that, when processed by a transaction processor 508, cause a change in the operation of the transaction processor.

The transaction receiver 510 may receive streams of data from multiple sources, e.g., all the data message sources in exemplary FIG. 5A, namely 502, 504, 506, and 507, so that the received messages are interweaved into a combined stream of heterogeneous data, which is then transmitted over path 524 to the transaction processors 508. The transaction receiver 510 may augment and process the combined stream of interweaved heterogeneous data in the order of receipt as described herein. For example, the transaction receiver 510 may process messages sequentially, or in a first in, first out (FIFO) manner.

In one embodiment, upon augmenting/processing the received messages, the transaction receiver 510 may transmit the augmented messages to the transaction processors

508. The data communication channel between the transaction receiver 510 and transaction processors 508 may be minimally process intensive, e.g., the transaction processors 508 receive messages from the transaction receiver 510 substantially instantaneously.

For example, in one embodiment, the transaction processors 508 may share a serial/bus connection with the orderer/transaction receiver 510. A message or transaction transmitted by the orderer to the transaction processors would not be able to overtake another message. In other words, a series of transactions transmitted by the transaction receiver 510 in a given sequence would be received by each transaction processor in the same sequence. However, the series of transactions may be received by the transaction processors at different absolute times.

However, the transaction processors 508 may be configured differently (e.g., the physical and/or functional configuration discussed herein), so that they receive messages from the transaction receiver 510 at different times. For example, in one embodiment, each transaction processor 508 may have a separate dedicated connection to the transaction receiver 510. Thus, a series of transactions transmitted by the transaction receiver 510 in a given sequence could be received by each transaction processor in a different sequence. In one embodiment, even if the transaction processors 508 share a serial/bus connection with the orderer/transaction receiver 510, the transactions may be split up into pieces and interleaved, which are then re-assembled by transaction processors 508 in the appropriate format/message.

It should be appreciated that the combination of the transaction receiver 510 and a bus architecture (where all the match engines pull data from the orderer off a bus architecture) ensures that the transaction processors 508 (e.g., match engines) receive messages (e.g., financial transactions, instruction identifiers, etc.) in the same order. In particular, in one embodiment, the orderer may ensure that all messages received from different sources will be sent to the bus in the order in which they arrived to the orderer. The bus architecture guarantees delivery order to all consumers (e.g., transaction processors 508) as long as there is only a single publisher to that bus. Thus, in one embodiment, the orderer/bus combination architecture guarantees order, so it is not possible for the match engines to receive anything in a different order. A message might be processed by one match engine slightly ahead or slightly behind as compared to how that message is processed by another match engine, but in one embodiment, the system may be configured so that all the match engines will have processed all messages in the exact same order, thus resulting in the exact same state.

In one embodiment, one of the transaction processors 508 may be configured to be optimized for one type of message (e.g., financial transactions) while another of the transaction processors 508 may be configured to be optimized for another type of message (administrative systems messages). In one embodiment, a transaction processor 508 optimized for a message type prioritizes processing that message type over any other message type.

The results from the transaction processors 508 are transmitted, over path 526, to the result arbiter 512, which is the decider component described herein. The results arbiter 512, accordingly, collects the results/match events from at least a subset of the set of transaction processors 508 and determines, of the received results, which is the correct result. The data path for messages sent from results arbiter 512 to client computer 502 is path 528, and the data path for messages sent from results arbiter 512 to client computer

504 is path 530. For example, the results arbiter 512 may be configured to select a particular result as the correct result if a majority of the transaction processors 508 independently arrive at that same result.

As described herein, a transaction processor processing one electronic data transaction request message results in one or more, and possibly many more, electronic data transaction result messages. In FIG. 5A, match results path 526 and output paths 528 and 530 are accordingly illustrated as being thicker or bolder than input paths 520 and 522 and ordered inputs path 524, to visually indicate that the amount of data being generated and transmitted by the transaction processors is greater than the amount of data being received by the transaction processors.

Moreover, the transaction processors also generate data that is then published to the client computers in the form of market data feeds. When the transaction processors generate a large amount of data or output messages, e.g., due to a match event, the size of the market data feeds published to the customers also becomes large. Thus, specifically locating the transaction processors as disclosed herein reduces the amount of time needed to transmit market data, as well as the amount of time needed to transmit individual output messages to client computers.

The generation of a large amount/volume of electronic data transaction result messages may in turn cause a large amount of market data that is transmitted to all client computers interested in that market. For example, one client computer electronic data transaction request message, e.g., a single price or value change, can result in many electronic data transaction result messages, which in turn can cause a massive amount of market data traffic that is published. For example, referring now to FIG. 5E, the results arbiter 512 may also transmit the large amount of selected results to a market data generator 511, which in turn provides a market data feed 518 to market data subscribers 515. It should be appreciated that market data subscribers 515 may include client computers 502, 504, and any other client computers interested in receiving market data 518 based on processing (e.g., matching) performed by the transaction processors 508.

Referring back to FIG. 5A, transaction receiver 510 and results arbiter 512 may be in the same location, and they may be placed so close to each other such that any distance, logical or physical, may be said to be negligible. In one embodiment, the transaction receiver 510 and the results arbiter 512 may be the same device or component.

As with the transaction receiver 510, client computer 504 is located physically and/or logically further away from results arbiter 512 than is client computer 502. Because of the respective locations of client computers 502 and 504, the same message transmitted from results arbiter 512 to both client computers 502 and 504 would take longer to arrive at client computer 504. The actual data path 530 is not the bottleneck. Data path 530 in one embodiment may be considered to be longer than data path 528, or requires more time to traverse, solely because of the respective locations of client computers 502 and 504. As discussed herein, when comparing the transmission time or latencies experienced by messages, it should be assumed that the time varies due to logical/physical distance (e.g., client computer 502 versus 504 in FIG. 5A), or due to message size (e.g., output messages are larger than input messages).

The exchange computing system accordingly receives all inputs at transaction receiver 510, which sequences/orders the incoming messages as described herein to facilitate transactional determinism.

In FIG. 5A, the round trip path for input messages submitted by client computer 502, and output messages responsive thereto, is path 520 to path 524 to path 526 to path 528. The round trip path for input messages submitted by client computer 504, and output messages responsive thereto, is path 522 to path 524 to path 526 to path 530.

Table 1 below lists example paths for messages traveling to and from client computer 502 as illustrated in FIG. 5A, and the travel times associated therewith.

TABLE 1

| Client computer 502 Paths | Latency (seconds) |
|---|---|
| 520 | 10 |
| 524 | 6 |
| 526 | 12 |
| 528 | 20 |
| Total round trip | 48 |

Regarding client computer 502, Table 1 illustrates that the travel time for:

input messages over path 520 is 10 seconds;

sequenced messages over path 524 is 6 seconds;

match results over path 526 is 12 seconds (e.g., double the response time of sequenced messages over path 524 due to larger message size); and output messages over path 528 is 20 seconds (e.g., double the response time of input messages over path 520 due to larger message size). The total round trip time for input messages from client computer 502, and output messages responsive thereto to client computer 502, is 48 seconds.

Table 2 below lists example paths for messages traveling to and from client computer 504 as illustrated in FIG. 5A, and the travel times associated therewith.

TABLE 2

| Client computer 504 Paths | Latency (seconds) |
|---|---|
| 522 | 30 |
| 524 | 6 |
| 526 | 12 |
| 530 | 60 |
| Total round trip | 108 |

Regarding client computer 504, Table 2 illustrates that the travel time for:

input messages over path 522 is 30 seconds;

sequenced messages over path 524 is 6 seconds;

match results over path 526 is 12 seconds (e.g., double the response time of sequenced messages over path 524 due to larger message size); and output messages over path 530 is 60 seconds (e.g., double the response time of input messages over path 522 due to larger message size). The total round trip time for input messages from client computer 504, and output messages responsive thereto to client computer 504, is 108 seconds.

It should be assumed that the input and output messages associated with Tables 1 and 2 are the same. Thus, the only reason for the difference in latency between paths 520 and 522; and paths 528 and 530 is due solely to the respective locations of client computers 502 and 504.

In the example of FIG. 5A and Tables 1 and 2, client computer 504 experiences an extra delay of 60 seconds compared to client computer 502 (namely, 108 seconds minus 48 seconds) due to client computer 504's further (physically and/or logically) location from transaction receiver 510 and results arbiter 512. The extra delay of 60 seconds may be considered to be due to data path 530 being longer than data path 528.

Figure 5B:
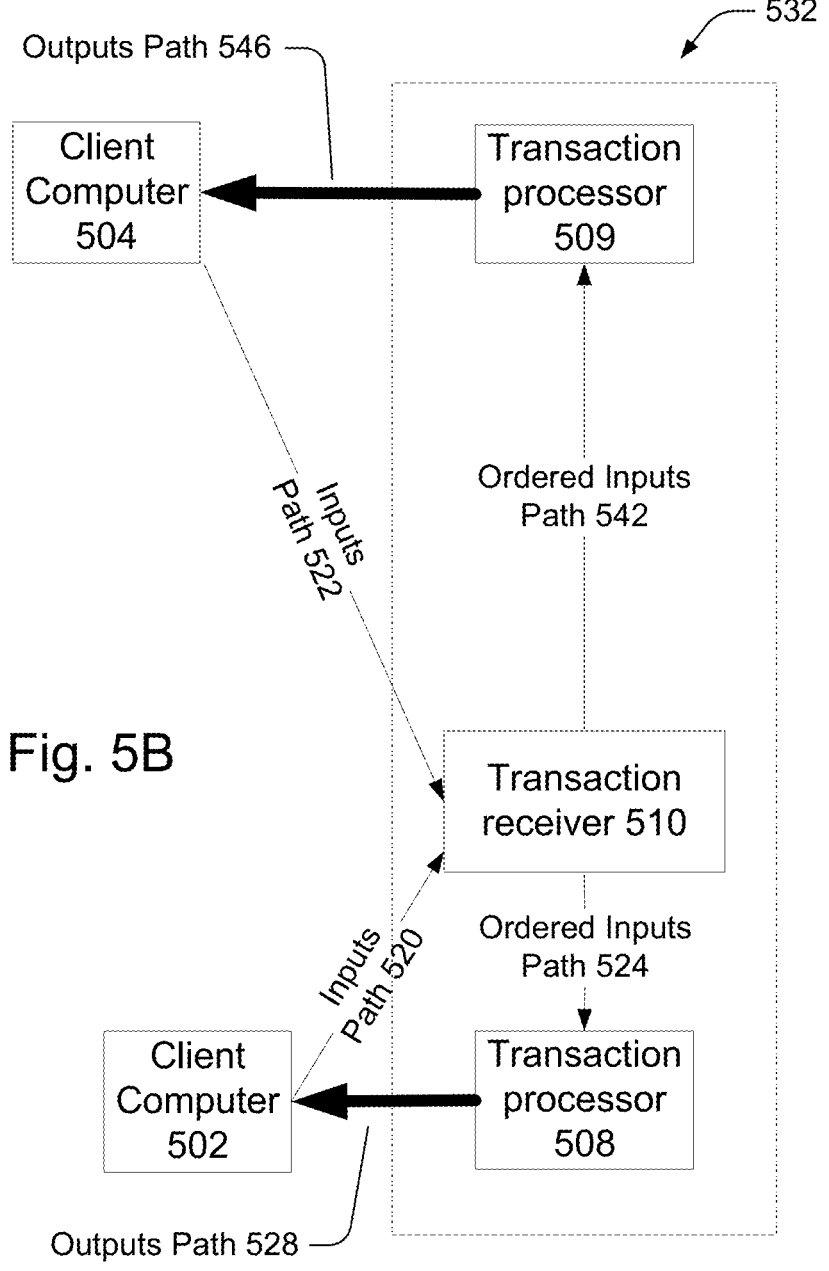
FIG. 5B illustrates another example exchange computing system for implementing the disclosed embodiments.

FIG. 5B illustrates example exchange computing system 532 including transaction receiver 510 that receives messages, e.g., electronic data transaction request messages, from client computers 502 and 504, over input paths 520 and 522, respectively. The transaction receiver 510 sequences, e.g., augments with sequence data, the incoming messages, and transmits the augmented messages to transaction processors 508 and 509 via paths 524 and 542, respectively. Transaction processors 509 and transaction processors 508 all receive the same sequenced data. All of the transaction processors in the system 532 receive the same incoming stream of sequenced/augmented messages. Transaction processors 508 and 509 process the messages to generate electronic data transaction result messages. For example, transaction processors may be hardware matching processors that match or attempt to match incoming messages with messages counter thereto, as described above. Transaction processor 508 transmits electronic data transaction result messages to client computer 502 via output path 528. Transaction processor 509 transmits electronic data transaction result messages to client computer 504 via output path 546.

As described herein, a transaction processor 508, 509 processing one electronic data transaction request message results in one or more, and possibly many more, electronic data transaction result messages. In FIG. 5B, output paths 528 and 546 are accordingly illustrated as being thicker or bolder than input paths 520 and 522 and ordered input paths 524 and 542, to visually indicate that the amount of data being generated and transmitted by the transaction processors is greater than the amount of data being received by the transaction processors.

Moreover, the transaction processors 508, 509 also generate data that is then published to the client computers 502, 504 in the form of market data feeds. When the transaction processors 508, 509 generate a large amount of data or output messages, e.g., due to a match event, the size of the market data feeds published to the customers also becomes large. Thus, specifically locating the transaction processors 508, 509 as disclosed herein reduces the amount of time needed to transmit market data, as well as the amount of time needed to transmit individual output messages to client computers 502, 504.

Exchange computing system 532 accordingly includes a single component 510 that sequences all incoming messages. The messages are then processed by the transaction processors 508, 509. The transaction processors 508, 509 may be logically and/or physically isolated from each other. In one embodiment, the system 532 may be configured to optimize data transmission efficiency by minimizing the logical/physical distance between transaction processors 508, 509 and the client computers 502, 504 receiving data from the transaction processors 508, 509.

For example, the time to transmit ordered input/sequenced electronic data transaction request messages from transaction receiver 510 to transaction processor 508, generate electronic data transaction result messages by transaction processor 508, and transmit the electronic data transaction result messages from transaction processor 508 to client computer 504 may be much higher than the time to transmit ordered input/sequenced electronic data transaction request messages from transaction receiver 510 to transaction processor 509, generate electronic data transaction result messages by transaction processor 509, and transmit the electronic data transaction result messages from transaction processor 509 to client computer 504.

In one embodiment, the time to transmit electronic data transaction result messages from the transaction processor to the client computer may dominate the overall round trip time. The disclosed embodiments minimize the distance that a transaction processor 508, 509 transmits electronic data transaction result messages to a client computer 502, 504.

Figure 5C:
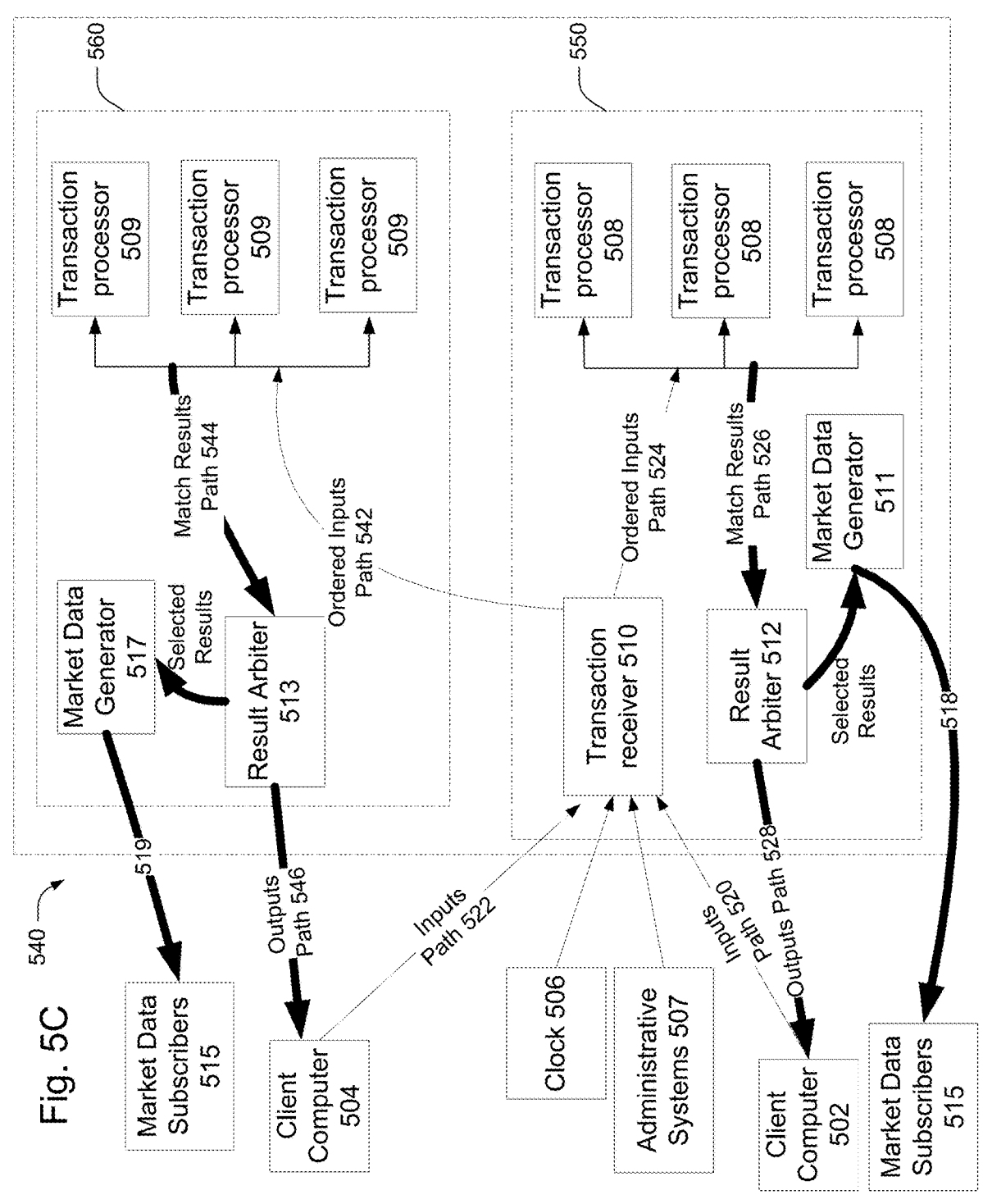
FIG. 5C illustrates another example exchange computing system for implementing the disclosed embodiments.

FIG. 5C illustrates another example exchange computing system 540, which includes some of the components of exchange computing system 532. In system 540, the transaction receiver 510 and transaction processors 508 may be located at a first location 550 that is closer (e.g., logically and/or physically) to client computer 502 than client computer 504. Thus, client computer 504 is remote to client computer 502 and location 550. The exchange computing system 540 is configured to include a second set of transaction processors 509 at a location 560 that is closer (e.g., logically and/or physically) to client computer 504 than client computer 502. Thus, client computer 502 is remote to client computer 504 and location 560.

As used herein, remote may mean geographically remote, or it may mean logically remote. Components that are remote to each other may be connected via one or more intermediate components, each of which may impart delay on communications, such as routers, gateways, cables, etc., and/or which may be characterized by different transmission rates. The length of a cable, distance between transmitter and receiver, or the communication protocol for communicating there over may also dictate whether components are considered remote to each other. As between any two network paths, the number of such intermediate components, as well as the available bandwidth and transmission rate thereof, between a source and destination may vary, even where multiple destinations of the same source are located geographically proximate to each other. That is, where two or more destinations may be geographically/physically equi-distant from a given source, there still may be inequities in the logical distance between the source and each destination due to differences in the number/type of intermediate devices, communications protocols, cable lengths, transmission distance, etc. in the network paths therebetween.

As in FIG. 5A, in FIG. 5C, the data path for messages sent from client computer 502 to transaction receiver 510 is path 520, and the data path for messages sent from client computer 504 to transaction receiver 510 is path 522.

The transaction receiver 510 augments/sequences incoming messages and transmits them to both local transaction processors 508, as well as remote transaction processors 509. In particular, the data path for sequenced messages sent from transaction receiver 510 to the transaction processors 508 is path 524. The data path for sequenced messages sent from transaction receiver 510 to the transaction processors 509 is path 542.

Thus, the transaction receiver 510 is still the single point of entry or ingress for all incoming messages. The transaction processors 508 and 509 process the incoming messages, which may be financial transactions. As described herein, the transaction processors 508 and 509 may be programmed to implement the same matching algorithms, so that they are all purposed to have the exact same output. Collectively, the set of transaction processors 508 and 509 may be considered to be a set of redundant matching processors. Or, they may be configured to handle certain types of messages, so that processing is optimized.

Although all of the transaction processors 508 and 509 receive input messages from the same single component, i.e., the transaction receiver 510, the transaction processors provide their responses to different result arbiters. In the exemplary embodiment illustrated in FIG. 5C, results from transaction processors 508 are transmitted to results arbiter 512, but results from transaction processors 509 are transmitted to results arbiter 513. In particular, the data path for results transmitted from transaction processors 508 to results arbiter 512 is path 526. The data path for results transmitted from transaction processors 509 to results arbiter 513 is path 544. Results arbiter 512 and results arbiter 513 are remote to each other.

Moreover, the different results arbiters transmit messages to different client computers. The data path for messages sent from results arbiter 512 to client computer 502 is path 528, and the data path for messages sent from results arbiter 513 to client computer 504 is path 546. Thus, although all of the client computers' messages, e.g., financial messages including requests to perform transactions, are received by the single ingress point (i.e., the transaction receiver 510), the client computer receive responses to their financial transaction requests from different results arbiters.

Thus, exchange computing system 540 may be configured to provide output messages to different client computers from different results arbiters. For example, in example FIG. 5C, client computer 504 is remote from client computer 502. Moreover, client computer 502 is closer to transaction receiver 510. For example, a message may need more time to be transmitted from client computer 504 to transaction receiver 510, as compared to the time needed for the same message to be transmitted from client computer 502 to transaction receiver 510. Said another way, messages submitted by client computer 504 to transaction receiver 510 experience a higher travel time latency than messages submitted by client computer 502 to transaction receiver 510 due to the respective distances of client computers 502 and 504 from transaction receiver 510.

Like transaction receiver 510, results arbiter 512 is located closer to client computer 502 than client computer 504. Results arbiter 512 can accordingly communicate output messages (responsive to input messages) back to client computer 502 quicker than results arbiter 512 can communicate output messages (responsive to input messages) back to client computer 504. System 540 attempts to minimize the latency due to the distance from results arbiter 512 to client computer 504.

In particular, in a financial exchange that includes hardware matching processors, e.g., transaction processors, each transaction processor processes inputs, where the result of processing inputs (i.e., outputs) are much larger than the inputs. At the very least, the processing of each input message causes the generation of at least one output message, namely, an acknowledgement that the message has been received by the match engine. Depending on the state of the order book when a message is received, an input message may actually result in a match event, which can trigger the generation of hundreds if not thousands of output messages. For example, an incoming request that results in a match could then trigger other messages, because the order book may include resting conditional orders. In fact, a single input message, if it results in the occurrence of a match event (e.g., the incoming request is a sell request that matches with a resting buy request) could result in the generations of thousands or millions of messages. Accordingly, the nature of the input-output data in a data transaction processing system that implements a hardware matching processor is that the input-output ratio is at least 1 to 1, but could be 1 to many. In other words, one input message can result in the generation of one or many output messages responsive to the input message. Moreover, the size of the overall outputs can vary depending on whether there is a match. For instance, if the result of an input is just an acknowledgement was received, the output data stream responsive to that input may be considered small. But if the result of an input is the occurrence of one or more matches, then the output stream responsive to that input may include acknowledgment messages as well as fill messages that are sent to each party involved in a match event reporting on the occurrence of the trade.

For additional details on operation of the transaction processors generating output messages responsive to input messages, see U.S. patent application Ser. No. 15/339,160, filed on Oct. 31, 2016, entitled "Resource Allocation Based on Transaction Processor Classification", the entire disclosure of which is incorporated by reference herein and relied upon.

Accordingly, the amount of data, i.e., input data, transmitted from client computer 504 to transaction receiver 510 may be much smaller than the amount of data, i.e., output data, transmitted from transaction receiver 510 to client computer 504, where the output data is responsive to the input data. In other words, the output data is computed by the transaction processors based on the input data. For example, the transaction processors modify the state of an electronic order book based on the input messages (e.g., if a match event occurred, or if an incoming order rests on the book), and the exchange computing system generates data representing the modification which is transmitted back to the customers. The response back to the customers, i.e., the output data, may be transmitted in the form of private messages, or may be published in the form of market data feeds to which customers may be subscribe.

As described herein, a transaction processor processing one electronic data transaction request message results in one or more, and possibly many more, electronic data transaction result messages. In FIG. 5C, match results paths 526 and 544 and output paths 528 and 546 are accordingly illustrated as being thicker or bolder than input paths 520 and 522 and ordered input paths 524 and 542, to visually indicate that the amount of data being generated and transmitted by the transaction processors is greater than the amount of data being received by the transaction processors.

Moreover, the transaction processors also generate data that is then published to the client computers in the form of market data feeds. When the transaction processors generate a large amount of data or output messages, e.g., due to a match event, the size of the market data feeds published to the customers also becomes large. Thus, specifically locating the transaction processors as disclosed herein reduces the amount of time needed to transmit market data, as well as the amount of time needed to transmit individual output messages to client computers. As shown in FIG. 5C, results arbiters 512 and 513 provide selected results to market data generators 511 and 517, respectively, which in turn provide results to market data subscribers 515 via market data feeds 518 and 519, respectively.

The disclosed exchange computing system minimizes latency by optimizing the transaction processors and results arbiters that are responsive to specific client computer input requests or messages, as well as the transaction processors and results arbiters that provide data to the market data generators, which in turn is used to provide market data feeds. In FIG. 5C, client computer 504 is located closer to results arbiter 513 than results arbiter 512. The exchange computing system configures results arbiter 513 to send responses to client computer 504. Because configuring the exchange computing system so that transaction receiver 510 receives all messages facilitates transactional determinism, transaction receiver 510 continues to receive all incoming messages, including financial messages submitted by client computer 504.

In FIG. 5C, the round trip path for input messages submitted by client computer 502, and output messages responsive thereto, is the same as in FIG. 5A, namely, path 520 to path 524 to path 526 to path 528. Unlike FIG. 5A, in FIG. 5C, the round trip path for input messages submitted by client computer 504, and output messages responsive thereto, is path 522 to path 542 to path 544 to path 546.

Table 3 below lists example paths for messages traveling to and from client computer 502 as illustrated in FIG. 5C, and the travel times associated therewith.

TABLE 3

| Client computer 502 Paths | Latency (seconds) |
| --- | --- |
| 520 | 10 |
| 524 | 6 |
| 526 | 12 |
| 528 | 20 |
| Total round trip | 48 |

Regarding client computer 502, Table 3 illustrates that the travel time for:
input messages over path 520 is 10 seconds;
sequenced messages over path 524 is 6 seconds;
match results over path 526 is 12 seconds (e.g., double the response time of sequenced messages over path 524 due to larger message size); and
output messages over path 528 is 20 seconds (e.g., double the response time of input messages over path 520 due to larger message size). The total round trip time for input messages from client computer 502, and output messages responsive thereto to client computer 502, is 48 seconds.

Table 4 below lists example paths for messages traveling to and from client computer 504 as illustrated in FIG. 5C, and the travel times associated therewith.

TABLE 4

| Client computer 504 Paths | Latency (seconds) |
| --- | --- |
| 522 | 30 |
| 542 | 9 |
| 544 | 12 |
| 546 | 20 |
| Total round trip | 71 |

Regarding client computer 504, Table 4 illustrates that the travel time for:
input messages over path 522 is 30 seconds;
sequenced messages over path 542 is 9 seconds;
match results over path 544 is 12 seconds; and
output messages over path 546 is 20 seconds. The total round trip time for input messages from client computer 504, and output messages responsive thereto to client computer 504, is 71 seconds.

It should be assumed that the input and output messages associated with Tables 3 and 4 are the same. Thus, the only reason for the difference in latency between paths 520 and 522 is due solely to the respective locations of client computers 502 and 504.

In the example of FIG. 5C and Tables 3 and 4, client computer 504 experiences an extra delay of 23 seconds compared to client computer 502 (namely, 71 seconds minus 48 seconds) due to client computer 504's physically and/or logically further location from transaction receiver 510. Thus, compared to FIG. 5A and Tables 1 and 2, client computer 504's delay is reduced by 37 seconds (60 seconds minus 23 seconds).

It should accordingly be appreciated that exchange computing system 540 reduces the overall latency experienced by client computer 504 due to a specific and particular configuration of the transaction receiver, transaction processors, results arbiters and data paths therebetween. Because the exchange computing system is bound by the requirement that a single component sequences and orders every message that is received by the exchange computing system, the transaction receiver receives all messages, no matter where they are eventually processed (e.g., matched or attempted to match by the hardware transaction processors). Moreover, the nature of the financial transactions performed by the exchange computing system results in output messages, computed by the transaction processors, which are at least the same in number as the input messages, e.g., a 1 input message to 1 output message ratio, but where the number of output message may be much higher, e.g., a 1 input message to 500 output message ratio. The disclosed system optimizes the latency caused by transmission of output messages over long/far (physically and/or logically) distances by optimizing the distance that output messages are transmitted. Exchange computing system 540 is configured to increase, wherever possible, the distance that sequenced messages transmitted by transaction receiver 510 travel so that the distance that output messages travel can be reduced.

The disclosed embodiments minimize latency for client computer 504 by trading off a longer route for ordered inputs path 542 for a shorter outputs path 546. Ordered incoming messages travel on input path 542. Match results travel on output path 546. Because match results may be much larger than input messages, shortening the path that match results travel has a large impact on reducing the overall latency experienced by client computer 504.

U.S. Pat. No. 7,788,163, filed on Jul. 18, 2005, entitled "System and Method of Utilizing a Distributed Order Book in an Electronic Trade Match Engine", the entire disclosure of which is incorporated by reference herein and relied upon, describes matching orders at a local match engine, but does not teach ordering orders via a single component or otherwise facilitating transaction determinism.

In one embodiment, the disclosed embodiments include automatically detecting which transaction processors and corresponding results arbiter are closest to a client computer, and transmitting sequenced messages (to facilitate transactional determinism) to those transaction processors and corresponding results arbiter so that the resulting match results (generated by the transaction processors) are as close to the client computer as possible.

The exchange computing system knows the locations of the results arbiters and transaction processors because the results arbiters and transaction processors are controlled by the exchange computing system. The exchange computing system may detect the location of a client computer in a variety of ways. For example, the client computer may report its own location as part of the input message or order. A Tag field in the order may identify the entity (e.g., trading firm) submitting a message, and each entity may be associated with an address, e.g., upon registering as a trader or customer. Or, the exchange computing system may use the Internet Protocol ("IP") of a submitted message to determine the location of the message sending client computer.

If a client or trading entity has registered its various client computers and notified the exchange computing system of their locations, then identifying the source of a message can allow the exchange computing system to identify the location of the message sending client computer. Examples and details of how a system may determine the source or entity of a message are described in U.S. Patent Publication No. 2007/0118460 entitled "Detection of intra-firm matching and response thereto" and filed on Nov. 17, 2006, and U.S. Patent Publication No. 2015/0026033 entitled "Efficient Self-Match Prevention in an Electronic Match Engine" and filed Oct. 3, 2014, both of which are incorporated by reference herein in their entireties and relied upon.

The system may use information from within incoming messages, such as a Tag 50 identifier within the CME Group exchange computing system, which may be a unique identifier associated with an individual submitting the message. Or, the system may use any combination of the account, firm or unique user identifier to determine the location of a client computer.

In one embodiment, each client computer may select the location of the results arbiter that provides match results to that client computer.

Exchange computing system 540 offers a high level of fault tolerance because transaction processors 509 may be redundant to transaction processors 508. If all of the transaction processors 508 at location 550 stop working, e.g., due to a power failure, or a wire/bus failure connecting transaction processors 508 to the rest of the system, results arbiter 513 may begin transmitting output messages to client computer 502, e.g., over a new path (not shown).

Figure 5D:
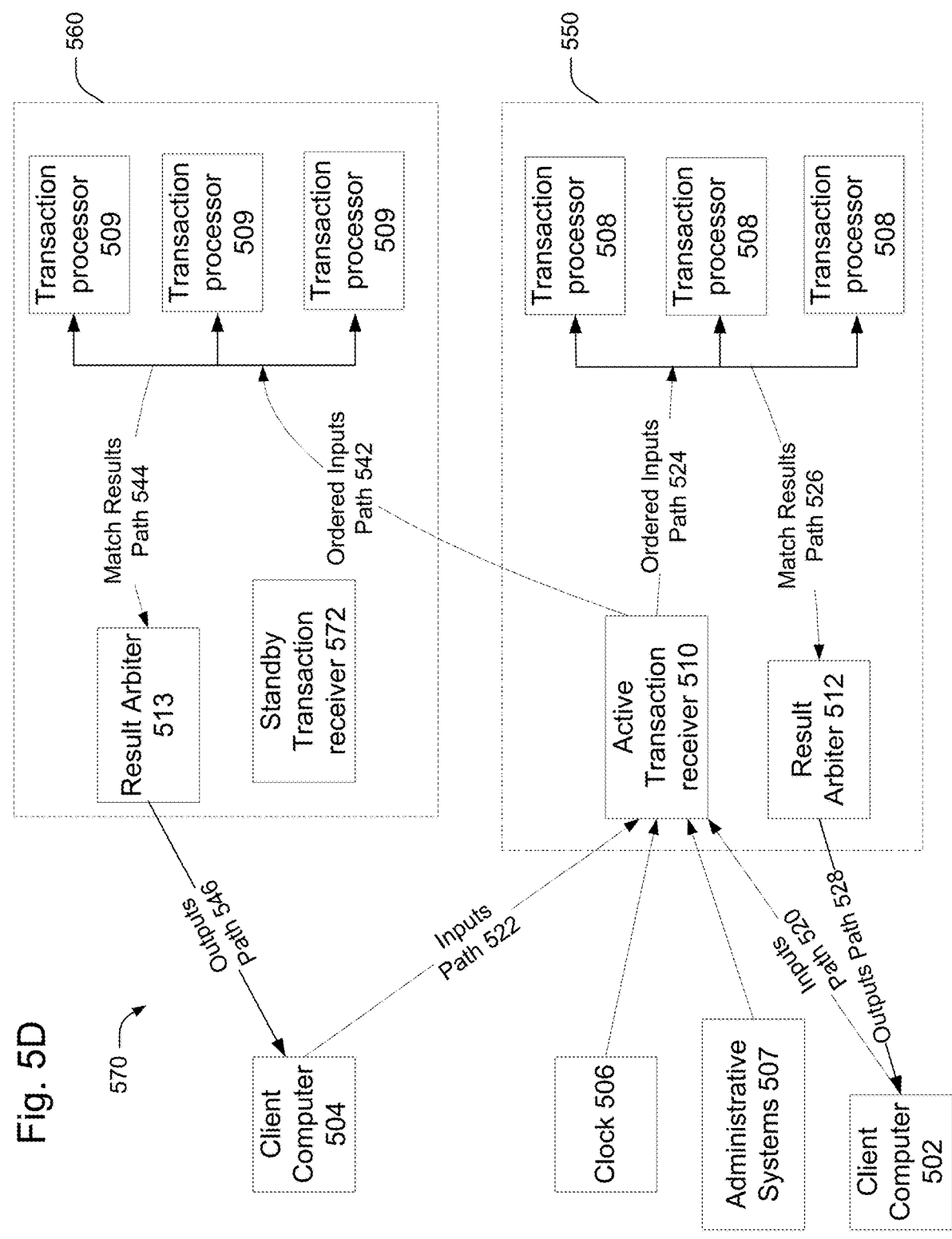
FIG. 5D illustrates yet another example exchange computing system for implementing the disclosed embodiments.
Figure 5E:
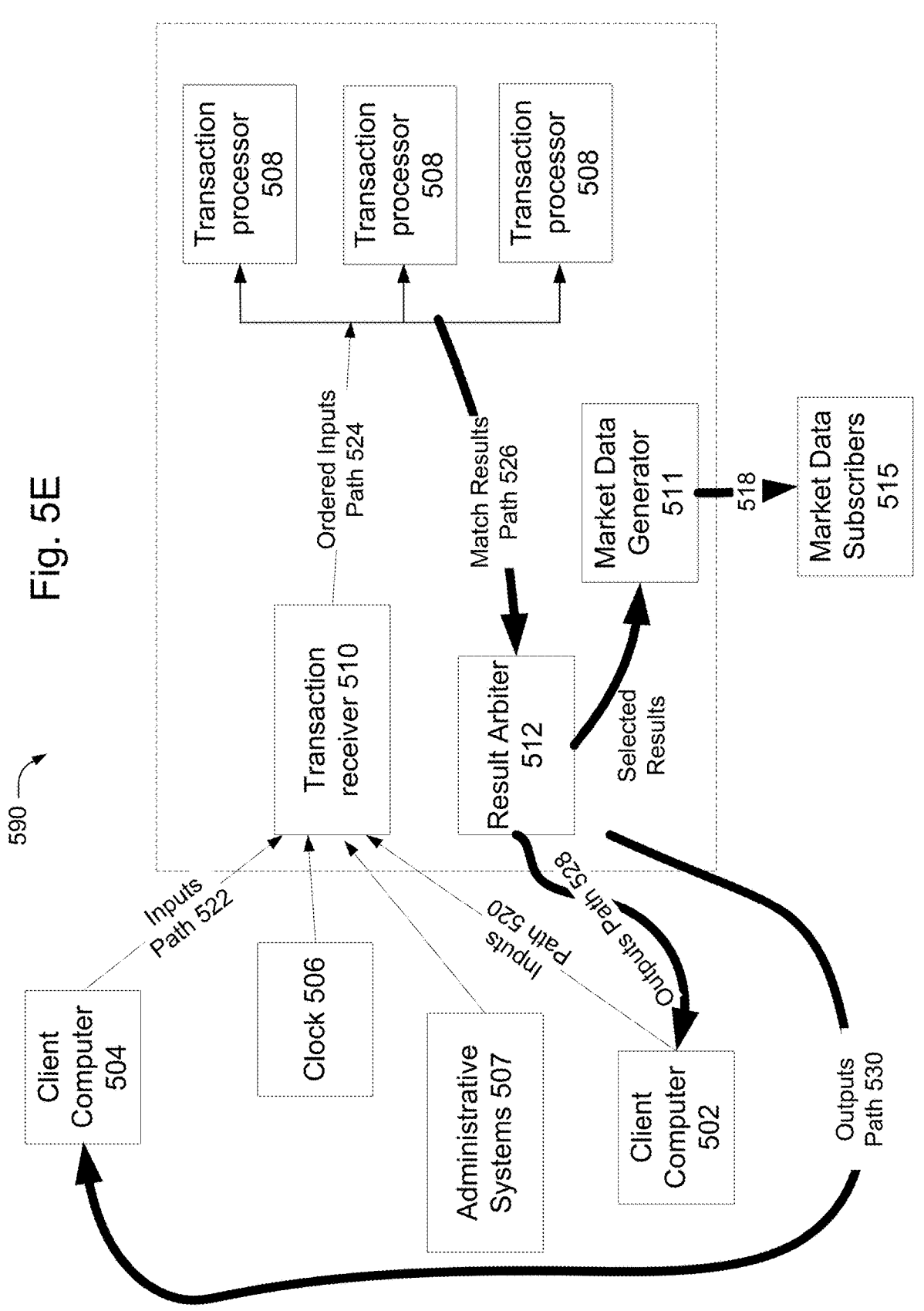
FIG. 5E illustrates still another example exchange computing system for implementing the disclosed embodiments.

FIG. 5D illustrates an alternative example exchange computing system 570, which may be implemented to improve the overall reliability and fault tolerance of the exchange computing system. Exchange computing system 570 is similar to exchange computing system 540, except that location 560 includes an additional backup or standby transaction receiver 572. If all the components at location 550 stop working, e.g., the components at location 550 are in the same building and the entire building loses power, or upon a failure of the primary transaction receiver or disconnection of the primary transaction receiver from the other components, the standby transaction receiver 572 becomes the primary transaction receiver. All messages to the exchange computing system are sent to the standby transaction receiver 572. It should be appreciated that to preserve transactional determinism, only one transaction receiver can be active at any one time.

The disclosed system could also advantageously reduce the need for customers to independently transmit match engine results between multiple locations. For example, referring to FIG. 5A, some high speed customers prefer to handle all long distance data transfer. For example, the exchange computing system with transaction receiver 510 may be located in Chicago. A New York based customer would prefer to receive results in Chicago, e.g., act as client computer 502, and transmit those results to Chicago over a private high speed network, instead of receiving results from transaction receiver 510 in New York, e.g., act as client computer 504. These customers may install high speed, high technology private data paths between Chicago and New York that are faster (e.g., higher bandwidth) than the speed of output path 530. For example, the customers may receive the results in Chicago and then transmit them to New York over microwave links to create arbitrage opportunities for certain lookalike/highly correlated products. The disclosed embodiments eliminate this burden on customers by rapidly making match results available in both Chicago and New York. As long as the overall latency for client computer 504 in exchange computing system 540 is less than the latency of receiving outputs in Chicago and sending over a high speed private network to client computer 504, exchange computing system 570 eliminates the incentive for customers to invest in private high speed lines beginning at the transaction receiver 510.

Figure 6:
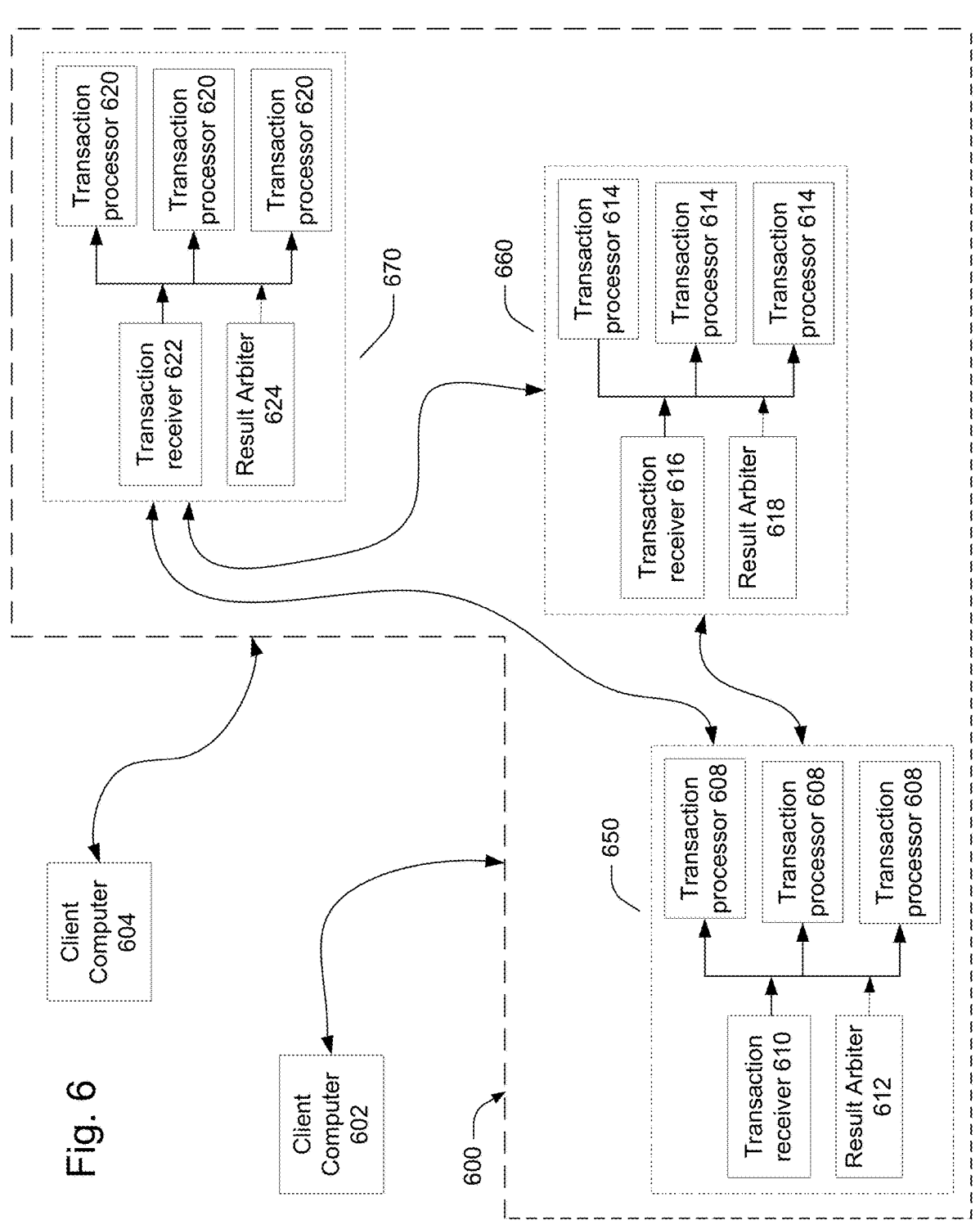
FIG. 6 illustrates another example exchange computing system for implementing the disclosed embodiments.

In one embodiment, the exchange computing system may be distributed across multiple geographically/logically distributed locations. For example, as shown in FIG. 6, exchange computing system 600 is distributed across three locations 650, 660, and 670. Each location includes a transaction receiver, a results arbiter, and one or more transaction processors. Although three locations are shown in FIG. 6, the exchange computing system may be distributed globally, with at least one location in each country worldwide. In FIG. 6, location 650 includes transaction receiver 610, results arbiter 612 and transaction processors 608. Location 660 includes transaction receiver 616, results arbiter 618 and transaction processors 614. Location 670 includes transaction receiver 622, results arbiter 624 and transaction processors 620. As illustrated by the double-headed arrows, the client computers 602 and 604 may send data to and receive data from the exchange computing system 600. Each location, and components therein, may be configured to send data to and receive data from any one or more of the other locations, and components therein.

Client computers 602 and 604 may submit financial transactions to the exchange computing system 600. Only one of the transaction receivers may be active at any one time. Thus, the incoming messages are routed to one of the transaction receivers. The active transaction receiver sequences/augments all incoming messages e.g., to facilitate determinism as described herein. The sequenced messages are then transmitted to one or more of the transaction processors. For example, transaction receiver 610 may initially be the active transaction receiver. Messages sequenced by the transaction receiver 610 may be transmitted to transaction processors 608, transaction processors 614, and transaction processors 620. The transaction processors process the messages in the same order, although they may process the messages at different actual times.

In one embodiment, each transaction processor reports hardware matching results to the closet results arbiter. Thus, transaction processors 608 process the messages and report results to results arbiter 612; transaction processors 614 process the messages and report results to results arbiter 618, and transaction processors 620 process the messages and report results to results arbiter 624. Each results arbiter 612, 618, 624 then decides the correct answer, e.g., based on a quorum, and provides the output to one or more client computer.

However, to increase overall fault tolerance, transaction processors may report results to other, or multiple, results arbiters 612, 618, 624. For example, transaction processors 608 may report results to results arbiter 618. Or, transaction processors 608 may report results to results arbiter 612 and results arbiter 618. Each results arbiter 612, 618, 624 accordingly may receive results from local and remote transaction processors 608, 614, 620.

The exchange computing system 60 is configured so that only one of the results arbiters 612, 618, 624 provides the output to a client computer 602, 604. However, different results arbiters 612, 618, 624 may provide results to different client computers 602, 604. Thus, results arbiter 624 may provide output messages to client computer 604, and results arbiter 618 may provide output messages to client computer 602. In one embodiment, results arbiter 612 may provide results to both client computers 602 and 604.

In one embodiment, the exchange computing system 600 may be configured to allow each client computer 602, 604 to select which results arbiter 612, 618, 624 provides results to that client computer 602, 604. A client computer 602, 604 may accordingly choose to receive results from the nearest (geographically and/or logically) results arbiter 612, 618, 624. Even though all input messages into the exchange computing system 600 are initially received/sequenced by the same single transaction receiver 610, 616, 622, different distributed results arbiters 612, 618, 624 may vote on or select the correct output (e.g., from various transaction processors 608, 614, 620) and provide the results to a client computer 602, 604.

In one embodiment, the exchange computing system 600 may be configured to sequentially activate different transaction receivers 610, 616, 622 at different times. Financial instrument market activity and liquidity associated with an exchange computing system 600 physically shifts across the globe as the day progresses. Thus, it is assumed that the most active client computers 602, 604 are those where it is daytime.

For example, location 650 may be in Chicago, location 660 may be in London, and location 670 may be in Hong Kong. During U.S. business hours (e.g., 8 am to 5 pm in Chicago), all traffic from all client computers 602, 604 is transmitted to transaction receiver 610. During Hong Kong business hours, all traffic from all client computers 602, 604 is transmitted to transaction receiver 610. During London business hours, all traffic from all client computers 602, 604 is transmitted to transaction receiver 610. It should be appreciated that, in this particular embodiment, only one of the transaction receivers 610, 616, 622 is active, or receives incoming traffic, at any one time. The time of transition may be set by an operator of the exchange computing system 600. The exchange computing system can accordingly activate the transaction receiver 610, 616, 622 that is closest to the majority of incoming traffic (e.g., client computers 602, 604 currently experiencing daytime).

In one embodiment, the exchange computing system 600 may be configured to detect where most of the incoming traffic is originating, and activate the transaction receiver that is closest to that location. Thus, even if it is daytime in Chicago, if the majority of incoming messages are originating in London, the exchange computing system 600 may be configured to activate the transaction receiver in, or closest to, London.

The system 600 can also be expanded to create a global network of transaction receivers (where only one transaction receiver is active at any one time to facilitate transactional determinism), results arbiters and transaction processors which would allow the exchange computing system 600 to "follow the sun". By using the transaction receiver closest to the active market, the exchange computing system 600 can decrease overall response time for the majority of active market participants. The system may include multiple trans-action receivers, but selectively activate the transaction receiver that is closest to the currently active market or source of liquidity.

In one embodiment, the exchange computing system 600 may additionally or alternatively be configured to select different results arbiters 612, 618, 624 for different client computers 602, 604 so that the client computers 602, 604 receive output results at or near at the same time. For example, the exchange computing system 600 may be configured to control how much time is required to communicate with the geographically disparate transaction processors 608, 614, 620 and results arbiters 612, 618, 624. The exchange computing system 600 may change the relative timings between client computers 602, 604 on a continuous basis. For example, client computers in New York, Los Angeles, and Chicago may submit orders to a transaction receiver located in New York. At the start of the day, the travel time from the New York client computer to the New York transaction receiver might be the smallest, and the travel time from the Los Angeles client computer to the Los Angeles transaction receiver might the longest, with the net effect being that the exchange computing system appears "closest" to the New York client computer.

As the day progresses, the exchange computing system 600 may lengthen the travel time for the New York client computer (e.g., by selecting a results arbiter that is further away from the New York client computer to provide results to the New York client computer) and shorten the travel time for the Los Angeles client computer (e.g., by selecting a results arbiter that is closer to the Los Angeles client computer to provide results to the Los Angeles client computer). This timing transition would, in effect, make it appears that the exchange computing system was moving closer to Los Angeles over the course of the day.

In one embodiment, the exchange computing system 600 may be configured to use different components from different locations to equalize the response time to all client computers, no matter how widely distributed (geographically or logically).

It should be appreciated that with a global network of transaction receivers, transaction processors and results arbiters, the exchange computing system can be configured to provide increased fault tolerance, provide results quickly at different client locations, control response times to relatively shift the exchange computing system to various locations, and to control response times to equalize the latency between a widely distributed client base.

In some of the disclosed embodiments, the architecture includes a single sequenced stream of data that singularly determines functionality/output. This architecture advantageously facilitates efficient real time recovery and/or startup of a new transaction processor, e.g., a hardware matching processor.

In one embodiment, the overall system is reset once a week, e.g., at the start of a trading week, e.g., Sunday night in Chicago. When a system is reset, all of the transaction processors are at the same initial state, and have not yet processed any transactions. After the trading week opens, each transaction processor processes the incoming data in the same sequence (although possibly at different times) so that their state should be the same upcoming processing the same number of incoming messages.

If a new transaction processor is added to the exchange computing system mid-week, e.g., Tuesday, the new transaction processor must "catch up" to all the events that have happened from the beginning of the trading week until that point, before the transaction processor can start processing new incoming transactions. In other words, the newly added transaction processor must catch up to the week's previous activity, so its state is the same as the other transaction processors up to a reference point (e.g., the point when the new transaction processor was added) before the new transaction processor can process new incoming transactions.

For example, the operator or administrator of the exchange computing system may desire to add a new transaction processor to replace a failed transaction processor. The operator or administrator of the exchange computing system may add a new transaction processor to the overall system at time X by activating the new transaction processor and replaying all of the week's activity up till time X. If time X is 2 days into the trading week, the new transaction processor must replay 2 days of activity, to ensure the new transaction processor is at the same state at time X as all the other transaction processors, before the new transaction processor is allowed to process transactions.

In one embodiment, because all of the incoming data may include a time stamp, as described in the '208 Application, the replay time may be less than 2 days. In other words, the exchange computing system replay system may be configured to process replay events faster than the amount of time initially required to receive and process events.

Once the new transaction processor or node has caught up to the point of processing all sequenced events that the other nodes have processed, the new transaction processor can then function as yet another node considered by the results arbiter/voter. The results arbiter may be configured to ignore the outputs from the new transaction processor while the new transaction processor is catching up (and outputting stale results). Or, the new transaction processor may not be connected to send results to any results arbiter until the new transaction processor has caught up to all of the other transaction processors.

The ability to add a new transaction processor after all of the existing transaction processors are in different states, and then catch up or synchronize the new transaction processor to the other transaction processors, may be useful in a variety of applications for the exchange computing system.

For instance, an exchange computing system may implement, for every transaction processor, a primary and a single backup. For some applications, a machine can be running as primary for some processes and backup as others. Mission critical applications, however, may only be run on a dedicated machine, e.g., a machine that only runs one application. But, if a primary fails and a backup takes over, then there is only a single machine (the backup now running as primary) for a process. The exchange computing system could buy three of every machine instead of two (thus deploying two backups for each primary), with the down side being that two out of three machines are rarely used, thus inefficiently using computing resources.

The exchange computing system may accordingly deploy or implement a plurality of backup machines that are not dedicated to any one process or primary machine. Thus, if a primary machine fails, and one of the backup machines takes over, there would still be several other backup machines available to use if even the backup machine that replaced the primary machine also fails.

This architecture also facilitates the ability to upgrade software on one of the transaction processors during trading hours if needed. For example, for primary transaction processor A and one of its backup transaction processors B, transaction processor B can be deactivated/disconnected from its corresponding transaction receiver and results arbiter, and the software on transaction processor B can be upgraded. Transaction processor B can then receive the incoming data stream/sequenced messages it missed, so that transaction processor B can be synchronized with the other active transaction processors. Transaction processor B can then become the primary machine processing incoming data, and transaction processor A (initially the primary) can be deactivated, its software upgraded, and put back online after catching up on the data transaction processor A missed. This ability is desirable for and exchange computing system because it can allow for continuous 24×7 trading, with zero customer-experienced downtime, maintenance windows, etc.

FIG. 7 illustrates an illustrates an example process 700 indicating an example method of implementing the disclosed exchange computing system, as may be implemented with computer devices and computer networks, such as those described with respect to FIGS. 1 and 2. Embodiments may involve all, more or fewer actions indicated by the blocks of FIG. 7. The actions may be performed in the order or sequence shown or in a different sequence.

Process 700 begins with receiving, by a transaction receiver, electronic data transaction request messages from a first client computer over a first data path and from a second client computer over a second data path, as shown in block 702. For example, different clients may submit requests to perform financial transactions, e.g., buy or sell a financial instrument at a specified price. The process next includes augmenting, by the transaction receiver, each received electronic data transaction request message, as shown in block 704. The transaction receiver may sequence each incoming message, so that all of the messages are sequenced in the order they are received by the transaction receiver. The messages from the different client computers may be interleaved, depending on the order in which they were received by the transaction receiver.

Although the data paths described herein are identified as different paths, the messages described as traveling over different paths may actually travel over the same path. Thus, the first and second paths may be the same path. In one embodiment, the described paths may overlap. For example, two client computers may be connected to a common networking router over a local or wide area network. Any message sent from a first client computer to the exchange computing system may traverse the same path traversed by a message sent from a second client computer. Or, the paths may diverge initially, e.g., from the client computer to the nearest router, after which the paths are the same. The same may be true of paths internal to the exchange computing system, e.g., paths from one internal component, e.g., a transaction receiver, to other internal components, e.g., transaction processors.

Process 700 next includes transmitting, by the transaction receiver, the augmented electronic data transaction request messages to a first transaction processor over a third data path and to a second transaction processor over a fourth data path, as shown in block 706. The transaction processors may be geographically and/or logically separate from the transaction receiver.

Process 700 next includes processing, by the first and second transaction processors, the received augmented electronic data transaction request messages, as shown in block 708. For instances, the transaction processors may be hardware matching processors that attempt to match the requests with other requests counter thereto.

The process includes generating, by the first and second transaction processors, a plurality of electronic data transaction result messages responsive to the electronic data transaction request messages, as shown in block 710. The transaction processors may be redundant to each other, so that they both independently process each electronic data transaction request message. The transaction processors may be identically programmed/configured, so that the electronic data transaction result messages are the same. They may not be generated at the same time, but they are generated in the same sequence and may be otherwise (other than actual time of generation) identical.

Process 700 includes transmitting at least some of the electronic data transaction result messages to the first client computer over a fifth data path, as shown in block 712. Process 700 also includes transmitting at least some of the electronic data transaction result messages to the second client computer over a sixth data path, wherein the second data path is longer than the sixth data path, as shown in block 714. It should be appreciated that each client computer only receives the electronic data transaction result messages that are responsive to the electronic data transaction request messages submitted by that respective client computer. The second path being longer than the sixth path may be based on the geographical locations of second client computer, the transaction receiver, and the second transaction processor. For instance, the second client computer may be physically closer to the second transaction processor than the second client computer is to the transaction receiver.

Or, the second client computer, the transaction receiver, and the second transaction processor may be geographically close, e.g., in the same data center, but the wiring or the intermediate components may cause the second client computer to be logically closer to the second transaction processor than the second client computer is to the transaction receiver. The geographical and/or logical locations/configurations may result in a message, if the same message were sent from the second client computer to the transaction receiver and from the second transaction processor to the second client computer, to travel from the second transaction processor to the second client computer faster than the same message travels from the second client computer to the transaction receiver.

Because of the type of processing performed by the transaction processors, e.g., matching, the number of the electronic data transaction result messages generated by any one of the transaction processors may be greater than the number of the electronic data transaction request messages received by the transaction receiver. In addition, the combined size (e.g., megabytes) of all of the electronic data transaction result messages may be larger than the combined size of all of the electronic data transaction request messages received by the transaction receiver.

The fourth data path may be longer than the third data path. In other words, the first transaction processor may be closer to the transaction receiver than the second transaction processor is to the transaction receiver.

In one embodiment, each client computer only receives electronic data transaction result messages that are responsive to electronic data transaction request messages submitted by that client computer.

In one embodiment, the transaction processor closest (geographically or logically) to a client computer may transmit results to that client computer. Alternatively, e.g., for redundancy, other transaction processors (e.g., not the closest) may transmit results to a given client computer.

In one embodiment, (i) the time required to transmit the augmented electronic data transaction request messages from the transaction receiver to the first transaction processor is less than (ii) the time required to transmit the augmented electronic data transaction request messages from the transaction receiver to the second transaction processor, and (iii) the sum of the times required to transmit the augmented electronic data transaction request messages from the transaction receiver to the first transaction processor and to transmit the electronic data transaction result messages from the first transaction processor to the second client computer is greater than (iv) the sum of the times required to transmit the augmented electronic data transaction request messages from the transaction receiver to the second transaction processor and to transmit the electronic data transaction result messages from the second transaction processor to the second client computer.

Thus, the exchange computing system may optimize the amount of time needed to respond to the second client computer by performing the processing at a second transaction processor closer to the second client computer, even if that second transaction processor is further away from the transaction receiver than some other transaction processor, e.g., a first transaction processor.

As described in detail above, the augmenting/sequencing by the transaction receiver may dictate the order in which messages are processed by the transaction processors.

Referring back to FIG. 1, the trading network environment shown in FIG. 1 includes exemplary computer devices 114, 116, 118, 120 and 122 which depict different exemplary methods or media by which a computer device may be coupled with the exchange computer system 100 or by which a user may communicate, e.g., send and receive, trade or other information therewith. It should be appreciated that the types of computer devices deployed by traders and the methods and media by which they communicate with the exchange computer system 100 is implementation dependent and may vary and that not all of the depicted computer devices and/or means/media of communication may be used and that other computer devices and/or means/media of communications, now available or later developed may be used. Each computer device, which may comprise a computer 200 described in more detail with respect to FIG. 2, may include a central processor, specifically configured or otherwise, that controls the overall operation of the computer and a system bus that connects the central processor to one or more conventional components, such as a network card or modem. Each computer device may also include a variety of interface units and drives for reading and writing data or files and communicating with other computer devices and with the exchange computer system 100. Depending on the type of computer device, a user can interact with the computer with a keyboard, pointing device, microphone, pen device or other input device now available or later developed.

An exemplary computer device 114 is shown directly connected to exchange computer system 100, such as via a T1 line, a common local area network (LAN) or other wired and/or wireless medium for connecting computer devices, such as the network 220 shown in FIG. 2 and described with respect thereto. The exemplary computer device 114 is further shown connected to a radio 132. The user of radio 132, which may include a cellular telephone, smart phone, or other wireless proprietary and/or non-proprietary device, may be a trader or exchange employee. The radio user may transmit orders or other information to the exemplary computer device 114 or a user thereof. The user of the exemplary computer device 114, or the exemplary computer device 114 alone and/or autonomously, may then transmit the trade or other information to the exchange computer system 100.

Exemplary computer devices 116 and 118 are coupled with a local area network ("LAN") 124 which may be configured in one or more of the well-known LAN topologies, e.g., star, daisy chain, etc., and may use a variety of different protocols, such as Ethernet, TCP/IP, etc. The exemplary computer devices 116 and 118 may communicate with each other and with other computer and other devices which are coupled with the LAN 124. Computer and other devices may be coupled with the LAN 124 via twisted pair wires, coaxial cable, fiber optics or other wired or wireless media. As shown in FIG. 1, an exemplary wireless personal digital assistant device ("PDA") 122, such as a mobile telephone, tablet based compute device, or other wireless device, may communicate with the LAN 124 and/or the Internet 126 via radio waves, such as via WiFi, Bluetooth and/or a cellular telephone based data communications protocol. PDA 122 may also communicate with exchange computer system 100 via a conventional wireless hub 128.

FIG. 1 also shows the LAN 124 coupled with a wide area network ("WAN") 126 which may be comprised of one or more public or private wired or wireless networks. In one embodiment, the WAN 126 includes the Internet 126. The LAN 124 may include a router to connect LAN 124 to the Internet 126. Exemplary computer device 120 is shown coupled directly to the Internet 126, such as via a modem, DSL line, satellite dish or any other device for connecting a computer device to the Internet 126 via a service provider therefore as is known. LAN 124 and/or WAN 126 may be the same as the network 220 shown in FIG. 2 and described with respect thereto.

Users of the exchange computer system 100 may include one or more market makers 130 which may maintain a market by providing constant bid and offer prices for a derivative or security to the exchange computer system 100, such as via one of the exemplary computer devices depicted. The exchange computer system 100 may also exchange information with other match or trade engines, such as trade engine 138. One skilled in the art will appreciate that numerous additional computers and systems may be coupled to exchange computer system 100. Such computers and systems may include clearing, regulatory and fee systems.

The operations of computer devices and systems shown in FIG. 1 may be controlled by computer-executable instructions stored on a non-transitory computer-readable medium. For example, the exemplary computer device 116 may store computer-executable instructions for receiving order information from a user, transmitting that order information to exchange computer system 100 in electronic messages, extracting the order information from the electronic messages, executing actions relating to the messages, and/or calculating values from characteristics of the extracted order to facilitate matching orders and executing trades. In another example, the exemplary computer device 118 may include computer-executable instructions for receiving market data from exchange computer system 100 and displaying that information to a user.

Numerous additional servers, computers, handheld devices, personal digital assistants, telephones and other devices may also be connected to exchange computer system 100. Moreover, one skilled in the art will appreciate that the topology shown in FIG. 1 is merely an example and that the components shown in FIG. 1 may include other components not shown and be connected by numerous alternative topologies.

Referring back to FIG. 2, an illustrative embodiment of a general computer system 200 is shown. The computer system 200 can include a set of instructions that can be executed to cause the computer system 200 to perform any one or more of the methods or computer based functions disclosed herein. The computer system 200 may operate as a standalone device or may be connected, e.g., using a network, to other computer systems or peripheral devices. Any of the components discussed above, such as the processor 202, may be a computer system 200 or a component in the computer system 200. The computer system 200 may be specifically configured to implement a match engine, margin processing, payment or clearing function on behalf of an exchange, such as the Chicago Mercantile Exchange, of which the disclosed embodiments are a component thereof.

In a networked deployment, the computer system 200 may operate in the capacity of a server or as a client user computer in a client-server user network environment, or as a peer computer system in a peer-to-peer (or distributed) network environment. The computer system 200 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 200 can be implemented using electronic devices that provide voice, video or data communication. Further, while a single computer system 200 is illustrated, the term "system" shall also be taken to include any collection of systems or sub-systems that individually or jointly execute a set, or multiple sets, of instructions to perform one or more computer functions.

As illustrated in FIG. 2, the computer system 200 may include a processor 202, e.g., a central processing unit (CPU), a graphics processing unit (GPU), or both. The processor 202 may be a component in a variety of systems. For example, the processor 202 may be part of a standard personal computer or a workstation. The processor 202 may be one or more general processors, digital signal processors, specifically configured processors, application specific integrated circuits, field programmable gate arrays, servers, networks, digital circuits, analog circuits, combinations thereof, or other now known or later developed devices for analyzing and processing data. The processor 202 may implement a software program, such as code generated manually (i.e., programmed).

The computer system 200 may include a memory 204 that can communicate via a bus 208. The memory 204 may be a main memory, a static memory, or a dynamic memory. The memory 204 may include, but is not limited to, computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one embodiment, the memory 204 includes a cache or random access memory for the processor 202. In alternative embodiments, the memory 204 is separate from the processor 202, such as a cache memory of a processor, the system memory, or other memory. The memory 204 may be an external storage device or database for storing data. Examples include a hard drive, compact disc ("CD"), digital video disc ("DVD"), memory card, memory stick, floppy disc, universal serial bus ("USB") memory device, or any other device operative to store data. The memory 204 is operable to store instructions executable by the processor 202. The functions, acts or tasks illustrated in the figures or described herein may be performed by the programmed processor 202 executing the instructions 212 stored in the memory 204. The functions, acts or tasks are independent of the particular type of instructions set, storage media, processor or processing strategy and may be performed by software, hardware, integrated circuits, firm-ware, micro-code and the like, operating alone or in combination. Likewise, processing strategies may include multiprocessing, multitasking, parallel processing and the like.

As shown, the computer system 200 may further include a display unit 214, such as a liquid crystal display (LCD), an organic light emitting diode (OLED), a flat panel display, a solid state display, a cathode ray tube (CRT), a projector, a printer or other now known or later developed display device for outputting determined information. The display 214 may act as an interface for the user to see the functioning of the processor 202, or specifically as an interface with the software stored in the memory 204 or in the drive unit 206.

Additionally, the computer system 200 may include an input device 216 configured to allow a user to interact with any of the components of system 200. The input device 216 may be a number pad, a keyboard, or a cursor control device, such as a mouse, or a joystick, touch screen display, remote control or any other device operative to interact with the system 200.

In a particular embodiment, as depicted in FIG. 2, the computer system 200 may also include a disk or optical drive unit 206. The disk drive unit 206 may include a computer-readable medium 210 in which one or more sets of instructions 212, e.g., software, can be embedded. Further, the instructions 212 may embody one or more of the methods or logic as described herein. In a particular embodiment, the instructions 212 may reside completely, or at least partially, within the memory 204 and/or within the processor 202 during execution by the computer system 200. The memory 204 and the processor 202 also may include computer-readable media as discussed above.

The present disclosure contemplates a computer-readable medium that includes instructions 212 or receives and executes instructions 212 responsive to a propagated signal, so that a device connected to a network 220 can communicate voice, video, audio, images or any other data over the network 220. Further, the instructions 212 may be transmitted or received over the network 220 via a communication interface 218. The communication interface 218 may be a part of the processor 202 or may be a separate component. The communication interface 218 may be created in software or may be a physical connection in hardware. The communication interface 218 is configured to connect with a network 220, external media, the display 214, or any other components in system 200, or combinations thereof. The connection with the network 220 may be a physical connection, such as a wired Ethernet connection or may be established wirelessly. Likewise, the additional connections with other components of the system 200 may be physical connections or may be established wirelessly.

The network 220 may include wired networks, wireless networks, or combinations thereof. The wireless network may be a cellular telephone network, an 802.11, 802.16, 802.20, or WiMax network. Further, the network 220 may be a public network, such as the Internet, a private network, such as an intranet, or combinations thereof, and may utilize a variety of networking protocols now available or later developed including, but not limited to, TCP/IP based networking protocols.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer readable medium for execution by, or to control the operation of, data processing apparatus. While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein. The computer readable medium can be a machine-readable storage device, a machine-readable storage substrate, a memory device, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative embodiment, dedicated or otherwise specifically configured hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and anyone or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well. Feedback provided to the user can be any form of sensory feedback, e.g., visual feedback, auditory feedback, or tactile feedback. Input from the user can be received in any form, including acoustic, speech, or tactile input.

Embodiments of the subject matter described in this specification can be implemented in a computing system that includes a back end component, e.g., a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other. It should be appreciated that the disclosed embodiments may be applicable to other types of messages depending upon the implementation. Further, the messages may comprise one or more data packets, datagrams or other collection of data formatted, arranged configured and/or packaged in a particular one or more protocols, e.g., the FIX protocol, TCP/IP, Ethernet, etc., suitable for transmission via a network 214 as was described, such as the message format and/or protocols described in U.S. Pat. No. 7,831,491 and U.S. Patent Publication No. 2005/0096999 A1, both of which are incorporated by reference herein in their entireties and relied upon. Further, the disclosed message management system may be implemented using an open message standard implementation, such as FIX, FIX Binary, FIX/FAST, or by an exchange-provided API.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the described embodiments should not be understood as requiring such separation in all embodiments, and it should be understood that the described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is therefore intended that the foregoing detailed description be regarded as illustrative rather than limiting, and that it be understood that it is the following claims, including all equivalents, that are intended to define the spirit and scope of this invention.

What is claimed is:

1. A system comprising:
   a plurality of transaction receivers configured to receive electronic data transaction request messages from at least one client computer;
   a first processor configured to detect that a predetermined number of the electronic data transaction request messages originated from a location and activate a first transaction receiver of the plurality of transaction receivers, the first transaction receiver located closer to the location than the other plurality of transaction receivers, wherein the first transaction receiver is configured to receive, over a first data path characterized by a first transmission latency, the electronic data transaction request messages, sequence the received electronic data transaction request messages, and forward the sequenced electronic data transaction request messages to a plurality of transaction processors over a second path characterized by a second transmission latency; and
   the plurality of transaction processors configured to process the sequenced electronic data transaction request messages, generate at least one electronic data transaction result message based on the processing of the sequenced electronic data transaction request messages, and transmit at least a subset of the at least one electronic data transaction result message over a third path characterized by a third transmission latency to the at least one client computer.

2. The system of claim 1, wherein the first transaction receiver is located geographically, logically closer, or a combination thereof to the location than the other plurality of transaction receivers.

3. The system of claim 1, wherein only one of the plurality of transaction receivers is activated at any one time.

4. The system of claim 1, wherein the first processor is configured to de-activate the other plurality of transaction receivers.

5. The system of claim 1, wherein the first processor is configured to:
   de-activate the first transaction receiver at a pre-determined time; and
   activate a second transaction receiver of the plurality of transaction receivers based on the pre-determined time.

6. The system of claim 5,
   wherein the second transaction receiver is configured to receive other electronic data transaction request messages, augment each of the other received electronic data transaction request messages, and transmit each augmented electronic data transaction request message to the plurality of transaction processors for processing.

7. The system of claim 1, wherein one of the plurality of transaction receivers is configured to, upon a failure or disconnection of the first transaction receiver:
   receive electronic data transaction request messages from the at least one client computer;
   sequence the received electronic data transaction request messages; and
   transmit the sequenced electronic data transaction request messages to one or more of the plurality of transaction processors for processing.

8. The system of claim 1, further comprising:
   a plurality of arbiters, wherein the plurality of transaction processors are configured to transmit the at least a subset of the at least one electronic data transaction result message over a fourth path characterized by a fourth transmission latency to one of the plurality of arbiters geographically or logically closest to the respective transaction processor than the other plurality of arbiters, wherein the one of the plurality of arbiters is configured to receive and select a particular electronic data transaction result message from the subset of the at least one electronic data transaction result message and transmit the particular electronic data transaction result message to the at least one client computer over a fifth path characterized by a fifth transmission latency less than the first transmission latency.

9. The system of claim 8, further comprising an arbiter selector operative to select the one of the plurality of arbiters that is configured to at least forward the particular electronic data transaction result message received from any of the plurality of transaction processors at a particular time based on a current time of day.

10. The system of claim 8, wherein the at least one client computer determines which arbiter of the plurality of arbiters is coupled with each of a plurality of other client computers over a network characterized by a lowest transmission latency there between and cause the determined arbiter to transmit the particular data transaction result message to that client computer.

11. The system of claim 8, wherein a distance from the arbiter to the at least one client computer is less than a distance between the at least one client computer and the first transaction receiver.

12. The system of claim 1,
wherein the sequencing comprises augmenting each received electronic data transaction request message with sequence data indicative of a relationship between the received electronic data transaction request message and any of a plurality of electronic data transaction request messages previously received by the transaction receiver, and
wherein the processing by the plurality of transaction processors comprises processing the sequenced electronic data transaction request messages in accordance with the corresponding sequence data to determine a change in a current state of an electronic marketplace for one or more financial products caused thereby.

13. A computer implemented method comprising:
receiving electronic data transaction request messages from at least one client computer;
detecting that a predetermined number of the electronic data transaction request messages originated from a location;
activating a first transaction receiver of a plurality of transaction receivers, the first transaction receiver located closer to the location than the other plurality of transaction receivers, wherein the first transaction receiver is configured to receive, over a first data path characterized by a first transmission latency, the electronic data transaction request messages, sequence the received electronic data transaction request messages, and forward the sequenced electronic data transaction request messages to a plurality of transaction processors over a second path characterized by a second transmission latency;
processing, by the plurality of transaction processors, the sequenced electronic data transaction request messages;

generating, by the plurality of transaction processors, at least one electronic data transaction result message based on the processing of the sequenced electronic data transaction request messages; and
transmitting, by the plurality of transaction processors, at least a subset of the at least one electronic data transaction result message over a third path characterized by a third transmission latency to the at least one client computer.

14. The method of claim 13, wherein the first transaction receiver is located geographically, logically closer, or a combination thereof to the location than the other plurality of transaction receivers.

15. The method of claim 13, further comprising:
only activating one of the plurality of transaction receivers at any one time.

16. The method of claim 13, further comprising:
de-activating the other plurality of first transaction receivers.

17. The method of claim 13, further comprising:
de-activating the first transaction receiver at a pre-determined time of day; and
activating a second transaction receiver of the plurality of transaction receivers based on the pre-determined time of day.

18. The method of claim 17,
further comprising:
receiving, by the second transaction receiver, other electronic data transaction request messages;
augmenting, by the second transaction receiver, each of the other received electronic data transaction request messages; and
transmitting, by the second transaction receiver, each augmented electronic data transaction request message to the plurality of transaction processors for processing.

19. The method of claim 13, further comprising, upon a failure or disconnection of the first transaction receiver:
activating a second transaction receiver of the plurality of transaction receivers;
receiving, by the second transaction receiver, the electronic data transaction request messages from the at least one client computer;
sequencing, by the second transaction receiver, the received electronic data transaction request messages; and
transmitting, by the second transaction receiver, the sequenced electronic data transaction request messages to one or more of the plurality of transaction processors for processing.

20. The method of claim 13, further comprising:
transmitting, by the plurality of transaction processors, the at least a subset of the at least one electronic data transaction result message over a fourth path characterized by a fourth transmission latency to one of a plurality of arbiters, the one of the plurality of arbiters located geographically or logically closest to the respective transaction processor than the other plurality of arbiters, wherein the one of the plurality of arbiters is configured to receive and select a particular electronic data transaction result message from the subset of the at least one electronic data transaction result message and transmit the particular electronic data transaction result message to the at least one client computer over a fifth path characterized by a fifth transmission latency less than the first transmission latency.

21. The method of claim 20, further comprising:

selecting, by an arbiter selector, the one of the plurality of arbiters that is configured to at least forward the particular electronic data transaction result message received from any of the plurality of transaction processors at a particular time based on a current time of day.

22. The method of claim 20, wherein the at least one client computer determines which arbiter of the plurality of arbiters is coupled with each of a plurality of other client computers over a network characterized by a lowest transmission latency there between and cause the determined arbiter to transmit the particular data transaction result message to that client computer.

23. The method of claim 20, wherein a distance from the location of the arbiter to the at least one client computer is less than a distance between the at least one client computer and the first transaction receiver.

24. The method of claim 13, wherein the sequencing comprises augmenting each received electronic data transaction request message with sequence data indicative of a relationship between the received electronic data transaction request message and any of a plurality of electronic data transaction request messages previously received by the transaction receiver, and wherein the processing by the plurality of transaction processors comprises processing the sequenced electronic data transaction request messages in accordance with the corresponding sequence data to determine a change in a current state of an electronic marketplace for one or more financial products caused thereby.

25. A system comprising:

means for receiving electronic data transaction request messages from at least one client computer;

means for detecting that a predetermined number of the electronic data transaction request messages originated from a location;

means for activating a first transaction receiver of a plurality of transaction receivers, the first transaction receiver located geographically or logically closer to the location than the other plurality of transaction receivers, wherein the first transaction receiver is configured to receive, over a first data path characterized by a first transmission latency, the electronic data transaction request messages, sequence the received electronic data transaction request messages, and forward the sequenced electronic data transaction request messages to a plurality of transaction processors over a second path characterized by a second transmission latency; and means for processing the sequenced electronic data transaction request messages;

means for generating at least one electronic data transaction result message based on the processing of the sequenced electronic data transaction request messages; and means for transmitting at least a subset of the at least one electronic data transaction result message over a third path characterized by a third transmission latency to at least one client computer.

\* \* \* \* \*